United States Patent
Kamo et al.

(10) Patent No.: US 6,546,012 B2
(45) Date of Patent: *Apr. 8, 2003

(54) VARIABLE LENGTH FRAME EXCHANGING METHOD BY FIXED LENGTH CELL HANDLING EXCHANGE, VARIABLE LENGTH FRAME EXCHANGING INTERFACE APPARATUS AND CALL ACCEPTANCE DETERMINATION SYSTEM FOR FIXED LENGTH CELL HANDLING EXCHANGE

(75) Inventors: Toshiyuki Kamo, Kawasaki (JP); Yoshihiro Watanabe, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/756,646

(22) Filed: Nov. 26, 1996

(65) Prior Publication Data

US 2002/0044555 A1 Apr. 18, 2002

Related U.S. Application Data

(62) Division of application No. 08/189,961, filed on Jan. 31, 1994, now Pat. No. 5,610,918.

(30) Foreign Application Priority Data

Aug. 6, 1993 (JP) .............................. 5-137828

(51) Int. Cl.[7] ................................. H04J 3/16
(52) U.S. Cl. .................... 370/395.1; 370/465

(58) Field of Search ................. 370/389, 395, 370/396, 470, 465, 466, 467, 474, 473, 345.1, 250, 392, 397, 471, 522, 905, 912, 913, 399, 398, 428

(56) References Cited

U.S. PATENT DOCUMENTS 5,050,166 A    9/1991   Cantoni et al. .............. 370/473
5,164,938 A * 11/1992   Jurkovich ................... 370/391

(List continued on next page.)

OTHER PUBLICATIONS

Quality evaluation of a frame relay service via ATM networks, H. Yamada et al., vol. 92, No. 99, Jun. 19, 1992, Institute of Electronics, Information and Communication Engineers.

Primary Examiner—Dang Ton
(74) Attorney, Agent, or Firm—Katten Muchin Zavis Rosenman

(57) ABSTRACT

The invention provides a variable length frame exchanging method adapted to a fixed length cell handling exchange into which a terminal for use with a data communication method by a variable length frame is accommodated, a variable length frame exchanging interface apparatus and a call acceptance determination system, which are improved in that a variable length frame can be exchanged at a high speed in a fixed length cell handling exchange network and a terminal can be connected to and accommodated into the exchange in the same conditions as an existing service. The terminal is connected to the exchange by way of a subscriber line including a plurality of channels. A variable length frame from the terminal is disassembled into fixed length cells, and a use channel number or numbers and a DLCI of the subscriber line are converted into a VPI and a VCI. The VPI and the VCI are added to each of the fixed length cells, respectively, and the resulted fixed length cells are inputted to the exchange so that the frame is exchanged by the exchange.

20 Claims, 39 Drawing Sheets

U.S. PATENT DOCUMENTS

| | | |
|---|---|---|
| 5,214,642 A | 5/1993 | Kunimoto et al. .......... 370/471 |
| 5,315,586 A * | 5/1994 | Charvillat ................... 370/396 |
| 5,467,349 A | 11/1995 | Huey et al. ................. 370/397 |
| 5,610,918 A * | 3/1997 | Kamo et al. ................ 370/395 |
| 5,689,501 A * | 11/1997 | Takase et al. .............. 370/397 |

* cited by examiner

| LOGICAL LINK IDENTIFIER NUMBER OF FRAME RELAY || VC IDENTIFIER NUMBER OF ATM ||
|---|---|---|---|
| USED CHANNEL | DLCI NUMBER | VPI NUMBER | VCI NUMBER |
| 1, 5, 10, 13 | 1<br>4<br>5<br>9 | 1 | 1<br>4<br>5<br>9 |
| 3, 7, 12 | 4<br>10 | 3 | 4<br>10 |

FIG. 11

| FRAME RELAY | ATM EXCHANGE |
|---|---|
| LOWEST CHANNEL NUMBER | VPI NUMBER |
| 1 | 5 |
| 2 | 7 |
| 3 | 25 |
| 22 | 4 |
| 23 | 55 |
| 24 | 13 |

FIG. 12

| FRAME RELAY | ATM EXCHANGE |
|---|---|
| DLCI NUMBER | VCI NUMBER |
| 1 | 3 |
| 2 | 2 |
| 3 | 1 |
| ≈ | ≈ |
| 22 | 10 |
| 23 | 5 |
| 24 | 12 |

| TRANSMISSION TELEPHONE NUMBER | PHYSICAL MAXIMUM SPEED | TOTAL BAND |
|---|---|---|
| 2-6141 | 1.5 M bps | 0.5 M bps |
| 2-6142 | 3 M bps | 5 M bps |
|  |  |  |
|  |  |  |
|  |  |  |
| X-XXXX | 5 M bps | 1 M bps |

| LINE NUMBER 1 | | |
|---|---|---|
| TRANSMISSION TELEPHONE NUMBER | PHYSICAL MAXIMUM SPEED | TOTAL BAND |
| 2-6141 | 1.5 M bps | 2.4 M bps |
| 2-6142 | 3 M bps | 5 M bps |
|  |  |  |
|  |  |  |
| X-XXXX | 5 M bps | 1 M bps |

FIG. 42

| LINE NUMBER 3 | | |
|---|---|---|
| TRANSMISSION TELEPHONE NUMBER | PHYSICAL MAXIMUM SPEED | TOTAL BAND |
| 2-6141 | 1.5 M bps | 0.6 M bps |
| 2-6142 | 3 M bps | 1 M bps |
|  |  |  |
|  |  |  |
| X-XXXX | 5 M bps | 3 M bps |

FIG. 43

VARIABLE LENGTH FRAME EXCHANGING METHOD BY FIXED LENGTH CELL HANDLING EXCHANGE, VARIABLE LENGTH FRAME EXCHANGING INTERFACE APPARATUS AND CALL ACCEPTANCE DETERMINATION SYSTEM FOR FIXED LENGTH CELL HANDLING EXCHANGE

This is a continuation of application Ser. No. 08/189,961, filed Jan. 31, 1994, now U.S. Pat. No. 5,610,918.

BACKGROUND OF THE INVENTION

This invention relates to a variable length frame exchanging method, a variable length frame exchanging interface apparatus and a call acceptance determination system adapted for a fixed length cell handing exchange in which a terminal for use with a data communication system by a variable length frame is accommodated.

In recent years, as the introduction of the ISDN (Integrated Services Digital Network) proceeds, the utilization of public networks is complicated such that a public network, which has offered only telephone services, can now offer such various communication services as data communications, facsimile communications and packet communications at home of each of subscribers. Further, as the amount of communications increases, not only speech but also video signals and so forth can be transmitted. In this manner, various information communications are available nowadays. Particularly it is advantageous in terms of the cost and/or the communication speed to communicate data by way of an ISDN.

Meanwhile, the CCITT recommends a data communication method by a variable length frame including logic channel information, for example, a frame relay, for data communications. The frame relay is adapted to a common packet exchanging system and is expected as a technique which meets the requirement for a high speed packet service. In the frame relay technique, no protocol for a layer higher than the layer 2 is defined and the network does not participate in the protocol since frame multiplexing is performed in the data link layer, and accordingly, hardware matching is easy comparing with a packet exchanging system based on the X25 which is a protocol for the layer 2 and an increase in throughput can be realized.

Further, in popular packet exchanging systems, repeat control based on a protocol of a LAP-B is performed between a terminal and a network (exchange) or between different exchanges. With a frame relay, however, repeat control is not performed between a terminal and a network, and consequently, high speed transmission can be achieved together with an additional reason that no controlling processing for the repeat control is required.

By the way, in recent years, an ATM (Asynchronous Transfer Mode) exchange technique has been consented as a next generation exchange system by the CCITT, and investigations have been and are being directed actively toward the ATM exchange technique as a technique which realizes a broad band ISDN (B-ISDN). With an ATM exchange (fixed length cell handling exchange), user information is exchanged in the form of a packet of a fixed length called cell which includes united contents (data, sound, images and so forth) of information. As development of such ATM exchange technique proceeds, it is desired that also the service for accommodating and connecting a terminal (hereinafter referred to as frame relay terminal) for a frame relay described above into and to an ATM exchange network can be offered as one of services of the ATM exchange network.

An example for reference of a system wherein an ISDN frame relay is used to interconnect a plurality of LANs (Local Area Networks) is illustrated in FIG. 44. Referring to FIG. 44, a plurality of personal computers (frame relay terminals) 11 to 16 are shown, and a LAN 21 is constituted from the personal computers 11 and 12; another LAN 22 is constituted from the personal computers 13 and 14; and a further LAN 23 is constituted from the personal computers 15 and 16. The LANs 21 to 23 are connected to exchange offices 51 to 53 by way of ISDN interfaces 31 to 33 and circuit terminating equipments (NT) 41 to 43, respectively, so that they are connected to each other by way of a public network (ISDN) 60.

In such a system as described above, establishment of a transmission channel is performed using a call control protocol (I.451), but a transmission channel may otherwise be established in response to a command from a service person. Meanwhile, a LAP-F (Link Access Protocol-Frame Relay) is used for frame transmission (popular packet transmission). Data transmission is thus allowed between arbitrary terminals (personal computers 11 to 16). In particular, each of the personal computers 11 to 16 can communicate with an arbitrary one of the other personal computers 11 to 16 by performing data communication by way of a logical link (identified with a DLCI (Data Link Connection Identifier) in the signal) number of the LAP-F applied on the communication channel.

In this instance, the transmission channel between any one of the LANs 21 to 23 and a corresponding one of the exchange offices 51 to 53 can have an arbitrary line speed, and each of the LANs 21 to 23 can select a desired line speed. For example, a PCM circuit (24 channels or 30 channels) is used for the interface with each subscriber, and arbitrary channels desired by the subscribers can be combined to determine a line speed. In short, a subscriber can select a line speed from among up to 64×24 channels (or 64×30 channels) to the utmost.

However, where the network shown in FIG. 44 is a broad band ISDN which makes use of an ATM exchange, a frame relay has a subject to be solved in that, since it involves a variable frame length similarly to that of the popular packet exchange system X25, it cannot achieve high speed exchanging processing comparing with switching which employs a packet (cells) of a fixed length such as in an ATM.

Further, the CCITT does not involve provisions for the inside of a network (that is, for the inside of an exchange) when a frame relay terminal is accommodated into an ATM exchange, and the method of realizing such accommodation depends upon the maker of the system. For example, in the system shown in FIG. 44, a communication channel is connected between arbitrary ones of the subscribers (personal computers 11 to 16), and when any of the subscribers tries to transmit data to the other party, a function of routing to the other party designated by a DLCI number is required.

Meanwhile, in order to accommodate a frame relay terminal into an ATM exchange and set a path, a system has been proposed wherein acceptance of a call is determined from a peak value (a value reported from the user) of a band used between terminals between which communications are to be performed and a band for the path is allocated in accordance with the determination. Accordingly, when a user of a frame relay terminal makes a request to set a path of a band higher than a physical line speed (physical maximum speed), the path cannot be set nor connected.

However, a frame relay service allows, in most cases, the contract of generally 200 to 300% of the physical line speed, and also when a frame relay service is offered with an ATM exchange, the conditions must be the same as those in the existing service. Therefore, when a frame relay terminal is to be accommodated into an ATM exchange, it is desired to allow determination of acceptance of a call from a frame relay terminal while adopting the same conditions as those of the existing frame relay service.

SUMMARY OF THE INVENTION

It is an object of the present invention to provide a variable length frame exchanging method and a variable length frame exchanging interface apparatus by which a frame having a variable data length can be exchanged at a high speed in a fixed length cell handling exchange network.

It is another object of the present invention to provide a call acceptance determination system wherein a path for a variable length frame can be set in a fixed length cell handling exchange network in the same conditions as those in an existing service to realize a service for connecting and accommodating a variable length frame terminal to and into the fixed length cell handling exchange.

In order to attain the objects described above, according to an aspect of the present invention, there is provided a variable length frame exchanging method by a fixed length cell handling exchange which handles fixed length cells each including a logic channel information section and a data section and to which a terminal for use with a data communication method by a variable length frame including logic channel information is connected by way of a subscriber line having at least one channel, comprising the steps of disassembling, when a transmission frame is transmitted from the terminal to the exchange, the transmission frame into fixed length cells, converting a channel number or numbers of the subscriber line which has been used to transmit the transmission frame from the terminal and data link connection identifier information as the logic channel information added to the transmission frame into communication channel identifier information for the logic channel information sections of the fixed length cells, adding the communication channel identifier information to the logic channel information section of each of the fixed length cells and inputting the fixed length cells to the exchange, and exchanging the frame from the terminal as the fixed length cells in accordance with the communication channel identifier information by means of the exchange.

The communication channel identifier information may include virtual path identifier information and virtual channel identifier information, and the channel number or numbers of the subscriber line which have been used to transmit the transmission frame from the terminal may be converted into virtual path identifier information while the data link connection identifier information to be added to the transmission frame is converted into virtual channel identifier information.

According to another aspect of the present invention, there is provided a variable length frame exchanging method by a fixed length cell handling exchange which handles fixed length cells each including a logic channel information section and a data section and to which a terminal for use with a data communication method by a variable length frame including logic channel information is connected by way of a subscriber line having at least one channel, comprising the steps of producing, when fixed length cells designating the terminal as a destination of transmission are outputted from the exchange to the subscriber line, a call-in frame from the fixed length cells, converting communication channel identifier information of the logic channel information section of each of the fixed length cells into data link connection identifier information and a channel number or numbers of the subscriber line which are available to transmit the call-in frame to the terminal, and adding the data link connection identifier information as logic channel information to the call-in frame and transmitting the call-in frame to the terminal using a channel or channels of the channel number or numbers of the subscriber line obtained by conversion from the communication channel identifier information.

The communication channel identifier information may include virtual channel identifier information and virtual path identifier information, and the virtual channel identifier information may be converted into data link connection identifier information while the virtual path identifier information is converted into a channel number or numbers of the subscriber line which are available to transmit the virtual path identifier information to the terminal.

According to a further aspect of the present invention, there is provided a variable length frame exchanging method by a fixed length cell handling exchange which handles fixed length cells each including a logic channel information section and a data section and to which a terminal for use with a data communication method by a variable length frame including logic channel information is connected by way of a subscriber line having at least one channel, comprising the steps of disassembling, when a transmission frame is transmitted from the terminal to the exchange, the transmission frame into fixed length cells, converting a channel number or numbers of the subscriber line which has been used to transmit the transmission frame from the terminal and data link connection identifier information as the logic channel information added to the transmission frame into communication channel identifier information for the logic channel information sections of the fixed length cells, adding the communication channel identifier information to the logic channel information section of each of the fixed length cells and inputting the fixed length cells to the exchange, and exchanging the frame from the terminal as the fixed length cells in accordance with the communication channel identifier information by means of the exchange, but producing, when fixed length cells designating the terminal as a destination of transmission are outputted from the exchange to the subscriber line, a call-in frame from the fixed length cells, converting communication channel identifier information to be added to the logic channel information section of each of the fixed length cells into data link connection identifier information and a channel number or numbers of the subscriber line which are available to transmit the call-in frame to the terminal, and adding the data link connection identifier information as logic channel information to the call-in frame and transmitting the call-in frame to the terminal using a channel or channels of the channel number or numbers of the subscriber line obtained by conversion from the communication channel identifier information.

The variable length frame exchanging method may be constructed such that the communication channel identifier information includes virtual path identifier information and virtual channel identifier information, and a first corresponding relationship between the virtual path identifier information and a channel number or numbers of the subscriber line used between the terminal and the exchange and a second corresponding relationship between the virtual channel identifier information and a data link connection identifier to be added to a frame are registered in advance, and wherein, when a transmission frame is to be transmitted from the terminal to the exchange, a channel number or numbers of the subscriber line which have been used to transmit the transmission frame from the terminal is converted into virtual path identifier information in accordance with the first corresponding relationship and data link connection identifier information to be added to the transmission frame is converted into virtual channel identifier information in accordance with the second corresponding relationship, but when fixed length cells designating the terminal as a destination of transmission is outputted from the exchange to the subscriber line, virtual channel identifier information to be added to each of the fixed length cells is converted into data link connection identifier information in accordance with the second corresponding relationship and virtual path identifier information to be added to each of the fixed length cells is converted into a channel number or numbers of the subscriber line which are available upon transmission to the terminal in accordance with the first corresponding relationship.

According to a still further aspect of the present invention, there is provided a variable length frame exchanging interface apparatus which is interposed in a subscriber line having at least one channel for interconnecting an exchange which handles fixed length cells each including a logic channel information section and a data section and a terminal for use with a data communication method by a variable length frame including logic channel information and performs conversion processing between fixed length cells for the exchange and a variable length frame for the terminal, comprising frame production means for producing a transmission frame based on data transmitted thereto from the terminal by way of a plurality of channels of the subscriber line, channel number to virtual path identifier information conversion means for converting a channel number or numbers of the subscriber line which have been used to transmit the transmission frame from the terminal into virtual path identifier information as communication channel identifier information for the logic channel information sections of fixed length cells, data link connection identifier information to virtual channel identifier information converter for converting data link connection identifier information as logic channel information to be added to the transmission frame into virtual channel identifier information as the communication channel identifier information for the logic channel information sections of fixed length cells, and a disassembler for disassembling the transmission frame into fixed length cells to which the virtual path identifier information obtained by conversion by the channel number to virtual path identifier information converter and the virtual channel identifier information obtained by conversion by the data link connection identifier information to virtual channel identifier information conversion means are added and sending out the fixed length cells to the exchange.

The channel number to virtual path identifier information conversion means may include first storage for storing in advance a first corresponding relationship between a channel number or numbers of the subscriber line which are used between the terminal and the exchange and virtual path identifier information as communication channel identifier information, and the data link connection identifier information to virtual channel identifier information converter may include second storage for storing in advance a second corresponding relationship between a data link connection identifier to be added to a frame and virtual channel identifier information as the communication channel identifier information.

According to a yet further aspect of the present invention, there is provided a variable length frame exchanging interface apparatus which is interposed in a subscriber line having at least one channel for interconnecting an exchange which handles fixed length cells each including a logic channel information section and a data section and a terminal for use with a data communication method by a variable length frame including logic channel information and performs conversion processing between fixed length cells for the exchange and a variable length frame for the terminal, comprising an assembler for assembling a call-in frame based on fixed length cells from the exchange designating the terminal as a destination of transmission, virtual channel identifier information to data link connection identifier information converter for converting virtual channel identifier information as communication channel identifier information for the logic channel information sections of the fixed length cells into data link connection identifier information as logic channel information to be added to the call-in frame, virtual path identifier information to channel number converter for converting virtual path identifier information as the communication channel identifier information for the logic channel information sections of the fixed length cells into a channel number or numbers of the subscriber line which are available upon transmission to the terminal, and call-in frame disassembling means for transmitting the call-in frame, to which the data link connection identifier information obtained by conversion by the virtual channel identifier information to data link connection identifier information conversion means is added, by way of a channel or channels corresponding to the channel number or numbers of the subscriber line obtained by conversion by the virtual path identifier information to channel number converter to the terminal.

Preferably, the virtual path identifier information to channel number converter includes first storage means for storing in advance a first corresponding relationship between virtual path identifier information as the communication channel identifier information and a channel number or numbers of the subscriber line which are used between the terminal and the exchange and the virtual channel identifier information to data link connection identifier information converter includes second storage means for storing in advance a second corresponding relationship between virtual channel identifier information as the communication channel identifier information and a data link connection identifier to be added to a frame.

According to a yet further aspect of the present invention, there is provided a variable length frame exchanging interface apparatus which is interposed in a subscriber line having at least one channel for interconnecting an exchange which handles fixed length cells each including a logic channel information section and a data section and a terminal for use with a data communication method by a variable length frame including logic channel information and performs conversion processing between fixed length cells for the exchange and a variable length frame for the terminal, comprising a frame assembler for producing a transmission frame based on data transmitted thereto from the terminal by way of a plurality of channels of the subscriber line, channel number to virtual path identifier information converter for converting a channel number or numbers of the subscriber line which have been used to transmit the transmission frame from the terminal into virtual path identifier information as communication channel identifier information for the logic channel information sections of fixed length cells, data link connection identifier information to virtual channel identifier information converter for converting data link connection identifier information as logic channel information to be added to the transmission frame into virtual channel identifier information as the communication channel identifier information for the logic channel information sections of fixed length cells, and transmission frame disassemble for disassembling the transmission frame into fixed length cells to which the virtual path identifier information obtained by conversion by the channel number to virtual path identifier information converter and the virtual channel identifier information obtained by conversion by the data link connection identifier information to virtual channel identifier information converter are added and sending out the fixed length cells to the exchange, a frame assembler for assembling a call-in frame based on fixed length cells from the exchange designating the terminal as a destination of transmission, virtual channel identifier information to data link connection identifier information conversion means for converting virtual channel identifier information as communication channel identifier information for the logic channel information sections of the fixed length cells into data link connection identifier information as logic channel information to be added to the call-in frame, virtual path identifier information to channel number converter for converting virtual path identifier information as the communication channel identifier information for the logic channel information sections of the fixed length cells into a channel number or numbers of the subscriber line which are available upon transmission to the terminal, and call-in frame disassembler for transmitting the call-in frame, to which the data link connection identifier information obtained by conversion by the virtual channel identifier information to data link connection identifier information converter is added, by way of a channel or channels corresponding to the channel number or numbers of the subscriber line obtained by conversion by the virtual path identifier information to channel number converter to the terminal.

Preferably, the channel number to virtual path identifier information conversion means and the virtual path identifier information to channel number converter commonly include first storage means for storing in advance a first corresponding relationship between the virtual path identifier information as the communication channel identifier information and the channel number or numbers of the subscriber line which are used between the terminal and the exchange, and the data link connection identifier information to virtual channel identifier information converter and the virtual channel identifier information to data link connection identifier information converter commonly include second storage element for storing in advance a second corresponding relationship between the virtual channel identifier information as the communication channel identifier information and the data link connection identifier to be added to a frame.

According to a yet further aspect of the present invention, there is provided a call acceptance determination system for a fixed length cell handling exchange in which one or more first terminals for use with a data communication method by fixed length cells each including a logic channel information section and a data section and one or more second terminals for use with another data communication method by a variable length frame including logic channel information are accommodated by way of respective subscriber lines, comprising, the exchange having a resource divided into a first terminal resource and a second terminal resource completely separate from each other, first terminal resource control means for controlling the first terminal resource and second terminal resource control means for controlling the second terminal resource, the first terminal resource controller including fixed length cell call acceptance determinator means for determining whether or not a fixed length cell call from one of the first terminals should be accepted when the first terminal tries to use the first terminal resource, the second terminal resource control means including frame call acceptance determinator for determining whether or not a frame call from one of the second terminals should be accepted when the second terminal tries to use the second terminal resource.

The frame call acceptance determination means may includes virtual band calculator for multiplying a use requested band requested to set from one of the second terminals by a predetermined multiplexing rate to calculate a use virtual band which is controlled by the network, subscriber line free band detector for detecting a free band for the subscriber lines for the second terminal, outgoing line free band detector for detecting a free band for the outgoing lines for the second terminal, first comparator for comparing the use requested band calculated by the virtual band calculation means and the free band detected by the subscriber line free band detector with each other, second comparator for comparing the use requested band calculated by the virtual band calculator and the free band detected by the outgoing line free band detector with each other, and call acceptor for accepting a frame call from one of the second terminals when the comparison by the first comparator proves that the use virtual band is smaller than the free band of the subscriber lines for the second terminals and the comparison by the second comparator proves that the use virtual band is smaller than the free band for the outgoing lines for the second terminal.

A use requested band requested to set from one of the second terminals may be added as band information to a frame call from the second terminal and is transmitted to the virtual band calculator of the frame call acceptance determinator together with the frame call.

The frame call acceptance determination means may include virtual band setting element for setting, when setting of a frame call is requested from one of the second terminals, a physical maximum speed of the second terminal as a use virtual band for the frame call, band assurance determinator for determining whether or not a band has been assured already for a same sending subscriber as the second terminal, free band means for detecting a free band for the lines for the second terminal, comparator for comparing the use virtual band set by the virtual band setting element and the free band detected by the free band detector with each other, and call acceptor for accepting, when the band assurance determinator means determines that a band has been assured already for the same sending subscriber as the second terminal, the frame call from the second terminal unconditionally and for assuring, when the band assurance determinator determines that no band has been assured as yet for the same sending subscriber as the second terminal and the comparison by the comparator proves that the use virtual band is smaller than the free band for the lines for the second terminal, the use virtual band and accepting the frame call from the second terminal.

According to a yet further aspect of the present invention, there is provided a call acceptance determination system for a fixed length cell handling exchange in which one or more first terminals for use with a data communication method by fixed length cells each including a logic channel information section and a data section and one or more second terminals for use with another data communication method by a variable length frame including logic channel information are accommodated by way of respective subscriber lines, comprising, the exchange having a resource shared commonly by the first terminals and the second terminals, first terminal subscriber resource control means for controlling a first terminal subscriber access resource for a case wherein a fixed length cell call from one of the first terminals is inputted to the exchange by way of a corresponding one of the subscriber lines and then sent out to another one of the first terminals by way of another one of the subscriber lines, second terminal subscriber resource controller for controlling a second terminal subscriber access resource for a case wherein a frame call from one of the second terminals is inputted to the exchange by way of one of the subscriber lines and then sent out to another one of the second terminals by way of another one of the subscriber lines, and network resource controller for controlling a network common resource for a case wherein a fixed length cell call from one of the first terminals or a frame call from one of the second terminals is inputted to the exchange by way of a corresponding one of the subscriber lines and then sent out to a trunk line, the first terminal subscriber resource controller including fixed length cell call acceptance determinator for determining whether or not a fixed length cell call from one of the first terminals should be accepted when the first terminal tries to use the first terminal subscriber access resource, the second terminal resource controller including frame call acceptance determinator for determining whether or not a frame call from one of the second terminals should be accepted when the second terminal tries to use the second terminal subscriber access resource, the network resource controller including common resource call acceptance determinator means for determining whether or not a fixed length cell call from one of the first terminals or a frame call from one of the second terminals should be accepted when the first terminal or the second terminal tries to use the network common resource.

The frame call acceptance determinator may include virtual band calculator for multiplying a use requested band requested to set from one of the second terminals by a predetermined multiplexing rate to calculate a use virtual band which is controlled by the network, incoming side subscriber line free band detector for detecting a free band for the incoming side subscriber lines for the second terminal, outgoing side subscriber line free band detector for detecting a free band for the outgoing side subscriber lines for the second terminal, first comparator for comparing the use virtual band calculated by the virtual band calculator and the free band detected by the incoming side subscriber line free band detector with each other, second comparator for comparing the use virtual band calculated by the virtual band calculator and the free band detected by the outgoing side subscriber line free band detector with each other, and call acceptor for accepting a frame call from one of the second terminals when the comparison by the first comparator proves that the use virtual band is smaller than the free band for the incoming side subscriber lines for the second terminal and the comparison by the second comparator proves that the use virtual band is smaller than the free band for the outgoing side subscriber lines for the second terminal.

A use requested band requested to set from one of the second terminals may be added as band information to a frame call from the second terminal and then transferred to the virtual band calculator of the frame call acceptance determinator together with the frame call.

The common resource call acceptance determinator may include virtual band calculator for multiplying a use requested band requested to set from one of the first terminals or from one of the second terminals by a predetermined multiplexing rate to calculate a use virtual band which is controlled by the network, common resource free band detector for detecting a free band on the network common resource of the exchange, comparator for comparing the use virtual band calculated by the virtual band calculator and the free band detected by the common resource free band detector with each other, and call acceptor for accepting a fixed length cell call from one of the first terminals or a frame call from one of the second terminals when the comparison by the comparator proves that the use virtual band is smaller than the free band on the network common resource.

The predetermined multiplexing rate by which a use requested band is multiplied by the virtual band calculator may have two values set in advance including a first multiplexing rate for a use requested band requested to set from one of the first terminals and a second multiplexing rate for another use requested band requested to set from one of the second terminals.

A use requested band requested to set from one of the second terminals may be added as band information to a frame call from the second terminal and then transferred to the virtual calculator of the common resource call acceptance determinator means together with the frame call.

The common resource call acceptance determinator may include common resource fixed length cell call acceptance determinator for determining whether or not a fixed length cell call from one of the first terminals should be accepted when the first terminal tries to use the network common resource, and common resource frame call acceptance determinator for determining whether or not a frame call from one of the second terminals should be accepted when the second terminal tries to use the network common resource.

The common resource frame call acceptance determination means may include virtual band setting element for setting, when setting of a frame call is requested from one of the second terminals, a physical maximum speed of the second terminal as a use virtual band for the frame call, band assurance determinator for determining whether or not a band has been assured already for a same sending subscriber as the second terminal on the network common resource, common resource free band detector for detecting a free band on the network common resource of the exchange, comparator for comparing the use virtual band set by the virtual band setting element and the free band accepting, when the band assurance determinator determines that a band has been assured already for the same sending subscriber as the second terminal, the frame call from the second terminal unconditionally and for assuring, when the band assurance determinator determines that no band has been assured as yet for the same sending subscriber as the second terminal and the comparison by the comparator proves that the use virtual band is smaller than the free band on the network common resource, the use virtual band and accepting the frame call from the second terminal.

Alternatively, the common resource frame call acceptance determinator means may include virtual band setting means for setting a use requested band requested to set for a frame call from one of the second terminals as a use virtual band for the frame call, band assurance determinator for determining whether or not a band has been assured already for a same sending subscriber as the second terminal on the network common resource, common resource free band detector for detecting a free band on the network common resource of the exchange, first comparator for comparing, when the band assurance determinator determines that no band has been assured as yet for the same sending subscriber as the second terminal, the use virtual band set by the virtual band setting element and the free band detected by the common resource free band detector with each other, assured band extractor for extracting, when the band assurance determinator determines that a band has been assured for the same sending subscriber as the second terminal, the band assured already for the second terminal, second comparator for comparing the band extracted by the assured band extractor and a physical maximum speed of the second terminal with each other, third comparator for comparing, when the comparison by the second comparator proves that the band extracted by the assured band extractor is equal to or lower than the physical maximum speed of the second terminal, a sum of the band extracted by the assured band extractor and the use virtual band set by the virtual band setting element and the physical maximum speed of the second terminal with each other, remaining available band calculator for subtracting, when the by the third comparison comparator proves that the sum is higher than the physical maximum speed of the second terminal, the band extracted by the assured band extractor from the physical maximum speed of the second terminal to calculate a remaining available band, fourth comparator for comparing the remaining available band calculated by the remaining available band calculator and the free band detected by the common resource free band detector with each other, fifth comparator for comparing, when the by the third comparison comparator proves that the sum is equal to or lower than the physical maximum speed of the second terminal, the use virtual band set by the virtual band setting element and the free band detected by the common resource free band detector with each other, and call acceptance means for assuring, when the comparison by the first comparator or the fifth comparator proves that the use virtual band is smaller than the free band on the common resource, the use virtual band and accepting the frame call from the second terminal, for assuring, when the by the fourth comparison comparator proves that the remaining available band is smaller than the free band on the common resource, the remaining available band and accepting the frame call from the second terminal, and for accepting, when the comparison by the second comparator proves that the band extracted by the assured band extractor is higher than the physical maximum speed of the second terminal, the frame call from the second terminal unconditionally.

The call acceptance determination system may be constructed such that, for each of the second terminals connected to the exchange by way of the respective subscriber lines, a use band table is provided for controlling and storing a physical maximum speed of the second terminal and a sum total of use requested bands which have been requested to set before the present point of time by the second terminal, and the assured band extractor extracts the sum total of the use requested bands of the use band table as a band assured already for the second terminal whereas the physical maximum speed of the second terminal which is to be used by the second comparator, the third comparator and the remaining available band calculator is read out from the use band table.

A use requested band requested to set from one of the second terminals may be added as band information to a frame call from the second terminal and then transferred to the virtual band setting element of the common resource frame call acceptance determinator together with the frame call.

With the variable length frame exchanging method by a fixed length cell handling exchange and the variable length frame exchanging interface apparatus of the present invention described above, the following effects and/or advantages can be achieved.

1. A frame having a variable data length can be exchanged at a high speed by the fixed length cell handling exchange.

2. Since a predetermined corresponding relationship is provided between a used channel number upon communication of a variable length frame and data link connection identifier information and communication channel identifier information of a destination of transmission, a hard logic routing function can be provided, and when it is tried to accommodate a variable length frame terminal into the fixed length cell handling exchange, assembly and/or disassembly of a cell or routing on hardware for a variable length frame can be realized readily.

3. Since a cell relay between different fixed length cell handling exchanges is the same as in ordinary fixed length cell handling exchange, there is no need of particularly getting aware of a variable length frame, and a variable length frame terminal can be accommodated into a fixed length cell handling exchange using an existing technique as it is. Further, a service of accommodating and connecting a variable length frame terminal into and to a fixed length cell handling exchange can be realized as one of services of the fixed length cell handling exchange.

Further, with the call acceptance determination system for a fixed length cell handling exchange of the present invention, the following effects and/or advantages can be achieved.

4. By dividing the resource of a fixed length cell handling exchange simply, control of the first terminal resource and call acceptance determination can be processed completely independently of control of the second terminal resource and call acceptance determination, and a first terminal and a second terminal can be accommodated very readily into the same exchange and a service of accommodating and connecting a second terminal into and to the fixed length cell handling exchange can be realized as one of services of the fixed length cell handling exchange.

5. Since control of the first terminal subscriber access resource and call acceptance determination and control of the second terminal subscriber access resource and call acceptance determination are performed by the fixed length cell call acceptance determination means and the frame call acceptance determination means, respectively, and control of the network common resource and call acceptance determination are performed by the common resource call acceptance determination means, even where the resource of the fixed length cell handling exchange is shared commonly for the first terminals and the second terminals, a first terminal and a second terminal can be accommodated very readily into the same ATM exchange, and a service of accommodating and connecting a second terminal into and to the fixed length cell handling exchange can be realized as one of services of the fixed length cell handling exchange.

6. Since a use requested band is added as band information to a fixed length cell call or a frame call, a user of a second terminal need not any more report a use requested band every time before a call is developed, and further enhancement in service can be achieved.

7. Since at least one path from a certain second terminal is set on the lines, a band for a physical maximum speed is assured whereas a band higher than the physical maximum speed is not assured, and consequently, a contract for a speed higher than the physical maximum speed can be allowed for each of the second terminals. Then, when a second terminal is accommodated into the fixed length cell handling exchange so as to offer a service, a path for the variable length frame can be set to the fixed length cell handling switched network in the same conditions as the existing services and besides effective utilization of the resource can be realized.

8. Since call acceptance determination processing is performed using the first and second multiplexing rates conforming to characteristics of a fixed length cell call and a frame call and the common resource call acceptance determination means is divided into the common resource fixed length cell call acceptance determination means and the common resource frame call acceptance determination means, call acceptance determination processing can be performed in accordance with separate algorithms for a fixed length cell call from a first terminal and a frame call from a second terminal on the network common resource, and by assuring a band for paths for all of the second terminals as a virtual band, effective utilization of the common resource can be realized.

9. By performing call acceptance determination processing such that, when the sum total of use requested bands requested to set from a second terminal before the present point of time is lower than the physical maximum speed, a band is assured with the sum total of use requested bands, but when the sum total of use requested bands exceeds the physical maximum speed, a band is assured with the physical maximum speed, the common resource of the fixed length cell handling exchange can be utilized further effectively.

10. Since the physical maximum speed and the sum total of use requested bands requested to set before the present point of time are controlled and stored by means of the use band table for each second terminal, the sum total of use requested bands of the use band table can be used as an assured band of the second terminal, and besides, the physical maximum speed of the second terminal which is required for various comparison processing or for calculation processing of a remaining available band can be read out from the use band table and used for such processing. Consequently, control of various data and calculation processing of various means can be performed efficiently.

Further objects, features and advantages of the present invention will become apparent from the following detailed description when read in conjunction, with the accompanying drawings in which like parts or elements are denoted by like reference characters.

BRIEF DESCRIPTION OF THE DRAWINGS

FIG. 11 is a table illustrating a mapping relationship between a channel number/DLCI and a VPI/VCI in the variable length frame exchanging interface apparatus shown in FIG. 5;

FIG. 12 is a table illustrating a mapping relationship between a channel number and a VPI in the variable length frame exchanging interface apparatus shown in FIG. 5;

FIG. 40 is a diagrammatic view showing used band tables employed in the common resource frame relay call acceptance determination means shown in FIG. 38;

FIG. 42 is a diagrammatic view illustrating a condition of a used band table illustrated in FIG. 40 before acceptance of a predetermined line;

FIG. 43 is a similar view but illustrating a condition of another used band table illustrated in FIG. 40 before acceptance of another line.

DESCRIPTION OF THE PREFERRED EMBODIMENTS a. Different Aspects of the Invention

Figure 1:
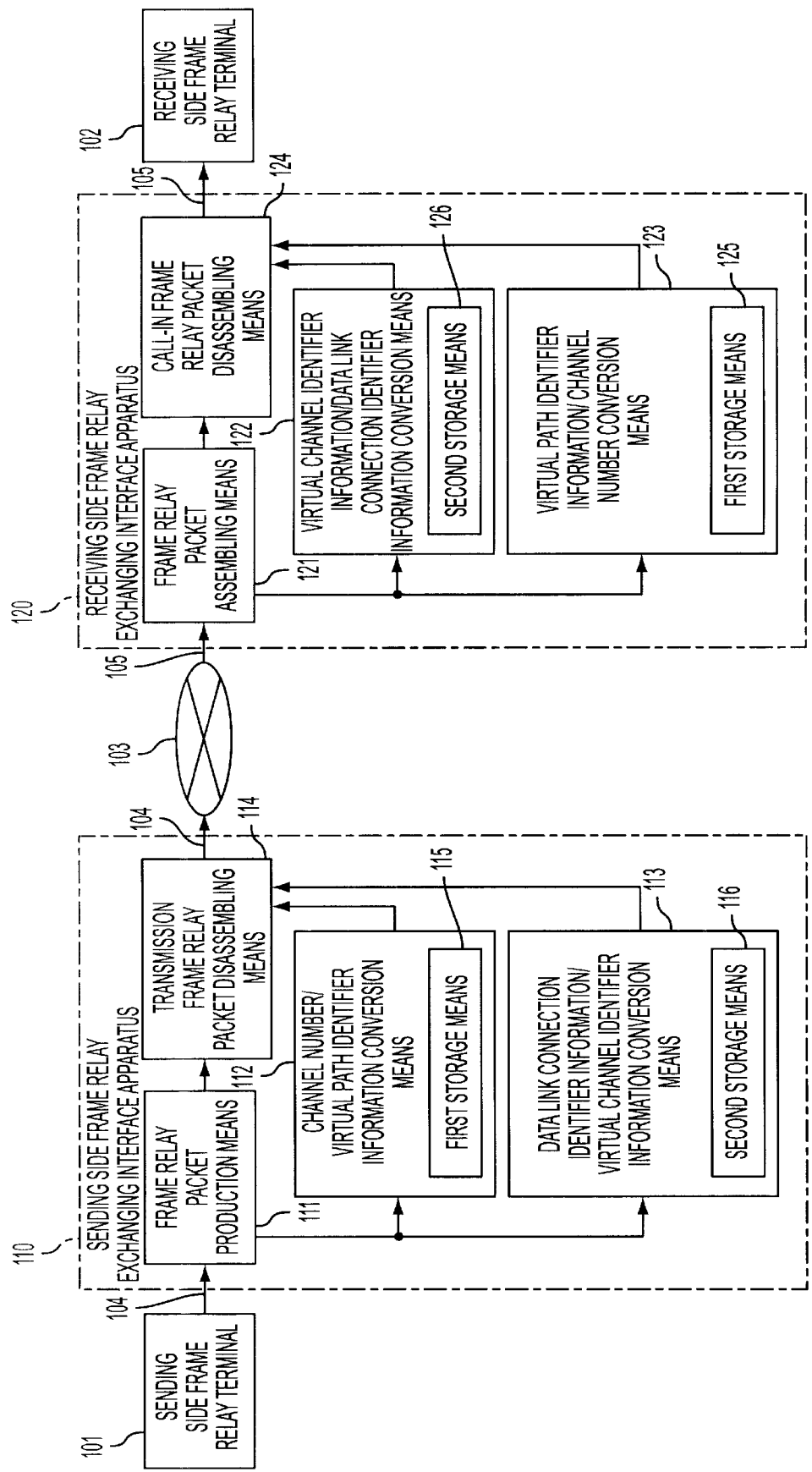
FIGS. 1 to 4 are block diagrams illustrating different aspects of the present invention.

FIG. 1 illustrates an aspect of the present invention. Referring to FIG. 1, a sending side frame relay terminal 101 and a receiving side frame relay terminal 102 are used for a data communication method by a variable length frame (hereinafter referred to as frame relay packet) including logic channel information and are connected to an ATM switched network (ATM exchange) 103, which handles fixed length cells (hereinafter referred to as ATM cells) each including a logic channel information section and a data section, by way of subscriber lines 104 and 105 respectively, each having at least one channel.

A sending side frame relay exchanging interface apparatus (variable length frame exchanging interface apparatus) 110 is interposed in the subscriber line 104 and performs sending conversion processing between ATM cells for the ATM switched network 103 and a frame relay packet for the frame relay terminal 101 in order to realize the variable length frame exchanging method of the present invention.

A receiving side frame relay exchanging interface apparatus (variable length frame exchanging interface apparatus) 120 is interposed in the subscriber line 105 and performs receiving conversion processing between ATM cells for the ATM switched network 103 and a frame relay packet for the frame relay terminal 102 in order to realize the variable length frame exchanging method of the present invention.

The sending side frame relay exchanging interface apparatus 110 includes frame relay packet production means (frame production means) 111, channel number to virtual path identifier (channel number/virtual path identifier) information conversion means 112, data link connection identifier information to virtual channel identifier information (data link connection identifier information/virtual channel identifier information) conversion means 113, and transmission frame relay packet disassembling means (transmission frame disassembling means) 114.

The frame relay packet production means 111 produces a transmission frame relay packet based on data transmitted thereto from the frame relay terminal 101 by way of a plurality of channels of the subscriber line 104. The channel number to virtual path identifier information conversion means 112 converts a channel number or numbers of the subscriber line 104 which have been used to transmit the transmission frame relay packet from the frame relay terminal 101 into virtual path identifier information as ATM communication channel identifier information of the logic channel information sections of ATM cells.

The data link connection identifier information to virtual channel identifier information conversion means 113 converts data link connection identifier information as logic channel information to be added to the transmission frame relay packet into virtual channel identifier information as the ATM communication channel identifier information of the logic channel information sections of ATM cells. The transmission frame relay packet disassembling means 114 disassembles the transmission frame relay packet into ATM cells to which the virtual path identifier information obtained by conversion by the channel number to virtual path identifier information conversion means 112 and the virtual channel identifier information obtained by conversion by the data link connection identifier information to virtual channel identifier information conversion means 113 are added, and sends out the ATM cells to the ATM switched network 103.

The channel number to virtual path identifier information conversion means 112 includes storage means 115 for storing in advance a corresponding relationship between a channel number or numbers of the subscriber line 104 which are used between the frame relay terminal 101 and the ATM switched network 103 and virtual path identifier information as ATM communication channel identifier information, and the data link connection identifier information to virtual channel identifier information conversion means 113 includes another storage means 116 for storing in advance another relationship between a data link connection identifier to be added to a frame relay packet and virtual channel identifier information as the ATM communication channel identifier information.

Meanwhile, the receiving side frame relay exchanging interface apparatus 120 includes frame relay packet assembling means (frame assembling means) 121, virtual channel identifier information to data link connection identifier information conversion means 122. virtual path identifier information to channel number conversion means 123, and call-in frame relay packet disassembling means (call-in frame disassembling means) 124.

The frame relay packet assembling means 121 assembles a call-in frame relay packet based on ATM cells from the ATM switched network 103 designating the frame relay terminal 102 as a destination of transmission. The virtual channel identifier information to data link connection identifier information conversion means 122 converts virtual channel identifier information as ATM communication channel identifier information of the logic channel information sections of the ATM cells into data link connection identifier information as logic channel information to be added to the call-in frame relay packet.

The virtual path identifier information to channel number conversion means 123 converts virtual path identifier information as the ATM communication channel identifier information of the logic channel information sections of the ATM cells into a channel number or numbers of the subscriber line 105 which are available upon transmission to the frame relay terminal 102. The call-in frame relay packet disassembling means 124 transmits the call-in frame relay packet, to which the data link connection identifier information obtained by conversion by the virtual channel identifier information to data link connection identifier information conversion means 122 is added, by way of a channel or channels corresponding to the channel number or numbers of the subscriber line 105 obtained by conversion by the virtual path identifier information to channel number conversion means 123 to the frame relay terminal 102.

The virtual path identifier information to channel number conversion means 123 includes storage means 125 for storing in advance a corresponding relationship between virtual path identifier information as the ATM communication channel identifier information and a channel number or numbers of the subscriber line 105 which are used between the frame relay terminal 102 and the ATM switched network 103, and the virtual channel identifier information to data link connection identifier information conversion means 122 includes another storage means 126 for storing in advance another relationship between virtual channel identifier information as the ATM communication channel identifier information and a data link connection identifier to be added to a frame relay packet.

Due to the construction described above, in the sending side frame relay interface apparatus 110, when a transmission frame relay packet (with the frame relay terminal 102 designated as a destination of transmission) is received from the frame relay terminal 101 by way of the subscriber line 104, the frame relay packet production means 111 first produces a transmission frame relay packet once based on the data transmitted thereto from the frame relay terminal 101 by way of a plurality of channels of the subscriber line 104.

Then, a channel number or numbers of the subscriber line 104 which have been used to transmit the transmission frame relay packet from the frame relay terminal 101 is converted into virtual path identifier information in accordance with the corresponding relationship of the storage means 115 by the channel number to virtual path identifier information conversion means 112, and data link connection identifier information to be added to the transmission frame relay packet is converted into virtual channel identifier information based on the corresponding relationship of the storage means 116 by the data link connection identifier information to virtual channel identifier information conversion means 113.

Thereafter, the transmission frame relay packet produced by the frame relay packet production means 111 is disassembled by the transmission frame relay packet disassembling means 114 into ATM cells to which the virtual path identifier information obtained by conversion by the channel number to virtual path identifier information conversion means 112 and the virtual channel identifier information obtained by conversion by the data link connection identifier information to virtual channel identifier information conversion means 113 are added, and is then sent out to the ATM switched network 103. Consequently, the frame relay packet from the frame relay terminal 101 is exchanged as the ATM cells in accordance with the virtual path identifier information and the virtual channel identifier information by the ATM switched network 103 so that it is transmitted to the frame relay terminal 102.

Meanwhile, in the receiving side frame relay exchanging interface apparatus 120, when ATM cells designating the frame relay terminal 102 as a destination of transmission are outputted from the ATM switched network 103 to the subscriber line 105, the frame relay packet assembling means 121 assembles a call-in frame relay packet based on the ATM cells from the ATM switched network 103 designating the frame relay terminal 102 as a destination of transmission.

Then, virtual channel identifier information to be added to each of the ATM cells is converted into data link connection identifier information based on the corresponding relationship of the storage means 126 by the virtual channel identifier, information to data link connection identifier information conversion means 122, and virtual path identifier information to be added to each of the ATM cells is converted into a channel number or numbers of the subscriber line 105, which are available upon transmission to the frame relay terminal 102, based on the corresponding relationship of the storage means 125 by the virtual path identifier information to channel number conversion means 123.

Thereafter, the call-in frame relay packet, which has been assembled by the frame relay packet assembling means 121 and to which the data link connection identifier information obtained by conversion by the virtual channel identifier information to data link connection identifier information conversion means 122 is added, is disassembled by the call-in frame relay packet disassembling means 124 and transmitted by way of a channel or channels corresponding to a channel number or numbers of the subscriber line 105 obtained by conversion by the virtual path identifier information to channel number conversion means 123 to the frame relay terminal 102.

Figure 2:
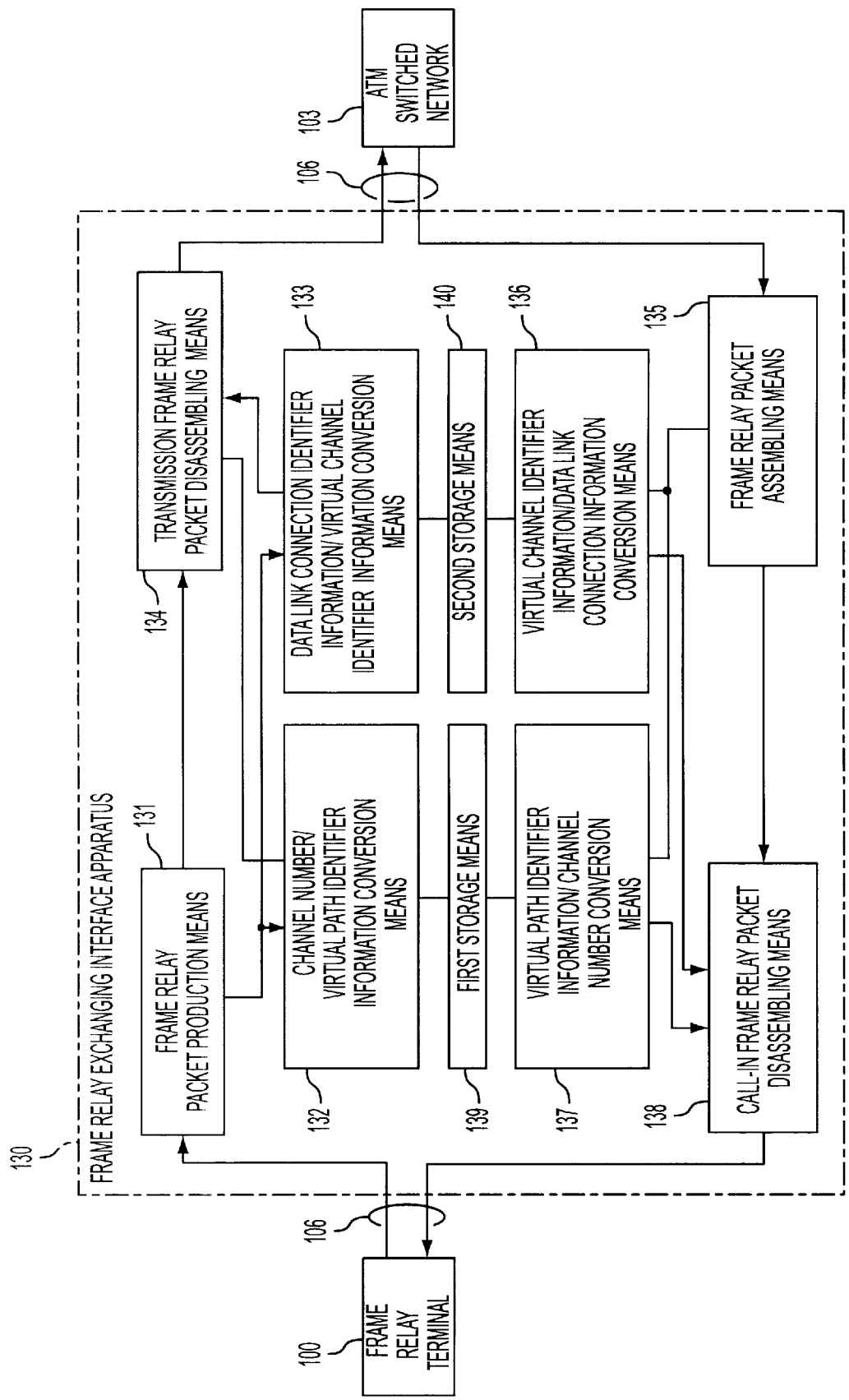

FIG. 2 illustrates another aspect of the present invention. Referring to FIG. 2, a frame relay terminal 100 is used for a data communication method by a variable length frame (hereinafter referred to as frame relay packet) including logic channel information and is connected to an ATM switched network (ATM exchange) 103, which handles fixed length cells (hereinafter referred to as ATM cells) each including a logic channel information section and a data section, by way of a subscriber line 106 having at least one channel.

A frame relay exchanging interface apparatus (variable length frame exchanging interface apparatus) 130 is interposed in the subscriber line 106 and performs conversion processing between ATM cells for the ATM switched network 103 and a frame relay packet for the frame relay terminal 100 in order to realize the variable length frame exchanging method of the present invention. The frame relay exchanging interface apparatus 130 has both of the function of the sending side frame relay exchanging interface apparatus 110 and the function of the receiving side frame relay exchanging interface apparatus 120 described hereinabove with reference to FIG. 1.

In particular, the frame relay exchanging interface apparatus 130 comprises frame relay packet production means (frame production means) 131, channel number to virtual path identifier information conversion means 132, data link connection identifier information to virtual channel identifier information conversion means 133, transmission frame relay packet disassembling means (transmission frame disassembling means) 134, frame relay packet assembling means (frame assembling means) 135, virtual channel identifier information to data link connection identifier information conversion means 136, virtual path identifier information to channel number conversion means 137, and call-in frame relay packet disassembling means (call-in frame disassembling means) 138.

The frame relay packet production means 131 produces a transmission frame relay packet based on data transmitted thereto from the frame relay terminal 100 by way of a plurality of channels of the subscriber line 106. The channel number to virtual path identifier information conversion means 132 converts a channel number or numbers of the subscriber line 106 which have been used to transmit the transmission frame relay packet from the frame relay terminal 100 into virtual path identifier information as ATM communication channel identifier information of the logic channel information sections of ATM cells.

The data link connection identifier information to virtual channel identifier information conversion means 133 converts data link connection identifier information as logic channel information to be added to the transmission frame relay packet into virtual channel identifier information as the ATM communication channel identifier information of the logic channel information sections of ATM cells. The transmission frame relay packet disassembling means 134 disassembles the transmission frame relay packet into ATM cells to which the virtual path identifier information obtained by conversion by the channel number to virtual path identifier information conversion means 132 and the virtual channel identifier information obtained by conversion by the data link connection identifier information to virtual channel identifier information conversion means 133 are added, and sends out the ATM cells to the ATM switched network 103.

The frame relay packet assembling means 135 assembles a call-in frame relay packet based on ATM cells from the ATM switched network 103 designating the frame relay terminal 100 as a destination of transmission. The virtual channel identifier information to data link connection identifier information conversion means 136 converts virtual channel identification as ATM communication channel identifier information of the logic channel information sections of ATM cells into data link connection identifier information as logic channel information to be added to the call-in frame relay packet.

The virtual path identifier information to channel number conversion means 137 converts virtual path identifier information as the ATM communication channel identifier information of the logic channel information sections of ATM cells into a channel number or numbers of the subscriber line 106 which are available upon transmission to the frame relay terminal 100. The call-in frame relay packet disassembling means 138 transmits the call-in frame relay packet, to which the data link connection identifier information obtained by conversion by the virtual channel identifier information to data link connection identifier information conversion means 136 is added, by way of a channel or channels corresponding to the channel number or numbers of the subscriber line 106 obtained by conversion by the virtual path identifier information to channel number conversion means 137 to the frame relay terminal 100.

The channel number to virtual path identifier information conversion means 132 and the virtual path identifier information to channel number conversion means 137 commonly include first storage means 139 for storing in advance a first corresponding relationship between the virtual path identifier information as the ATM communication channel identifier information and the channel number or numbers of the subscriber line 106 which are used between the frame relay terminal 100 and the ATM switched network 103, and the data link connection identifier information to virtual channel identifier information conversion means 133 and the virtual channel identifier information to data link connection identifier information conversion means 136 commonly include second storage means 140 for storing in advance a second corresponding relationship between the virtual channel identifier information as the ATM communication channel identifier information and the data link connection identifier to be added to a frame relay packet.

In the frame relay interface apparatus 130 having the construction described above, when a transmission frame relay packet is transmitted thereto from the frame relay terminal 101 by way of the subscriber line 106, a transmission frame relay packet is produced once based on the data transmitted thereto from the frame relay terminal 100 by way of a plurality of channels of the subscriber line 106 by the frame relay packet production means 131.

Then, a channel number or numbers of the subscriber line 106 which have been used to transmit the transmission frame relay packet from the frame relay terminal 100 is converted into virtual path identifier information by the channel number to virtual path identifier information conversion means 132, and data link connection identifier information to be added to the transmission frame relay packet is converted into virtual channel identifier information by the data link connection identifier information to virtual channel identifier information conversion means 133.

Thereafter, the transmission frame relay packet produced by the frame relay packet production means 131 is disassembled by the transmission frame relay packet disassembling means 134 into ATM cells to which the virtual path identifier information obtained by conversion by the channel number to virtual path identifier information conversion means 132 and the virtual channel identifier information obtained by conversion by the data link connection identifier information to virtual channel identifier Information conversion means 133 are added, and then sent out to the ATM switched network 103. Consequently, the frame relay packet from the frame relay terminal 100 is exchanged as the ATM cells in accordance with the virtual path identifier information and the virtual channel identifier information by the ATM switched network 103.

On the other hand, when ATM cells with the frame relay terminal 100 designated as a destination of transmission are outputted from the ATM switched network 103 to the subscriber line 106, a call-in frame relay packet is first assembled by the frame relay packet assembling means 135 based on the ATM cells from the ATM switched network 103 designating the frame relay terminal 100 as a destination of transmission.

Then, virtual channel identification to be added to the ATM cells is converted into data link connection identifier information by the virtual channel identifier information to data link connection identifier information conversion means 136, and virtual path identifier information to be added to the ATM cells is converted into a channel number or numbers of the subscriber line 106, which are available upon transmission to the frame relay terminal 100, by the virtual path identifier information to channel number conversion means 137.

Thereafter, the call-in frame relay packet which has been assembled by the frame relay packet assembling means 135 and to which the data link connection identifier information obtained by conversion by the virtual channel identifier information to data link connection identifier information conversion means 136 is added, is disassembled by the call-in frame relay packet disassembling means 138 and transmitted to the frame relay terminal 100 by way of a channel or channels corresponding to a channel number or numbers of the subscriber line 106 obtained by conversion by the virtual path identifier information to channel number conversion means 137.

Here, the first corresponding relationship between the virtual path identifier information and the channel number or numbers of the subscriber line 106 which are used between the frame relay terminal 100 and the ATM switched network 103 and the second corresponding relationship between the virtual channel identifier information and the data link connection identifier to be added to a frame relay packet are stored in advance in the first storage means 139 and the second storage means 140, respectively.

Accordingly, the conversion processing by the channel number to virtual path identifier information conversion means 132 and the virtual path identifier information to channel number conversion means 137 is performed based on the first corresponding relationship of the first storage means 139 while the conversion processing by the data link connection identifier information to virtual channel identifier information conversion means 133 and the virtual channel identifier information to data link connection identifier information conversion means 136 is performed based on the second corresponding relationship of the second storage means 140.

Figure 3:
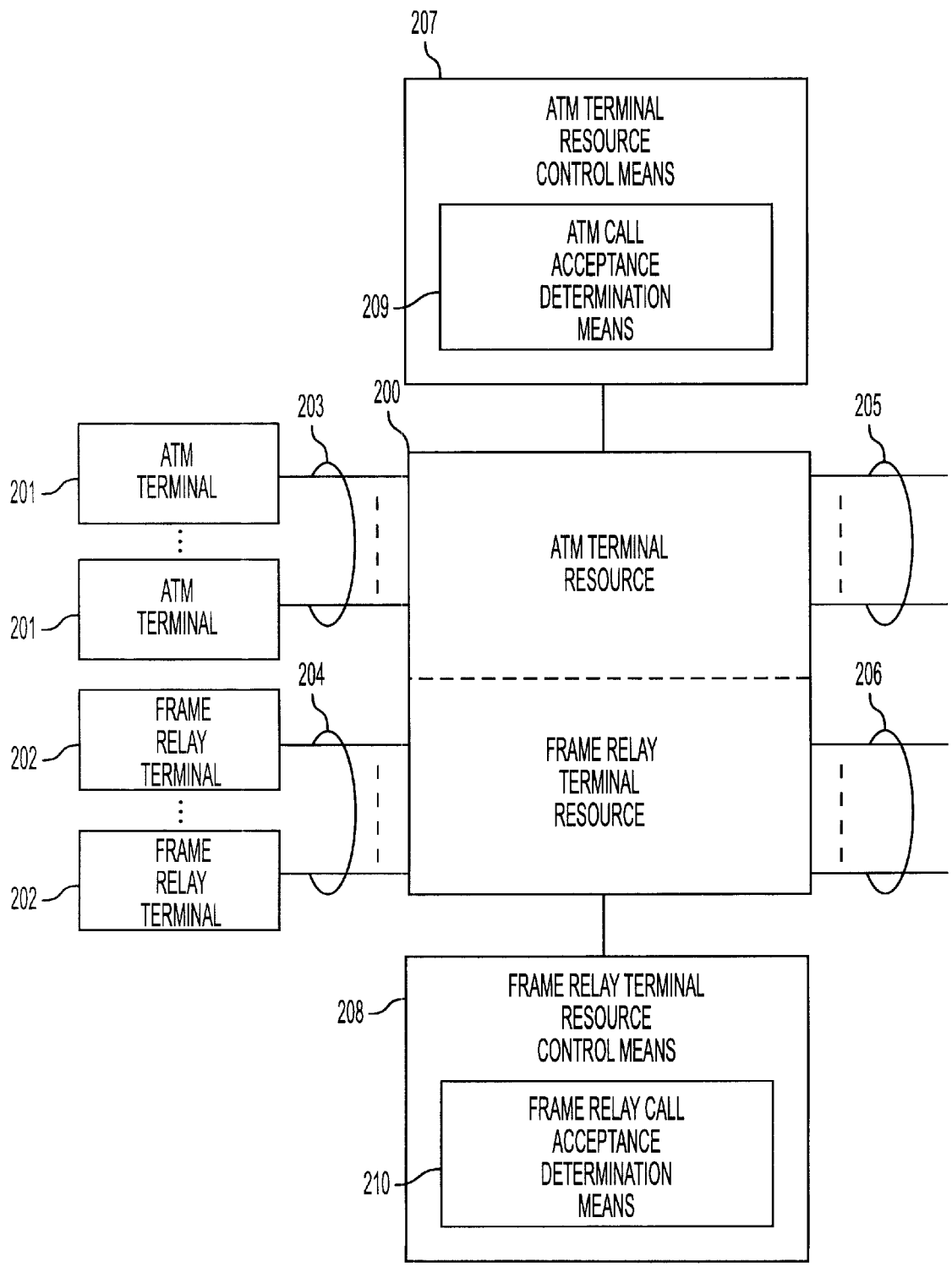

FIG. 3 illustrates a further aspect of the present invention. Referring to FIG. 3, an ATM exchange 200 handles fixed length cells each including a logic channel information section and a data section and accommodates one or more ATM terminals 201 as first terminals for use with the data communication method by fixed length cells (hereinafter referred to as ATM cells) described hereinabove by way of respective ATM terminal subscriber lines 203. The ATM exchange 200 further accommodates one or more frame relay terminals 202 as second terminals for use with the data communication method by a variable length frame (hereinafter referred to as frame relay packet) including logic channel information by way of respective frame relay terminal subscriber lines 204.

The ATM exchange 200 has a resource (free band) divided into an ATM terminal resource (first terminal resource) and a frame relay terminal resource (second terminal resource) completely separate from each other. Accordingly, also the trunk lines of the ATM exchange 200 are completely separated into ATM terminal trunk lines 205 and frame relay terminal trunk lines 206.

In the present aspect of the invention, ATM terminal resource control means (first terminal resource control means) 207 for controlling the ATM terminal resource and frame relay terminal resource control means (second terminal resource control means) 208 for controlling the frame relay terminal resource are provided. Here, the ATM terminal resource control means 207 includes ATM call acceptance determination means (fixed length cell call acceptance determination means) 209 for determining whether or not an ATM call (fixed length cell call) from one of the ATM terminals 201 should be accepted when the ATM terminal 201 tries to use the ATM terminal resource, and the frame relay terminal resource control means 208 includes frame relay call acceptance determination means (frame call acceptance determination means) 210 for determining whether or not a frame relay call (frame call) from one of the frame relay terminals 202 should be accepted when the frame relay terminal 202 tries to use the frame relay terminal resource.

The frame relay call acceptance determination means 210 may include virtual band calculation means for multiplying a use requested band requested to set from one of the frame relay terminals 202 by a predetermined multiplexing rate α to calculate a use virtual band A1 which is controlled by the network, subscriber line free band detection means for detecting a free band B1 for the subscriber lines 204 for the frame relay terminal, outgoing line free band detection means for detecting a free band C1 for the outgoing lines (subscriber lines 204 or trunk lines 206) for the frame relay terminal, first comparison means for comparing the use requested band A1 calculated by the virtual band calculation means and the free band B1 detected by the subscriber line free band detection means with each other, second comparison means for comparing the use requested band A1 calculated by the virtual band calculation means and the free band C1 detected by the outgoing line free band detection means with each other, and call acceptance means for accepting a frame relay call from one of the frame relay terminals 202 when the result of comparison by the first comparison means is [free band B1 for the subscriber line 204 for the frame relay terminal]>[use virtual band A1] and the result of comparison by the second comparison means is [free band C1 for the outgoing lines for the frame relay terminal]>[use virtual band A1].

A use requested band requested to set from one of the frame relay terminals 202 may be added as band information to a frame relay call from the frame relay terminal 202 and transmitted to the virtual band calculation means of the frame relay call acceptance determination means 210 together with the frame relay call.

Alternatively, the frame relay call acceptance determination means 210 may include virtual band setting means for setting, when setting of a frame relay call is requested from one of the frame relay terminals 202, a physical maximum speed (physical line speed) of the frame relay terminal 202 as a use virtual band A2 for the frame relay call, band assurance determination means for determining whether or not a band has been assured already for a same sending subscriber as the frame relay terminal 202, free band detection means for detecting a free band B2 for the frame relay terminal lines 204 and 206 for the frame relay terminal, comparison means for comparing the use virtual band A2 set by the virtual band setting means and the free band B2 detected by the free band detection means with each other, and call acceptance means described below.

In particular, the call acceptance means employed here accepts, when the band assurance determination means determines that a band has been assured already for the same sending subscriber as the frame relay terminal 202, the frame relay call from the frame relay terminal 202 unconditionally, but assures, when the band assurance determination means determines that no band has been assured as yet for the same sending subscriber as the frame relay terminal 202 and the result of comparison by the comparison means is [free band B2 for the frame relay terminal lines 204 and 206 for the frame relay terminal]>[use virtual band A2], the use virtual band A2 and accepts the frame relay call from the frame relay terminal 202.

In the system described above, the ATM terminal resource and the frame relay terminal resource are set completely separate from each other on the resource of the ATM exchange 200 and are controlled by the ATM terminal resource control means 207 and the frame relay terminal resource control means 208, respectively.

When an ATM terminal 201 tries to use the ATM terminal resource, the ATM call acceptance determination means 209 determines whether or not the ATM call from the ATM terminal 201 should be accepted, but when a frame relay terminal 202 tries to use the frame relay terminal resource, the frame relay call acceptance determination means 210 determines whether or not the frame relay call from the frame relay terminal 202 should be accepted.

Since the resource of the ATM exchange 200 is divided simply in this manner, control of the resource for and call acceptance determination of an ATM terminal 201 and control of the resource for and call acceptance determination of a frame relay terminal 202 can be processed completely independently of each other, and consequently, the ATM terminals 201 and the frame relay terminals 202 can be accommodated into the same ATM exchange 200.

In this instance, the frame relay call acceptance determination means 210 multiplies the use requested band requested to set from the frame relay terminal 202 by the predetermined multiplexing rate α to calculate a use virtual band A1 which is controlled by the network, supervises a free band B1 for the subscriber lines 204 for the frame relay terminal and a free band C1 for the outgoing lines (subscriber lines 204 or trunk lines 206) for the frame relay terminal, and accepts the frame relay call from the frame relay terminal 202 in the case of [free band B1 for the subscriber lines 204 for the frame relay terminal]>[use virtual band A1] and [free band C1 for the outgoing lines for the frame relay terminal]>[use virtual band A1].

In this instance, if the use requested band requested to set from the frame relay terminal 202 is transferred as band information together with the frame relay call to the virtual band calculation means of the frame relay call acceptance determination means 210, then the user of the frame relay terminal 202 need not any more report a use requested band every time before a call is developed.

Alternatively, the frame relay call acceptance determination means 210 may set, when setting of a frame relay call is requested from one of the frame relay terminals 202, a physical maximum speed (physical line speed) of the frame relay terminal 202 as a use virtual band A2 for the frame relay call, supervise a free band B2 for the frame relay terminal lines 204 and 206, and accept, when a band has been assured already for the same sending subscriber as the frame relay terminal 202, the frame relay call from the frame relay terminal 202 unconditionally, but assure, when no band has been assured as yet for the same sending subscriber as the frame relay terminal 202 and the free band B2 for the frame relay terminal lines 204 and 206 for the frame relay terminal is greater than the use virtual band A2, the use virtual band A2 and accept the frame relay call from the frame relay terminal 202.

Figure 4:
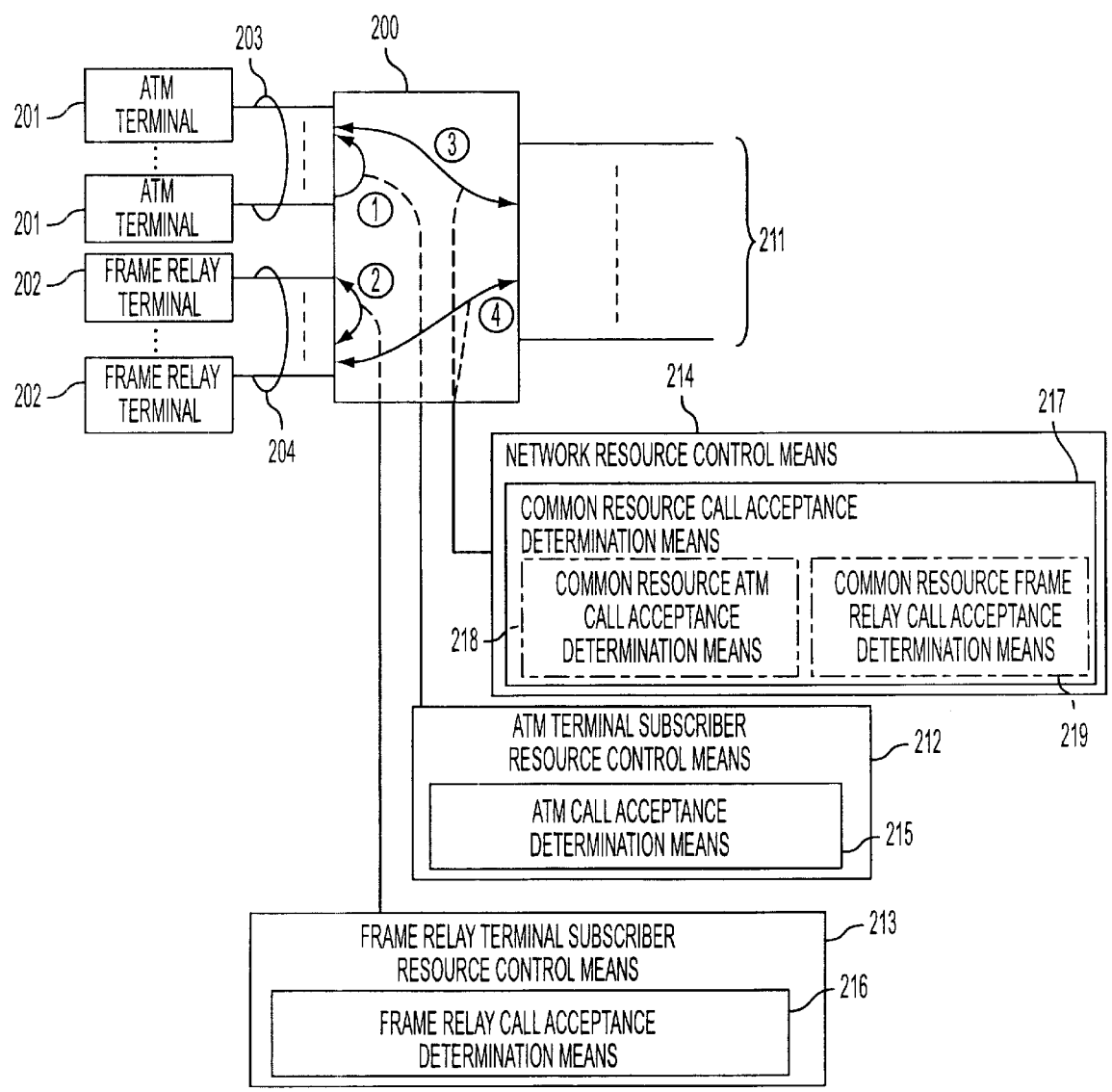

FIG. 4 illustrates a still further aspect of the present invention. Referring to FIG. 4, also in the present aspect of the invention, an ATM exchange 200 handles fixed length cells each including a logic channel information section and a data section and accommodates one or more ATM terminals 201 as first terminals for use with the data communication method by fixed length cells (hereinafter referred to as ATM cells) described hereinabove by way of respective ATM terminal subscriber lines 203 as well as one or more frame relay terminals 202 as second terminals for use with the data communication system by a variable length frame (hereinafter referred to as frame relay packet) including logic channel information by way of respective frame relay terminal subscriber lines 204. However, in the present aspect of the invention, the ATM exchange 200 has a resource (free band) shared commonly by the ATM terminals and the frame relay terminals, and the trunk lines 211 of the ATM exchange 200 are not separated for the ATM terminals and the frame relay terminals.

Further, according to the present aspect of the invention, ATM terminal subscriber resource control means (first terminal subscriber resource control means) 212 for controlling an ATM terminal subscriber access resource (refer to an arrow mark ① in FIG. 4) for a case wherein an ATM call (fixed length cell call) from one of the ATM terminals 201 is inputted to the ATM exchange 200 by way of a corresponding one of the subscriber lines 203 and then sent out to another one of the ATM terminals 201 by way of another one of the subscriber lines 203, frame relay terminal subscriber resource control means (second terminal subscriber resource control means) 213 for controlling a frame relay terminal subscriber access resource (refer to another arrow mark ② in FIG. 4) for a case wherein a frame relay call (frame call) from one of the frame relay terminals 202 is inputted to the ATM exchange 200 by way of one of the subscriber lines 204 and then sent out to another one of the frame relay terminals 202 by way of another one of the subscriber lines 204, and network resource control means 214 for controlling a network common resource (refer to a further arrow mark ③ or ④ in FIG. 4) for a case wherein an ATM call from one of the ATM terminals 201 or a frame relay call from one of the frame relay terminals 202 is inputted to the ATM exchange 200 by way of a corresponding one of the subscriber lines 203, 204 and then sent out to a trunk line 211, are provided.

The ATM terminal subscriber resource control means 212 includes ATM call acceptance determination means (fixed length cell call acceptance determination means) 215 for determining whether or not an ATM call from one of the ATM terminals 201 should be accepted when the ATM terminal 201 tries to use the ATM terminal subscriber access resource while the frame relay terminal subscriber resource control means 213 includes frame relay call acceptance determination means (frame call acceptance determination means) 216 for determining whether or not a frame relay call from one of the frame relay terminals 202 should be accepted when the frame relay terminal 202 tries to use the frame relay terminal subscriber access resource. Further, the network resource control means 214 includes common resource call acceptance determination means 217 for determining whether or not an ATM call from one of the ATM terminals 201 or a frame relay call from one of the frame relay terminals 202 should be accepted when the ATM terminal 201 or the frame relay terminal 202 tries to use the network common resource.

The frame relay call acceptance determination means 216 may include virtual band calculation means for multiplying a use requested band requested to set from one of the frame relay terminals 202 by a predetermined multiplexing rate α to calculate a use virtual band A3 which is controlled by the network, incoming side subscriber line free band detection means for detecting a free band B3 for the incoming side subscriber lines 204 for the frame relay terminal, outgoing side subscriber line free band detection means for detecting a free band C3 for the outgoing side subscriber lines 204 for the frame relay terminal, first comparison means for comparing the use virtual band A3 calculated by the virtual band calculation means and the free band B3 detected by the incoming side subscriber line free band detection means with each other, second comparison means for comparing the use virtual band A3 calculated by the virtual band calculation means and the free band C3 detected by the outgoing side subscriber line free band detection means with each other, and call acceptance means for accepting a frame relay call from one of the frame relay terminals 202 when the result of comparison by the first comparison means is [free band B3 for the incoming side subscriber lines 204 for the frame relay terminal]>[use virtual band A3] and the result of comparison by the second comparison means is [free band C3 for the outgoing side subscriber lines 204 for the frame relay terminal]>[use virtual band A3].

A use requested band requested to set from one of the frame relay terminals 202 may be added as band information to a frame relay call from the frame relay terminal 202 and then transferred to the virtual band calculation means of the frame relay call acceptance determination means 216 together with the frame relay call.

The common resource call acceptance determination means 217 may include virtual band calculation means for multiplying a use requested band requested to set from one of the ATM terminals 201 or from one of the frame relay terminals 202 by a predetermined multiplexing rate β to calculate a use virtual band A4 which is controlled by the network, common resource free band detection means for detecting a free band B4 on the network common resource of the ATM exchange 200, comparison means for comparing the use virtual band A4 calculated by the virtual band calculation means and the free band B4 detected by the common resource free band detection means with each other, and call acceptance means for accepting an ATM call from one of the ATM terminals 201 or a frame relay call from one of the frame relay terminals 202 when the result of comparison by the comparison means is [free band B4 on the network common resource]>[use virtual band A4].

In this instance, the predetermined multiplexing rate β by which a use requested band is multiplied by the virtual band calculation means may have two values set in advance including a first multiplexing rate β1 for a use requested band requested to set from one of the ATM terminals 201 and a second multiplexing rate β2 for another use requested band requested to set from one of the frame relay terminals 202.

Further, a use requested band requested to set from one of the frame relay terminals 202 may be added as band information to a frame relay call from the frame relay terminal 202 and then transferred to the virtual band calculation means of the common resource call acceptance determination means 217 together with the frame relay call.

By the way, the common resource call acceptance determination means 217 may include, as indicated by alternate long and two short dashes lines in FIG. 4, common resource ATM call acceptance determination means (common resource fixed length cell call acceptance determination means) 218 for determining whether or not an ATM call from one of the ATM terminals 201 should be accepted when the ATM terminal 201 tries to use the network common resource, and common resource frame relay call acceptance determination means (common resource frame call acceptance determination means) 219 for determining whether or not a frame relay call from one of the frame relay terminals 202 should be accepted when the frame relay terminal 202 tries to use the network common resource.

In this instance, the common resource frame relay call acceptance determination means 219 may include virtual band setting means for setting, when setting of a frame relay call is requested from one of the frame relay terminals 202, a physical maximum speed (physical line speed) of the frame relay terminal 202 as a use virtual band A5 for the frame relay call, band assurance determination means for determining whether or not a band has been assured already for a same sending subscriber as the frame relay terminal 202 on the network common resource, common resource free band detection means for detecting a free band B5 on the network common resource of the ATM exchange 200, comparison means for comparing the use virtual band A5 set by the virtual band setting means and the free band B5 detected by the common resource free band detection means with each other, and call acceptance means described below.

The call acceptance means employed here accepts, when the band assurance determination means determines that a band has been assured already for the same sending subscriber as the frame relay terminal 202, the frame relay call from the frame relay terminal 202 unconditionally, but assures, when the band assurance determination means determines that no band has been assured as yet for the same sending subscriber as the frame relay terminal 202 and the result of comparison by the comparison means is [free band B5 on the network common resource]>[use virtual band A5], the use virtual band A5, and accepts the frame relay call from the frame relay terminal 202.

The common resource frame relay call acceptance determination means 219 may include virtual band setting means for setting a use requested band requested to set for a frame relay call from one of the frame relay terminals 202 as a use virtual band A6 for the frame relay call, band assurance determination means for determining whether or not a band has been assured already for a same sending subscriber as the frame relay terminal 202 on the network common resource, common resource free band detection means for detecting a free band B6 on the network common resource of the ATM exchange 200, first comparison means for comparing, when the band assurance determination means determines that no band has been assured as yet for the same sending subscriber as the frame relay terminal 202, the use virtual band A6 set by the virtual band setting means and the free band B6 detected by the common resource free band detection means with each other, assured band extraction means for extracting, when the band assurance determination means determines that a band has been assured for the same sending subscriber as the frame relay terminal 202, the assured band a assured already for the frame relay terminal 202, second comparison means for comparing the assured band a extracted by the assured band extraction means and a physical maximum speed of the frame relay terminal 202 with each other, third comparison means for comparing, when the result of comparison by the second comparison means is [assured band a]≦[physical maximum speed of the frame relay terminal 202], a sum a+A6 of the assured band a and the use virtual band A6 requested from the frame relay terminal 202 and the physical maximum speed of the frame relay terminal 202 with each other, remaining available band calculation means for subtracting, when the result of comparison by the third comparison means is [sum a+A6]>[physical maximum speed of the frame relay terminal 202], the assured band a from the physical maximum speed of the frame relay terminal 202 to calculate a remaining available band C6, fourth comparison means for comparing the remaining available band C6 calculated by the remaining available band calculation means and the free band B6 detected by the common resource free band detection means with each other, fifth comparison means for comparing, when the result of comparison by the third comparison means is [sum a+A6]≦[physical maximum speed of the frame relay terminal 202], the use virtual band A6 set by the virtual band setting means and the free band B6 detected by the common resource free band detection means with each other, and call acceptance means described below.

The call acceptance means employed here assures, when the result of comparison by the first comparison means or the fifth comparison means is [free band B6 on the common resource]>[use virtual band A6], the use virtual band A6 and accepts the frame relay call from the frame relay terminal 202, but assures, when the result of comparison by the fourth comparison means is [free band B6 on the common resource]>[remaining available band C6], the remaining available band C6 and accepts the frame relay call from the frame relay terminal 202. However, when the result of comparison by the second comparison means is [assured band a]>[physical maximum speed of the frame relay terminal 202], the call acceptance means accepts the frame relay call from the frame relay terminal 202 unconditionally.

For each of the frame relay terminals 202 connected to the ATM exchange 200 by way of the respective subscriber lines 204, a use band table may be provided for controlling and storing a physical maximum speed (physical line speed) of the frame relay terminal 202 and a sum total of use requested bands which have been requested to set before the present point of time by the frame relay terminal 202, and the assured band extraction means may extract the sum total of the use requested bands of the use band table as the band a assured already for the frame relay terminal 202 whereas the physical maximum speed of the frame relay terminal 202 which is to be used by the second comparison means, the third comparison means and the remaining available band calculation means is read out from the use band table.

Further, a use requested band (A6) requested to set from one of the frame relay terminals 202 may be added as band information to a frame relay call from the frame relay terminal 202 and then transferred to the virtual band setting means of the common resource frame relay call acceptance determination means 219 together with the frame relay call.

In the system described above, the ATM terminal resource and the frame relay terminal resource are set such that they commonly share the resource of the ATM exchange 200, and the ATM terminal subscriber access resource indicated by the arrow mark ① in FIG. 4 and the frame relay terminal subscriber access resource indicated by the arrow mark ② in FIG. 4 are controlled by the ATM terminal subscriber resource control means 212 and the frame relay terminal subscriber resource control means 213, respectively, while the network common resource indicated by the arrow mark ③ or ④ in FIG. 4 is controlled by the network resource control means 214.

Then, when an ATM terminal 201 tries to use the ATM terminal subscriber access resource, the ATM call acceptance determination means 215 determines whether or not the ATM call from the ATM terminal 201 should be accepted, but when a frame relay terminal 202 tries to use the frame relay terminal subscriber access resource, the frame relay call acceptance determination means 216 determines whether or not the frame relay call from the frame relay terminal 202 should be accepted. Further, when an ATM terminal 201 or a frame relay terminal 202 tries to use the network common resource, the common resource call acceptance determination means 217 determines whether or not the ATM call from the ATM terminal 201 or the frame relay call from the frame relay terminal 202 should be accepted.

Also where the resource of the ATM exchange 200 is shared commonly by the ATM terminals and the frame relay terminals, control of the ATM terminal subscriber access resource and call acceptance determination and control of the frame relay terminal subscriber access resource and call acceptance determination are performed individually, but control of the network common resource and call acceptance determination are processed in accordance with an algorithm common to an ATM call from an ATM terminal 201 and a frame relay call of a frame relay terminal 202. Consequently, the ATM terminals 201 and the frame relay terminals 202 can be accommodated into the same ATM exchange 200.

In this instance, the frame relay call acceptance determination means 216 multiplies a use requested band requested to set from one of the frame relay terminals 202 by a predetermined multiplexing rate α to calculate a use virtual band A3 which is controlled by the network, supervises a free band B3 for the incoming side subscriber lines 204 for the frame relay terminal and a free band C3 for the outgoing side subscriber lines 204 for the frame relay terminal, and accepts the frame relay call from the frame relay terminal 202 in the case of [free band B3]>[use virtual band A3] and [free band C3]>[use virtual band A3].

Meanwhile, the common resource call acceptance determination means 217 multiplies a use requested band requested to set from one of the ATM terminals 201 or from one of the frame relay terminals 202 by a predetermined multiplexing rate β (or β1 or β2) to calculate a use virtual band A4 which is controlled by the network, supervises a free band B4 on the network common resource of the ATM exchange 200, and accepts the ATM call from the ATM terminal 201 or the frame relay call from the frame relay terminal 202 in the case of [free band B4]>[use virtual band A4].

The common resource call acceptance determination means 217 may include the common resource ATM call acceptance determination means 218 and the common resource frame relay call acceptance determination means 219 so that call acceptance determination processing may be performed in accordance with separate algorithms for an ATM call from one of the ATM terminals 201 and a frame relay call from one of the frame relay terminals 202 on the network common resource.

In this instance, the common resource frame relay call acceptance determination means 219 sets, when setting of a frame relay call is requested from one of the frame relay terminals 202, a physical maximum speed (physical line speed) of the frame relay terminal 202 as a use virtual band A5 for the frame relay call, supervises a free band B5 on the network common resource of the ATM exchange 200, and accepts, when a band has been assured already for the same sending subscriber as the frame relay terminal 202, the frame relay call from the frame relay terminal 202 unconditionally, but assures, when no band has been assured as yet for the same sending subscriber as the frame relay terminal 202 and the free band B5 is greater than the use virtual band A5, the use virtual band A5 and accepts the frame relay call from the frame relay terminal 202.

Meanwhile, the common resource frame relay call acceptance determination means 219 sets a use requested band requested to set for a frame relay call from one of the frame relay terminals 202 as a use virtual band A6 for the frame relay call, supervises a free band B6 on the network common resource of the ATM exchange 200, and compares, when no band has been assured as yet for the same sending subscriber as the frame relay terminal 202, the use virtual band A6 set by the virtual band setting means and the free band B6 detected by the common resource free band detection means with each other, but extracts, when a band has been assured for the same sending subscriber as the frame relay terminal 202, the assured band $\underline{a}$ assured already for the frame relay terminal 202 and subtracts, in the case of [assured band $\underline{a}$]≦[physical maximum speed of the frame relay terminal 202] and [sum $\underline{a}$+A6]>[physical maximum speed of the frame relay terminal 202], the assured band $\underline{a}$ from the physical maximum speed of the frame relay terminal 202 to calculate a remaining available band C6 and then compares, in the case of [sum $\underline{a}$+A6]≦[physical maximum speed of the frame relay terminal 202], the use virtual band A6 and the free band B6 detected by the common resource empty band detection means with each other.

Then, the common resource frame relay call acceptance determination means 219 may assure, when the result of comparison between the use virtual band A6 and the free band B6 described above is [free band B6]>[use virtual band A6], the use virtual band A6 and accept the frame relay call from the frame relay terminal 202, but assure, in the case of [free band B6]>[remaining available band C6], the remaining available band C6 and accept the frame relay call from the frame relay terminal 202, but accept, in the case of [assured band $\underline{a}$]>[physical maximum speed of the frame relay terminal 202], the frame relay call from the frame relay terminal 202 unconditionally.

Further, where a use band table is provided for each of the frame relay terminals 202 for controlling and storing a physical maximum speed (physical line speed) of the frame relay terminal 202 and a sum total of use requested bands which have been requested to set before the present point of time by the frame relay terminal 202, the sum total of use requested bands of the use band table can be used for the assured band $\underline{a}$ for the frame relay terminal 202, and besides, the physical maximum speed of the frame relay terminal 202 which is required for various comparison processing and for calculation processing of the remaining available band C6 can be read out from the use band table and used for such processing.

Further, where a use requested band requested to set from one of the frame relay terminals 202 is transferred as band information to the frame relay call acceptance determination means 216 or the common resource frame relay call acceptance determination means 219 together with the frame relay call, the user of the frame relay terminal 202 need not any more report a use requested band every time before a call is developed.

With the frame relay exchanging method by an ATM exchange and the frame relay exchanging interface apparatus of the present invention constructed in such a manner as described above, the following effects and/or advantages can be achieved.

1. A frame relay packet having a variable data length can be exchanged at a high speed by the ATM exchange.

2. Since a predetermined corresponding relationship is provided between a used channel number upon communication of a frame relay packet and data link connection identifier information and ATM communication channel identifier information of a destination of transmission, a hard logic routing function can be provided, and when it is tried to accommodate a frame relay terminal into the ATM exchange, assembly and/or disassembly of a cell or routing on hardware for a frame relay packet can be realized readily.

3. Since a cell relay between different ATM exchanges is the same as in ordinary ATM exchange, there is no need of particularly getting aware of a frame relay, and a frame relay terminal can be accommodated into an ATM exchange using an existing ATM technique as it is. Further, a service of accommodating and connecting a frame relay terminal into and to an ATM exchange can be realized as one of services of the ATM exchange.

Further, with the call acceptance determination system for an ATM exchange of the present invention, the following effects and/or advantages can be achieved.

4. By dividing the resource of an ATM exchange simply, control of the ATM terminal resource and call acceptance determination can be processed completely independently of control of the frame relay terminal resource and call acceptance determination, and an ATM terminal and a frame relay terminal can be accommodated very readily into the same ATM exchange and a service of accommodating and connecting a frame relay terminal into and to the ATM exchange can be realized as one of services of the ATM exchange.

5. Since control of the ATM terminal subscriber access resource and call acceptance determination and control of the frame relay terminal subscriber access resource and call acceptance determination are performed by the ATM call acceptance determination means and the frame relay call acceptance determination means, respectively, and control of the network common resource and call acceptance determination are performed by the common resource call acceptance determination means, even where the resource of the ATM exchange is shared commonly for the ATM terminals and the frame relay terminals, an ATM terminal and a frame relay terminal can be accommodated very readily into the same ATM exchange, and a service of accommodating and connecting a frame relay terminal into and to the ATM exchange can be realized as one of services of the ATM exchange.

6. Since a use requested band is added as band information to an ATM call or a frame relay call, a user of a frame relay terminal need not any more report a use requested band every time before a call is developed, and further enhancement in service can be achieved.

7. Since at least one path from a certain frame relay terminal is set on the lines, a band for a physical maximum speed is assured whereas a band higher than the physical maximum speed is not assured, and consequently, a contract for a speed higher than the physical maximum speed can be allowed for each of the frame relay terminals. Then, when a frame relay terminal is accommodated into the ATM exchange so as to offer a frame relay service, a path for the frame relay can be set to the ATM switched network in the same conditions as the existing frame relay services and besides effective utilization of the resource can be realized.

8. Since call acceptance determination processing is performed using the first and second multiplexing rates conforming to characteristics of an ATM call and a frame relay call and the common resource call acceptance determination means is divided into the common resource ATM call acceptance determination means and the common resource frame relay call acceptance determination means, call acceptance determination processing can be performed in accordance with separate algorithms for an ATM call from an ATM terminal and a frame relay call from a frame relay terminal on the network common resource, and by assuring a band for paths for all of the frame relay terminals as a virtual band, effective utilization of the common resource can be realized.

9. By performing call acceptance determination processing such that, when the sum total of use requested bands requested to set from a frame relay terminal before the present point of time is lower than the physical maximum speed, a band is assured with the sum total of use requested bands, but when the sum total of use requested bands exceeds the physical maximum speed, a band is assured with the physical maximum speed, the common resource of the ATM exchange can be utilized further effectively.

10. Since the physical maximum speed and the sum total of use requested bands requested to set before the present point of time are controlled and stored by means of the use band table, the sum total of use requested bands of the use band table can be used as an assured band of the frame relay terminal, and besides, the physical maximum speed of the frame relay terminal which is required for various comparison processing or for calculation processing of a remaining available band can be read out from the use band table and used for such processing. Consequently, control of various data and calculation processing of various means can be performed efficiently.

b. First Embodiment

Figure 5:
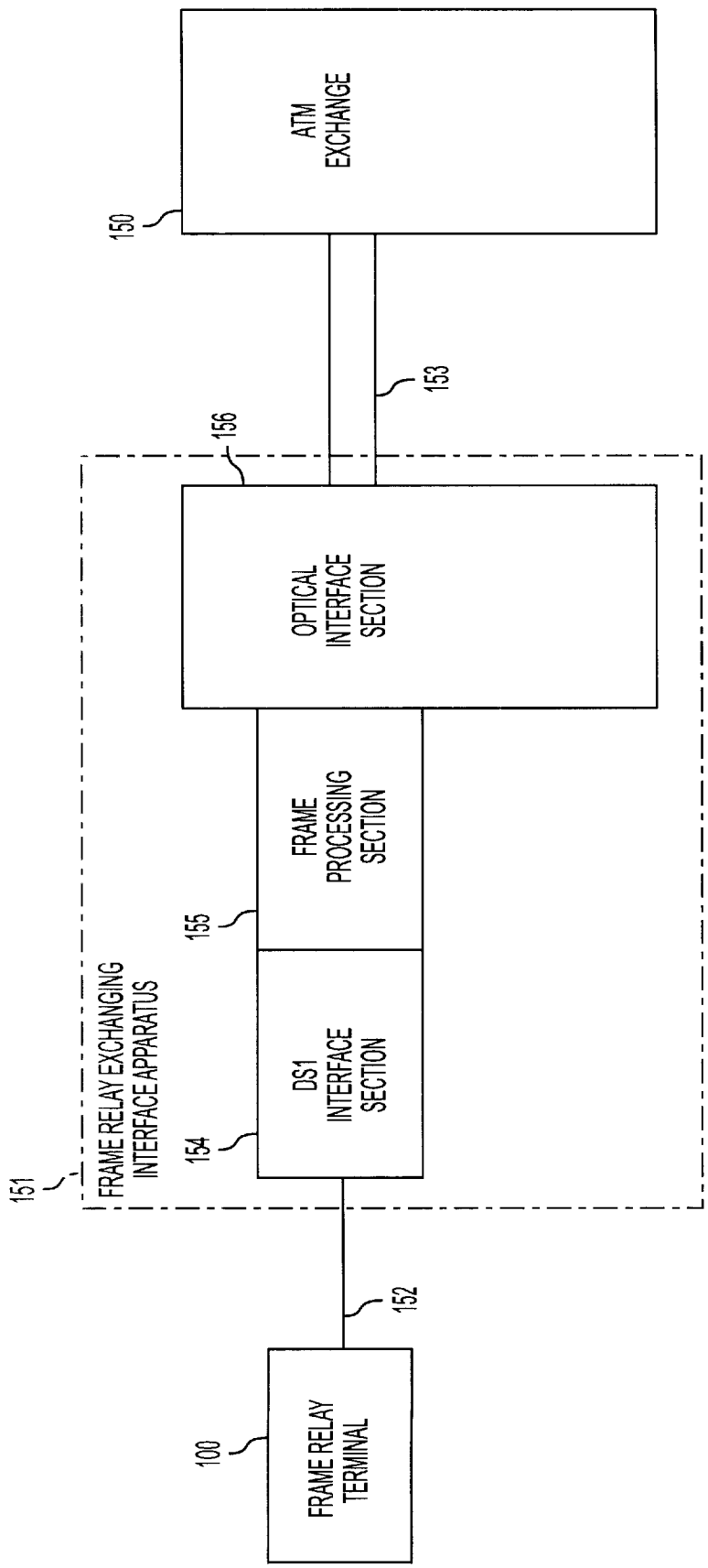
FIG. 5 is a block diagram of a variable length frame exchanging interface apparatus showing a first preferred embodiment of the present invention.

Referring to FIG. 5, there is shown a frame relay exchanging interface apparatus (variable length frame exchanging interface apparatus) according to a first preferred embodiment of the present invention. The variable length frame exchanging interface apparatus (hereinafter referred to as interface unit) 151 is interposed between a frame relay terminal 100 and an ATM exchange 150 which are interconnected by way of subscriber lines (a DS1 line 152 as a digital transmission line and an optical cable 153) having at least one channel. The frame relay terminal 100 is used for a data communication method by a variable length frame (hereinafter referred to as frame relay packet) including logic channel information while the ATM exchange 150 handles fixed length cells (hereinafter referred to as ATM cells) each including a logic channel information section and a data section. The interface unit 151 is thus connected to the frame relay terminal 100 by way of the DS1 line (for example, PCM 24 lines) 152 as a subscriber line and also to the ATM exchange 150 by way of the optical cable 153 as another subscriber line.

The interface unit 151 performs conversion processing between ATM cells for the ATM exchange 150 and a frame relay packet for the frame relay terminal 100 and includes, to this end, a DS1 interface section (line terminating section) 154, a frame processing section 155 and an optical interface section (ATM exchange interface section) 156.

Figure 6:
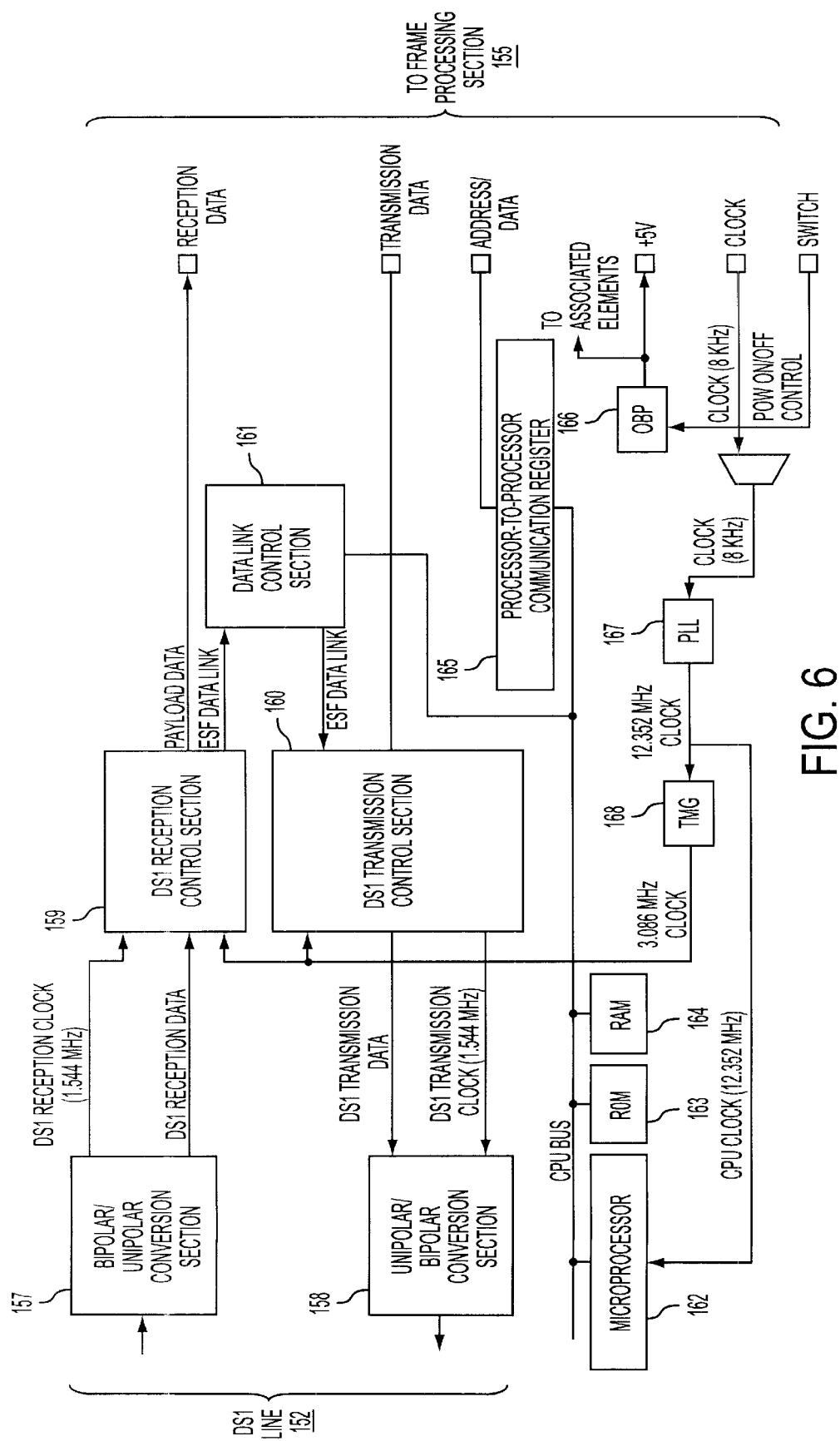
FIG. 6 is a block diagram showing details of a DS1 interface section of the variable length frame exchanging interface apparatus shown in FIG. 5.

The DS1 interface section 154 may be constructed in such a manner as hereinafter described with reference to FIG. 6 and terminates a signal of the DS1 line 152 between the subscriber (frame relay terminal 100) and the interface unit 151. The frame processing section 155 may be constructed in such a manner as hereinafter described with reference to FIG. 7 and extracts, on one hand, a frame from a signal on the DS1 line 152 terminated at the DS1 interface section 154 and converts the frame into ATM cells. On the other hand, the frame processing section 155 extracts a frame from ATM cells and delivers the frame to the DS1 interface section 154. The optical interface section 156 may be constructed in such a manner as hereinafter described with reference to FIG. 8 and terminates a signal of the optical cable 153 between the ATM exchange 150 and the interface unit 151.

The construction of the DS1 interface section 154 will be described in detail below with reference to FIG. 6. The DS1 interface section 154 includes a bipolar to unipolar (bipolar/unipolar) conversion section 157 for converting an electric signal (bipolar signal; a transmission signal from the frame relay terminal 100) on the DS1 line 152 received from the frame relay terminal 100 by way of the DS1 line 152 into an intra-circuit signal (unipolar signal) and extracting a DS1 reception clock signal (of, for example, 1.544 MHz) from the electric signal, and a unipolar to bipolar (unipolar/bipolar) conversion section 158 for converting an intra-circuit signal (unipolar signal) into an electric signal (bipolar signal; a call-in signal to the frame relay terminal 100) on the DS1 line 152 in response to a DS1 transmission clock signal (of, for example, 1.544 MHz) from a DS1 transmission control section 160 which will be hereinafter described.

The DS1 interface section 154 further includes a DS1 reception control section 159 in the form of a transmission receiving processor LSI (TRP LSI) for terminating a reception signal (DS1 reception data, corresponding to a transmission frame relay packet from the frame relay terminal 100) from the bipolar to unipolar conversion section 157 to extract payload data and extracting a control signal (Extended Super Frame DATA Link: ESF data link) on the DS1 line 152.

The DS1 interface section 154 further includes a DS1 transmission control section 160 in the form of a transmission sending processor LSI (TSP LSI) for converting payload data (transmission data) and an ESF data link into a transmission signal of the DS1 format (corresponding to a call-in frame relay packet to the frame relay terminal 100) and controlling transmission of the transmission signal to the frame relay terminal 100 by way of the unipolar to bipolar conversion section 158.

The DS1 interface section 154 further includes a data link control section 161 in the form of an embedded operation channel LSI (EOC LSI) which has a function of extracting a maintenance control information channel (EOC) from an ESF data link, another function of terminating the ESF data link, and a further function of processing various maintenance control information on the maintenance control information channel.

The DS1 interface section 154 further includes a microprocessor 162 for performing detection of a trouble, measurement of a performance and so forth, a ROM 163 in which programs and data necessary to operate the microprocessor 162 are stored, and a RAM 164 for storing variable data to be used by the microprocessor. 162.

The DS1 interface section 154 further includes a processor-to-processor communication register 165 for performing communication with a microprocessor 175 of the frame processing section 155, a power source 166 (On Board Power: OPB) for supplying the power of, for example, +5 V to the circuit components, a phase locked loop (PLL) circuit 167 for producing a CPU clock signal of, for example, 12.352 MHz from a basic clock signal of, for example, 8 kHz, and a timing generator (TMG) 168 for producing a controlling clock signal of, for example, 3.088 MHz from the clock signal of 12.352 MHz from the PLL circuit 167.

Figure 7:
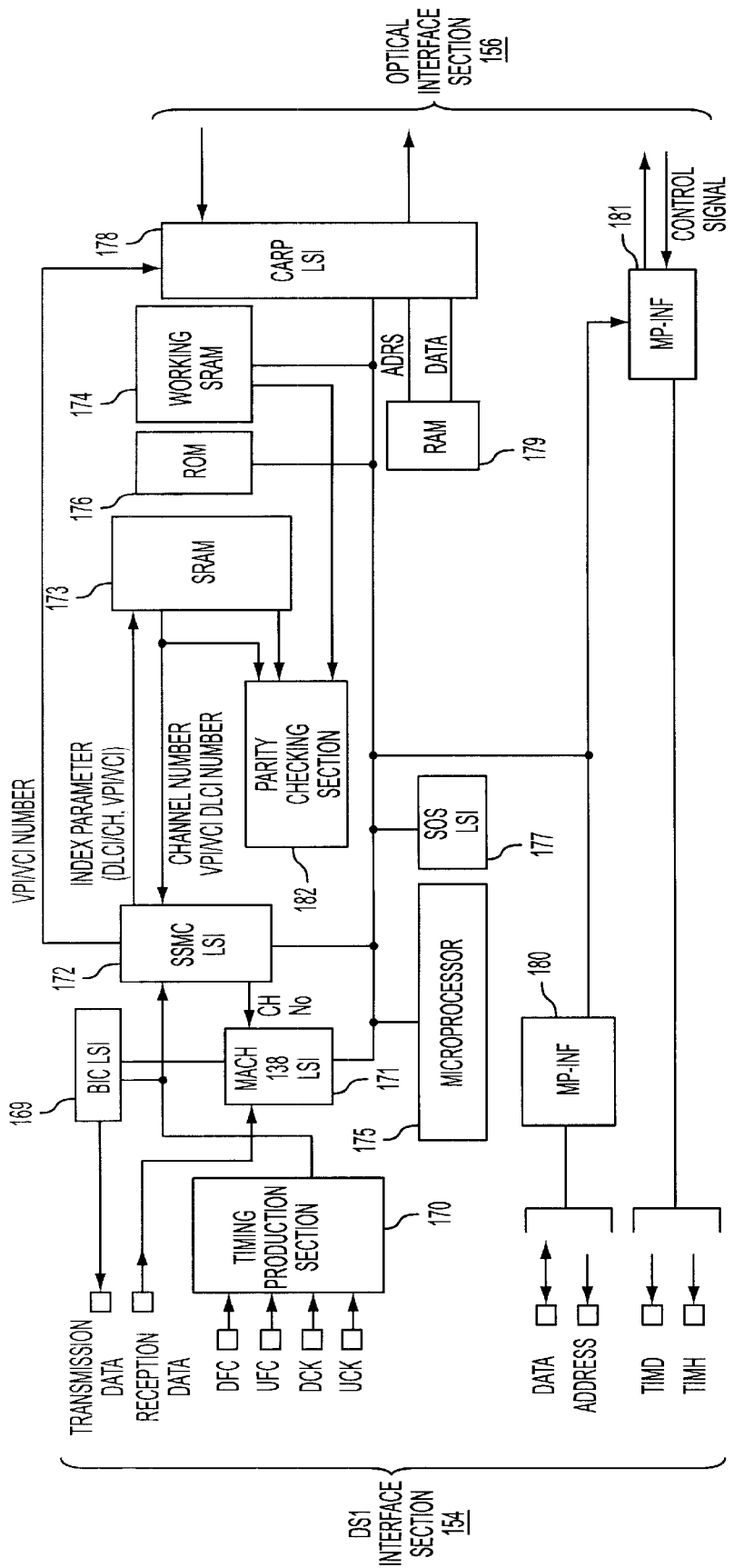
FIG. 7 is a block diagram showing details of a frame processing section of the variable length frame exchanging interface apparatus shown in FIG. 5.

The construction of the frame processing section 155 is shown in more detail in FIG. 7. Referring to FIG. 7, the frame processing section 155 includes a transmission data conversion section 169 in the form of a BIC LSI for converting data of, for example, 3.088 MHz into data of, for example, 1.544 MHz in the transmission direction of the frame processing section 155, that is, in the direction in which a call-in frame relay packet is transmitted to the frame relay terminal 100, and a timing production section 170 for generating a timing signal (Upward Timing: UTG) necessary for a media conversion section 171 and a data control section 172, which will be hereinafter described, from a clock signal of 1.544 MHz synchronized with a PCM link and for generating another timing (Downward Timing: DTG) signal necessary for the media conversion section 171 and the data control section 172 from a clock signal of 3.088 MHz synchronized with the optical interface.

The media conversion section 171 in the form of MACH 138 LSI functions as frame relay packet production means (refer to reference numeral 111 in FIG. 1 and 131 in FIG. 2) and call-in frame relay packet disassembling means (refer to reference numeral 124 in FIG. 1 and 138 in FIG. 2) in the present invention.

In particular, the media conversion section 171 has a function as frame relay packet production means 171A (refer to FIG. 9) of extracting and producing a transmission frame relay packet (frame of the LAP-F) from data (reception data at the interface unit 151) for 24 channels from the DS1 interface section 154 in response to channel number control information obtained by the data control section 172 which will be hereinafter described, and another function as call-in frame relay packet disassembling means 171B (refer to FIG. 10) of disassembling data (transmission data to the interface unit 151) from a cell assembling/disassembling section 178, which will be hereinafter described, into a call-in frame relay packet in response to channel number control information obtained by the data control section 172, which will be hereinafter described, and inserting the reception frame relay packet into a particular channel.

The data control section 172 in the form of an SSMC LSI functions as channel number to virtual path identifier information conversion means (refer to reference numeral 112 in FIG. 1 and 132 in FIG. 2), data link connection identifier information to virtual channel identifier information conversion means (refer to reference numeral 113 in FIG. 1 and 133 in FIG. 2). virtual path identifier Information to channel number conversion means (refer to reference numeral 123 in FIG. 1 and, 137 in FIG. 2) and virtual channel identifier information conversion means to data link connection identifier information conversion means (refer to reference numeral 122 in FIG. 1 and 136 in FIG. 2) in the present invention.

The data control section 172 controls allocation information of a channel number or numbers, a DLCI number and VPI (virtual path identifier information)/VCI (virtual channel identifier information) and accesses an SRAM 173, which will be hereinafter described, to obtain various information (a channel number or numbers, a DLCI number, a VPI and a VCI) which is to be added to data.

Accordingly, the data control section 172 has a function as channel number to VPI conversion means of accessing the SRAM 173 to convert a channel number or numbers (1 to 24) of the DS1 line 152, which have been used upon transmission of a transmission frame relay packet from the frame relay terminal 100) into a VPI, another function as DLCI to VCI conversion means of accessing the SRAM 173 to convert a DLCI added to the transmission frame relay packet into a VCI, a further function as VCI to DLCI conversion means of accessing the SRAM 173 to convert a VCI added to each ATM cell from the optical interface section 156 into a DLCI, and a still further function of the VPI to channel number conversion means of accessing the SRAM 173 to convert a VPI added to each ATM cell from the optical interface section 156 into a channel number or numbers of the DS1 line 152 available upon transmission to the frame relay terminal 100.

A VPI and a VCI obtained by conversion of a channel number or numbers and a DLCI, respectively, by the data control section 172 are added as routing information (ATM communication channel identifier information) to each ATM cell by the cell assembling/disassembling section 178 which will be hereinafter described. Meanwhile, a DLCI obtained by conversion of the VCI by the data control section 172 is added to a call-in frame relay packet to the frame relay terminal 100. Further, a channel number or numbers obtained by conversion of the VPI by the data control section 172 are used as information of a particular channel or channels into which the call-in frame relay packet after disassembled is to be inserted by the media conversion section 171 (call-in frame relay packet disassembling means 171B).

The SRAM 173 functions as first storage means (refer to reference numerals 115 and 125 in FIG. 1 and reference numeral 139 in FIG. 2) and second storage means (refer to reference numerals 116 and 126 and reference numeral 140 in FIG. 2) in the present invention. The SRAM 173 stores such channel number control information and mutual relationships (tables) among VPI information, VCI information, DLCI information and channel numbers as will be hereinafter described with reference to FIGS. 11 to 13.

In particular, the SRAM 173 stores in advance a first relationship between VPI information and channel numbers of the DS1 line 152 which is accessed from the channel number to VPI conversion means and the VPI to channel number conversion means of the data control section 172 and used between the frame relay terminal 100 and the ATM exchange 150, and a second relationship between VCI information and DLCI information which is accessed from the DLCI to VCI conversion means and the VCI to DLCI conversion means of the data control section 172 and is to be added to a frame relay packet.

Figures 13, 14:
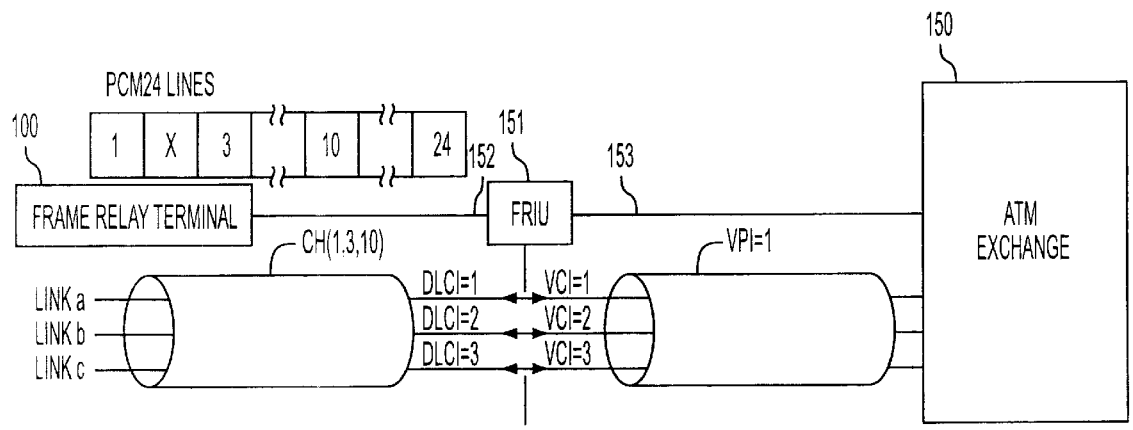
FIG. 13 is a table illustrating a mapping relationship between a DLCI and a VCI in the variable length frame exchanging interface apparatus shown in FIG. 5.
FIG. 14 is a diagrammatic view illustrating a mapping relationship between a link (channel number/DLCI) of a frame relay and communication channel identifier information (VPI/VCI) of an ATM cell in the variable length frame exchanging interface apparatus shown in FIG. 5.

The first and second relationships (mapping relationships) stored in the SRAM 173 may be such tables (conversion tables) as illustrated in FIGS. 11 or 12 and 13.

Referring first to FIG. 11, in the table shown, a relationship between the channel number and the DLCI number is allocated in a fixed logical relationship to the VPI number and the VCI number. In particular, when a channel number/

DLCI is to be converted into a VPI/VCI, such a fixed logic is applied that, when a frame relay packet is to be communicated with the frame relay terminal 100, the lowest one (lowest channel number: LCH) of the channel numbers (1 to 24) of the DS1 line 152 is used as a VPI number while a DLCI number is used as it is as a VCI number. On the contrary when a VPI/VCI is to be converted into a channel number/DLCI, such a fixed logic is applied that a channel number group in which the VPI is included as the lowest number is read out as a channel number (1 to 24) group of the DS1 line 152 while a VCI number is used as it is as a DLCI number.

More particularly, as seen from FIG. 11, for a frame relay packet transmitted from the frame relay terminal 100 using one of the channel numbers 1, 5, 10 and 13 of the DS1 line 152, the lowest number 1 among the channel numbers is used as a VPI after disassembly into ATM cells. On the other hand, for a frame relay packet transmitted using one of the channel numbers 3, 7 and 12, the lowest number 3 among the channel numbers is used as a VPI. Further, the DLCI number 1, 4, 5 or 9, or 4 or 10 applied to the frame relay packet and designating the other party is used as it is as a VCI.

On the contrary, for ATM cells received from the ATM exchange 150 and designating the frame relay terminal 100 as a destination of transmission, if the VPI number is 1 or 3, then the group of channel numbers 1, 5, 10 and 13 or 3, 7 and 12 in which the VPI number is included as the lowest number is read out from the table shown in FIG. 11, and the channel number group is used as information of a particular channel which is to be inserted into a reception frame relay packet after disassembly by the media conversion section 171 (call-in frame relay packet disassembling means 171B) as described hereinabove. Meanwhile, the VCI number 1, 4, 5 or 9, or 4 or 10 applied to the ATM cell is used as it is as a DLCI.

Meanwhile, in the tables shown in FIGS. 12 and 13, such a fixed logic as described hereinabove with reference to FIG. 11 is not used, but a table (conversion table) which depends upon an arbitrary corresponding relationship is set suitably in advance. In particular, as seen from FIG. 12, the lowermost number of a channel number group of the DS1 line 152 which is used upon communication of a frame relay packet with the frame relay terminal 100 corresponds in a one-by-one corresponding relationship to a VPI number of ATM cells, and as seen in FIG. 13, a DLCI number to be applied to a frame relay packet and a VCI number of ATM cells correspond in a one-by-one corresponding relationship to each other.

Such a table as shown in FIG. 11 or such tables as shown in FIGS. 12 and 13 are stored in advance in the SRAM 173, and in response to an access from the data control section 172 described hereinabove, such a corresponding relationship as described hereinabove is read out, and conversion between a channel number group and a VPI number and conversion between a DLCI and a VCI are performed. Such a corresponding relationship (mapping relationship) in the first embodiment as described above is conceptively illustrated in FIG. 14. As seen from FIG. 14, a DLCI (logic link of the LAP-F) of a frame relay and a VCI in ATM exchange are mapped in a one-by-one corresponding relationship, and a channel number group on the DS1 (PCM24) line 152 used as a frame relay corresponds to a VPI in ATM exchange and the lowest number in the channel number group is mapped in a one-by-one corresponding relationship to a VPI.

Figure 9:
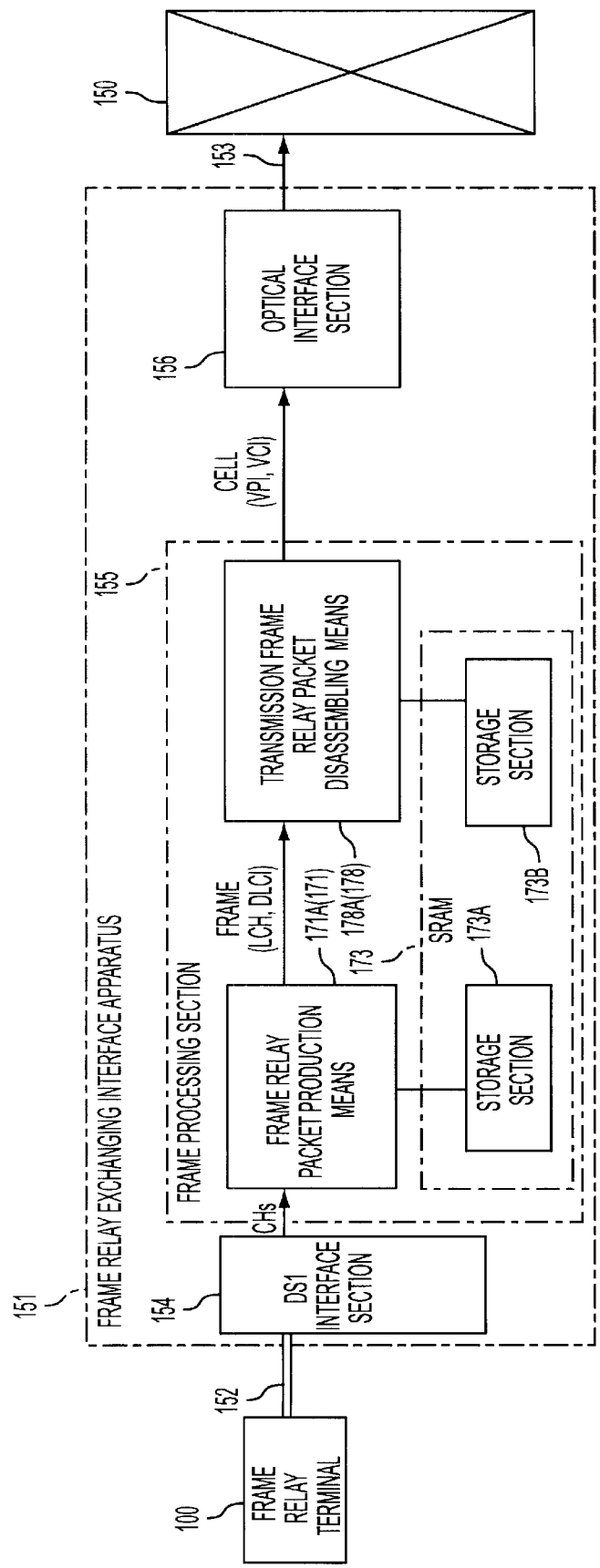
FIG. 9 is a block diagram functionally illustrating those elements of the variable length frame exchanging interface apparatus shown in FIG. 5 which perform their processing functions upon transmission of data from a frame relay terminal to an ATM network.
Figure 10:
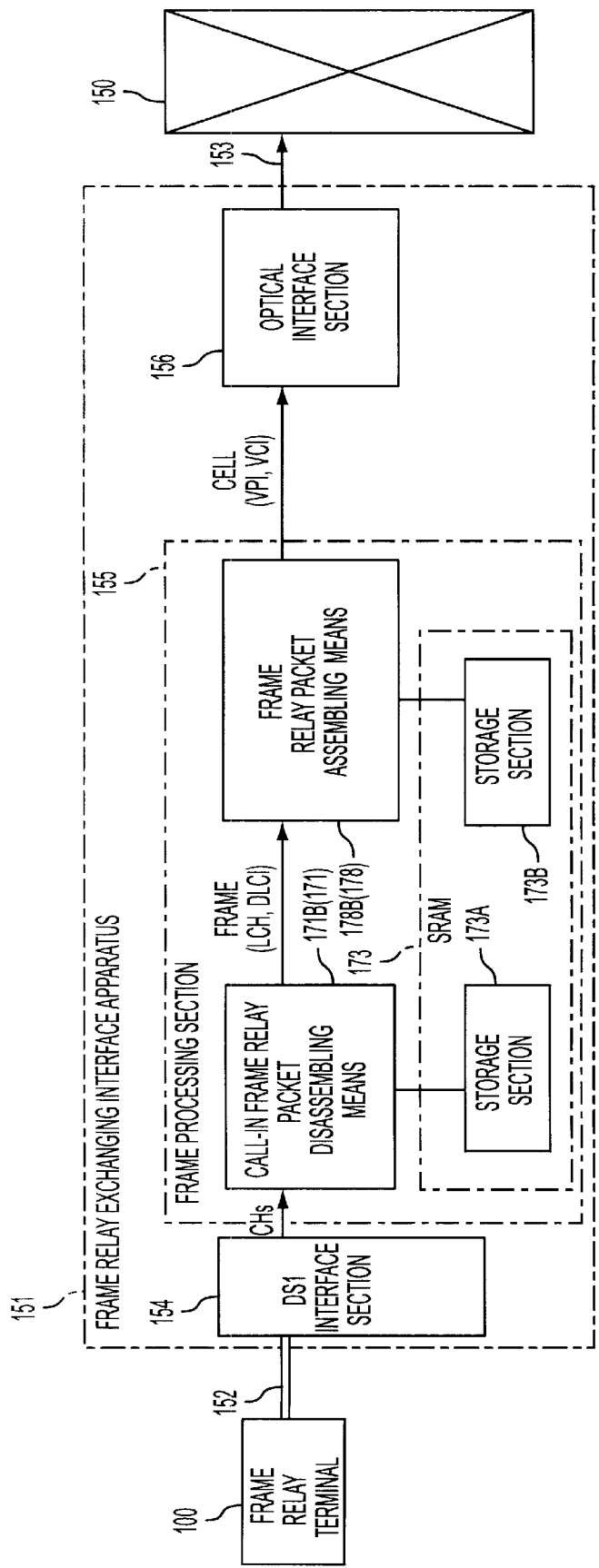
FIG. 10 is a block diagram functionally illustrating those elements of the variable length frame exchanging interface apparatus shown in FIG. 5 which performs their processing functions upon transmission of data from the ATM network to a frame relay terminal.
Figures 15, 16, 17:
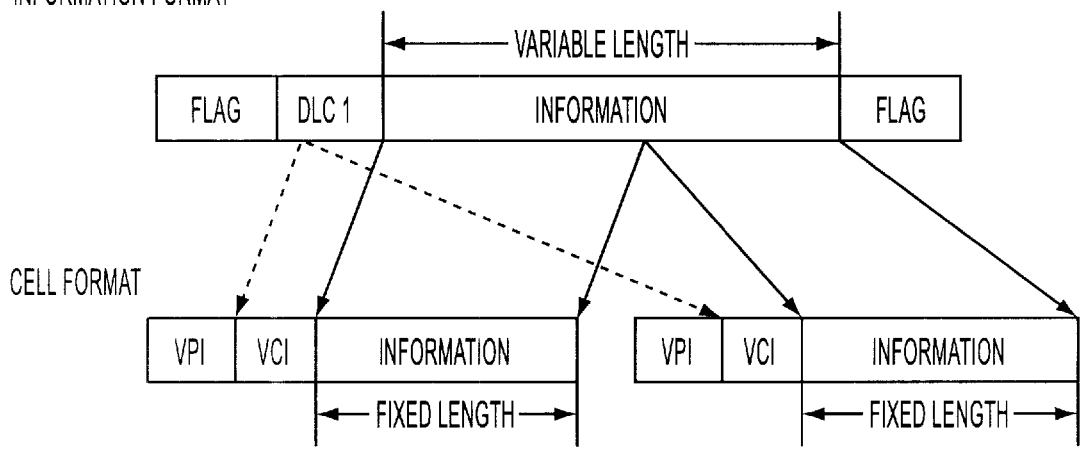
FIG. 15 is a diagrammatic view illustrating a relationship between a frame relay packet and an ATM cell in the variable length frame exchanging interface apparatus shown in FIG. 5.
FIG. 16 is a table showing a memory for controlling a channel combination pattern and illustrating operation of the variable length frame exchanging interface apparatus shown in FIG. 5.
FIG. 17 is a table showing a memory for controlling a relationship between a frame and a cell and illustrating operation of the variable length frame exchanging interface apparatus shown in FIG. 5.

Referring to FIGS. 9 and 10, a storage section 173A in the SRAM 173 stores a channel number group on the DS1 line 152, that is, a combination pattern of channels in advance and provides channel number control information to the media conversion section 171 in response to an access thereto from the data control section 172. Meanwhile, another storage section 173B in the SRAM 173 stores in advance the first and second corresponding relationships (such a one-by-one corresponding relationship between a lowest channel number and a VPI number as illustrated in FIG. 17 and another one-by-one corresponding relationship between a DLCI number and a VCI number) based on, for example, such a fixed logic as described hereinabove with reference to FIG. 11, and provides such corresponding relationship information to the cell assembling/disassembling section 178 in response to an access thereto from the data control section 172. It is to be noted the data control section 172 is omitted in FIGS. 9 and 10.

Referring back to FIG. 7, the frame processing section 155 further includes a working SRAM 174, a microprocessor 175 for controlling (detection of a trouble, processing control and so forth) of the component LSIs (refer to reference numerals 169, 171 and 172), a ROM 176 in which programs and data necessary to operate the microprocessor 175 are stored, and an LSI control section (SOS LSI) 177 for controlling the component LSIs (refer to reference numerals 169, 171 and 172) together with the microprocessor 175.

The frame processing section 155 further includes the cell assembling/disassembling section (cell assembly re-assembly processor LSI; CARP LSI) 178 which functions as transmission frame relay packet disassembling means (refer to reference numeral 114 in FIG. 1 and 134 in FIG. 2) and frame relay packet composition means (refer to reference numeral 121 in FIG. 1 and 135 in FIG. 2) in the present invention.

In particular, the cell assembling/disassembling section 178 has a transmission processing function of converting a signal (transmission frame relay packet) from the DS1 interface section 154 stored in a RAM 179. which will be hereinafter described, into ATM cells and transferring the ATM cells to the optical interface section 156, that is, a function as transmission frame relay packet disassembling means 178A (refer to FIG. 9) of disassembling a transmission frame relay packet into ATM cells to which a VPI and a VCI obtained by the data control section 172 are added and sending out the ATM cells to the ATM exchange 150, and another reception processing function of fetching call-in data (ATM cells) from the ATM exchange 150 stored in the RAM 179 by a DMA (Direct Memory Accessing) operation and transferring the data after production of a format to the DS1 interface section 154 by way of the media conversion section 171, that is, a function as frame relay packet assembling means 178B (refer to FIG. 10) of assembling a call-in frame relay packet in response to ATM cells from the ATM exchange 150 designating the frame relay terminal 100 as a destination of transmission.

The frame processing section 155 further includes the RAM 179 controlled by the cell assembling/disassembling section 178 for temporarily storing cells upon processing by the cell assembling/disassembling section 178 and converting the speed between the DS1 line 152 and the cells, a pair of microprocessor interface sections (MP-INF) 180 and 181 for communicating control information between the microprocessor 162 of the DS1 interface section 154 and another microprocessor (not shown) of the optical interface section 156, and a parity checking section 182 for checking the parity of data of the SRAM 173 or the working SRAM 174.

Figure 8:
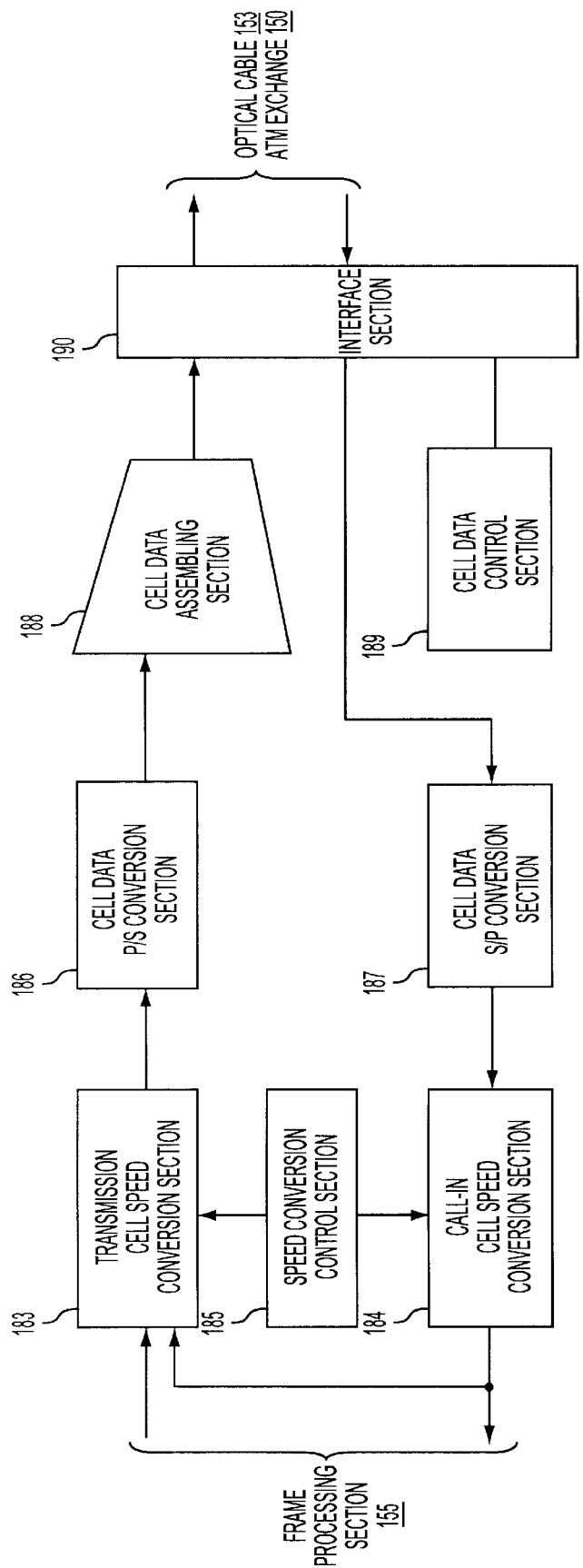
FIG. 8 is a block diagram showing details of an optical interface section of the variable length frame exchanging interface apparatus shown in FIG. 5.

A detailed construction of the optical interface section 156 is shown in FIG. 8. Referring to FIG. 8, the optical interface section 156 includes a transmission cell speed conversion section 183 in the form of a FIFO (first-in first-out) memory for controlling the conversion of the speed of ATM cells from the frame processing section 155, a call-in cell speed conversion section 184 also in the form of a FIFO memory for controlling the conversion of the speed of ATM cells to the frame processing section 155, and a speed conversion control section 185 for generating a timing signal in accordance with which communication and cell control by the transmission cell speed conversion section 183 and the call-in cell speed conversion section 184 are to be performed.

The optical interface section 156 further includes a cell data parallel to serial (parallel/serial) conversion section 186 for converting ascending cell data (a parallel signal) from the transmission cell speed conversion section 183 into a serial signal with a basic clock signal (for example, of 8 MHz) of an interface section 190 which will be hereinafter described, and a cell data serial to parallel (serial/parallel) conversion section 187 for converting descending cell data (a serial signal) from the interface section 190 into a parallel signal.

The optical interface section 156 further includes a cell data assembling section 188 for converting a cell signal from the cell data parallel to serial conversion section 186 into a signal of a format of the interface section 190, a cell data control section 189 for controlling a synchronizing clock signal of a cell signal of the interface section 190, and the interface section 190 for converting an electric signal from the cell data assembling section 188 into an optical signal and sending out the optical signal to the optical cable 153 and for converting an optical signal transmitted thereto from the ATM exchange 150 by way of the optical cable 153 into an electric signal and sending out the electric signal to the cell data serial to parallel conversion section 187.

Subsequently, operation of the interface unit 151 of the first embodiment having such construction as described above, that is, a frame relay conversion method by the ATM exchange according to the present invention, will be described.

First, transmission of a frame relay packet from the frame relay terminal 100 to the ATM exchange 150 will be described.

A transmission frame relay packet transmitted from the frame relay terminal 100 by way of the DS1 line 152 is terminated by the DS1 interface section 154 of the interface unit 151. In particular, an electric signal (bipolar signal) on the DS1 line 152 transmitted from the frame relay terminal 100 is converted into an intra-circuit signal (unipolar signal) by the bipolar to unipolar conversion section 157 and is then terminated by the DS1 reception control section 159 to extract payload data, which are sent to the frame processing section 155.

In the frame processing section 155, from the data for 24 channels from the DS1 interface section 154, a transmission frame relay packet (a frame of the LAP-F) is extracted and generated by the media conversion section 171 (frame relay packet production means 171A in FIG. 9) in response to channel number control information obtained by the data control section 172.

In particular, a transmission frame relay packet of the LAP-F is produced by the frame relay packet production means 171A from the data transmitted from the frame relay terminal 100 by way of a plurality of channels of the DS1 line 152 in accordance with a combination table (refer to, for example, FIG. 16) of channel number groups registered in the storage section 173A of the SRAM 173 in advance.

In this instance, the data control section 172 extracts the lowest channel number (LCH) from the combination in the channel number group and uses the lowest channel number as a VPI for conversion into ATM cells in accordance with the corresponding relationship (refer to, for example, FIG. 17) registered in the storage section 173B of the SRAM 173 in advance (a function of conversion from a channel number or numbers into a VPI).

Meanwhile, the format of the transmission frame relay packet produced by the frame relay packet production means 171A is such as illustrated in FIG. 15 wherein a flag (01111110) is provided at the top and the end of the transmission frame relay packet and a DLCI for identification of a destination of transmission is set subsequently to the flag at the top, and variable length information is disposed subsequently to the DLCI. The data control section 172 obtains such DLCI information from the transmission frame relay packet of the format described above, reads out a VCI corresponding to the DLCI information from the table registered in advance in the SRAM 173 and applies the VCI upon conversion into an ATM cell (a function of conversion from a DLCI to a VCI).

The transmission frame relay packet produced by the frame relay packet production means 171A of the media conversion section 171 is stored once into the RAM 179, then disassembled, by the cell assembling/disassembling section 178 (transmission frame relay packet disassembling means 178A of FIG. 9), into ATM cells to each of which the VPI and the VCI from the data control section 172 have been applied, and then transferred to the optical interface section 156.

In this instance, in the transmission frame relay packet disassembling means 178A, using a buffer memory or the like, the variable length information in the transmission frame relay packet is disassembled by 48 octets of a fixed length (corresponding to the length of the information section of the ATM cell) as illustrated in FIG. 15, and simultaneously, the VPI and the VCI from the data control section 172 which make routing information for the ATM exchange 150 are placed into the header of 5 octets of each ATM cell. The transmission frame relay packet is decomposed into a plurality of ATM cells having information of 48 octets as seen in FIG. 15 in this manner, and a header of 5 octets in which the same VPI and VCI are disposed is added to the top of each ATM cell. Such ATM cells are successively sent out to the optical interface section 156.

In the optical interface section 156, each ATM cell from the frame processing section 155 is controlled by speed conversion control by the transmission cell speed conversion section 183 which operates in response to a timing signal from the speed conversion control section 185, and then converted into a serial signal with a basic clock signal of the interface section 190 by the cell data parallel to serial conversion section 186.

The cell data after conversion into a serial signal are converted into data of the format of the interface section 190 by the cell data assembling section 188 and then converted into an optical signal by the interface section 190, and the optical signal is sent out to the ATM exchange 150 by way of the optical cable 153.

Consequently, the frame relay packet from the frame relay terminal 100 is exchanged as ATM cells by the ATM exchange 150 in accordance with the VPI and the VCI as routing information.

On the other hand, when ATM cells designating the frame relay terminal 100 as a destination of transmission is received from the ATM exchange 150 by way of the optical cable 153, each of the ATM cells is terminated by the optical interface section 156 of the interface unit 151. In particular, each ATM cell is converted from an optical signal into an electric signal by the interface section 190, converted into a parallel signal by the cell data serial to parallel conversion section 187, controlled by speed conversion control by the call-in cell speed conversion section 184 which operates in response to a timing signal from the speed conversion control section 185, and then sent to the frame processing section 155.

In the frame processing section 155, call-in data (ATM cells) from the optical interface section 156 are stored once into the RAM 179 and then fetched by a DMA operation by the cell assembling/disassembling section 178 (call-in frame relay packet assembling means 178B of FIG. 9), in which they are assembled into a call-in frame relay packet. The call-in frame relay packet is transferred to the media conversion section 171.

In this instance, the data control section 172 refers to the storage section 173B of the SRAM 173 in response to the VPI and the VCI applied to each of the ATM cells to read out the lowest channel number (refer to FIG. 17) corresponding to the VPI (a function of conversion from a VPI into a channel number or numbers) and also read out a DLCI number corresponding to the VCI (another function of conversion from a VCI into a DLCI).

Subsequently, the media conversion section 171 reads out a channel number group (channel control information) corresponding to the lowest channel number obtained by conversion of the VPI from the storage section 173A of the SRAM 173, and then, the media conversion section 171 (call-in frame relay packet disassembling means 171B of FIG. 9) adds the DLCI from the data control section 172 to the reception frame relay packet to the frame relay terminal 100, disassembles and inserts the reception frame relay packet into the channel number group from the data control section 172 and sends the resulted data to the DS1 interface section 154.

The DS1 interface section 154 converts the payload data (transmission data) and the ESF data link from the frame processing section 155 into data of the DS1 format by the DS1 transmission control section 160, and the unipolar to bipolar conversion section 158 converts the intra-circuit signal (unipolar signal) into an electric signal (bipolar signal) for the DS1 line 152 in response to a DS1 transmission clock signal (for example, 1.544 MHz) from the DS1 transmission control section 160 and transmits the electric signal to the frame relay terminal 100.

In this manner, according to the first embodiment, a frame relay packet having a variable data length can be exchanged at a high speed by the ATM exchange 150.

Further, where a fixed logical or arbitrary corresponding relationship (mapping relationship) is provided between a used channel number or numbers and a DLCI number of a destination of transmission upon communication of a frame relay packet and a VPI and a VCI which are routing information in ATM exchange, a hard logic routing function can be provided.

Accordingly, when the frame relay terminal 100 is to be accommodated into the ATM exchange 150, assembling/disassembling of cells or routing by hardware can be realized readily for a frame relay packet.

Further, where such a fixed logic as described hereinabove is employed, allocation processing between a channel number or numbers and DLCI and ATM communication channel identifier information (routing information) is simplified and the cost for hardware can be reduced.

Further, since a cell relay between the ATM exchange 150 and another ATM exchange is the same as in ordinary ATM exchange, there is no need of particularly getting aware of a frame relay, and the frame relay terminal 100 can be accommodated into the ATM exchange 150 using the existing ATM technique as it is and a service of accommodating and connecting the frame relay terminal 100 into and to the ATM exchange 150 can be realized as one of services of the ATM exchange.

It is to be noted that, while the interface unit 151 in the first embodiment is described such that it has a transmission processing function (refer to FIG. 9) of disassembling a frame relay packet from the frame relay terminal 100 into ATM cells and transmitting the ATM cells to the ATM exchange 150 and another call-in processing function (refer to FIG. 10) of assembling ATM cells from the ATM exchange 150 into a frame relay packet and sending the frame relay packet to the frame relay terminal 100, two separate frame relay exchanging interface apparatus having only different ones of the two functions from each other may be constructed alternatively. Also in this instance, similar effects to those of the embodiment described above can be achieved. In this instance, however, on the transmission side of a frame relay packet, an interface apparatus having such a construction as shown in FIG. 9 (or the apparatus 110 shown in FIG. 1) is provided, and on the call-in side of the frame relay packet, another interface apparatus having such a construction as shown in FIG. 10 (or the apparatus 120 shown in FIG. 1) is provided.

c. Second Embodiment

Figure 18:
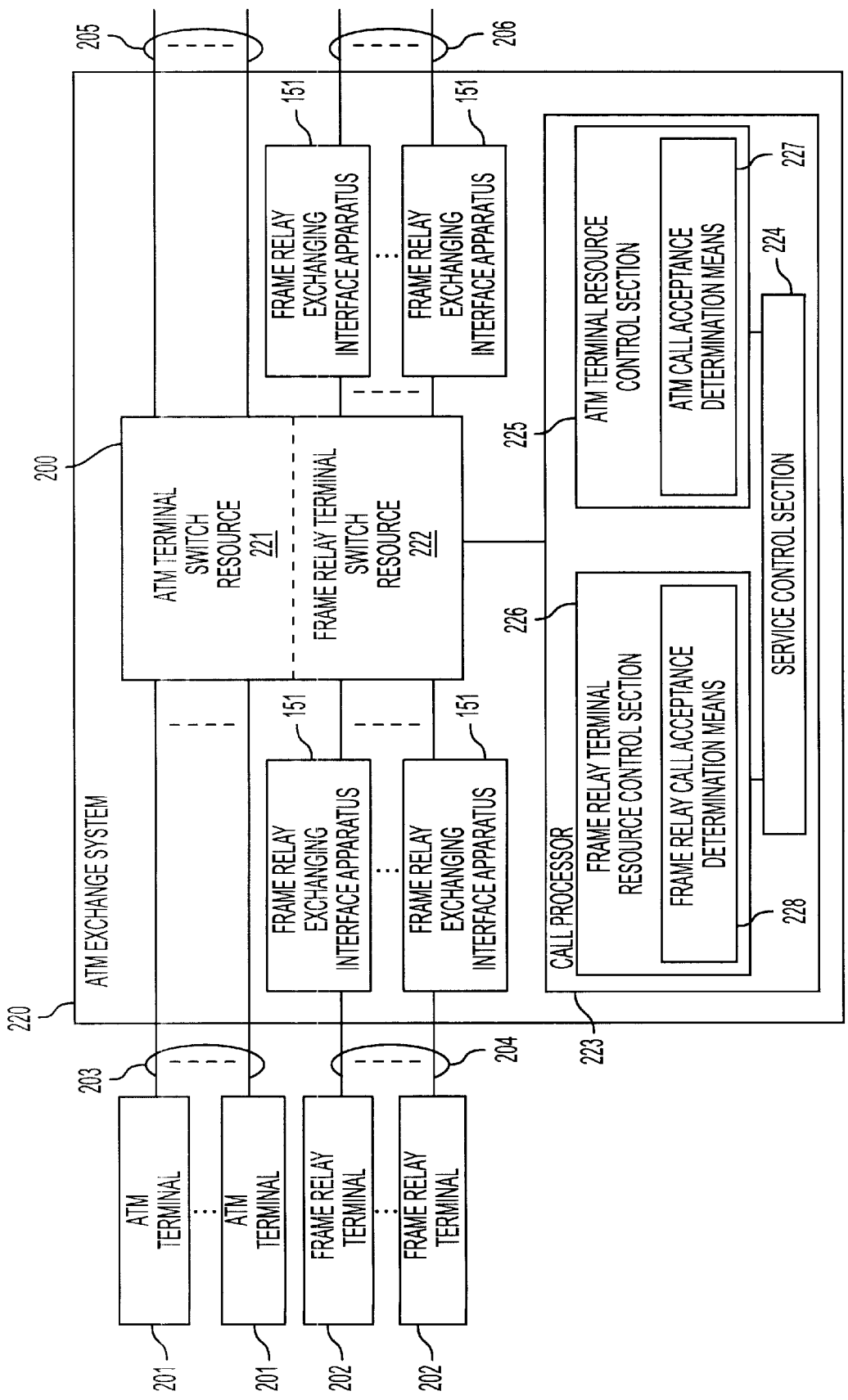
FIG. 18 is a block diagram of an ATM exchange system showing a second preferred embodiment of the present invention.

Referring now to FIG. 18, there is shown an ATM exchange system as a second preferred embodiment of the present invention. The ATM exchange system shown is generally denoted at 220 and includes an ATM exchange 200 which handles fixed length cells each including a logic channel information section and a data section and accommodates a plurality of ATM terminals 201 as first terminals for use with a data communication method by fixed length cells (hereinafter referred to as ATM cells) by way of respective ATM terminal subscriber lines 203 and further accommodates a plurality of frame relay terminals 202 as second terminals for use with another data communication method by a variable length frame (hereinafter referred to as frame relay packet) including logic channel information by way of respective frame relay terminal subscriber lines 204.

The resource (free band) of the ATM exchange 200 is set divided physically completely separately into an ATM terminal switch resource 221 and a frame relay terminal switch resource 222. Accordingly, also trunk circuits of the ATM exchange 200 are completely separated into ATM terminal trunk lines 205 and frame relay terminal trunk lines 206.

It is to be noted that such an interface unit 151 as described hereinabove in connection with the first embodiment is interposed in each of the frame relay terminal subscriber lines 204 and the frame relay terminal trunk lines 206 so that, by way of such interface unit 151, a frame relay packet from the corresponding frame relay terminal 202 is converted into ATM cells and inputted to the ATM exchange 200 or ATM cells from the ATM exchange 200 are converted into a frame relay packet and sent out to the frame relay terminal 202.

The ATM exchange system 220 further includes a call processor 223 for controlling processing of a call by the ATM exchange 200. The call processor 223 includes a service control section 224 serving as call processing software for performing band control, an ATM terminal resource control section 225 and a frame relay terminal resource control section 226.

The service control section 224 performs a service analysis, numeric interpretation and path control. The ATM terminal resource control section 225 and the frame relay terminal resource control section 226 control (catch/release) the ATM terminal switch resource 221 and the frame relay terminal switch resource 222, respectively.

The ATM terminal resource control section 225 includes ATM call acceptance determination means 227 for determining whether or not an ATM call from an ATM terminal 201 is to be accepted when the ATM terminal 201 tries to use the ATM terminal switch resource 221. The frame relay terminal resource control section 226 includes frame relay call acceptance determination means 228 for determining whether or not a frame relay call from a frame relay terminal 202 is to be accepted when the frame relay terminal 202 tries to use the frame relay terminal switch resource 222.

For the ATM call acceptance determination means 227, a known system disclosed, for example, in Japanese Patent Laid-Open Application No. Heisei 4-240683 ("Call Acceptance Determination System for an ATM Exchange") can be used as it is, and accordingly, detailed description thereof is omitted herein.

Figure 19:
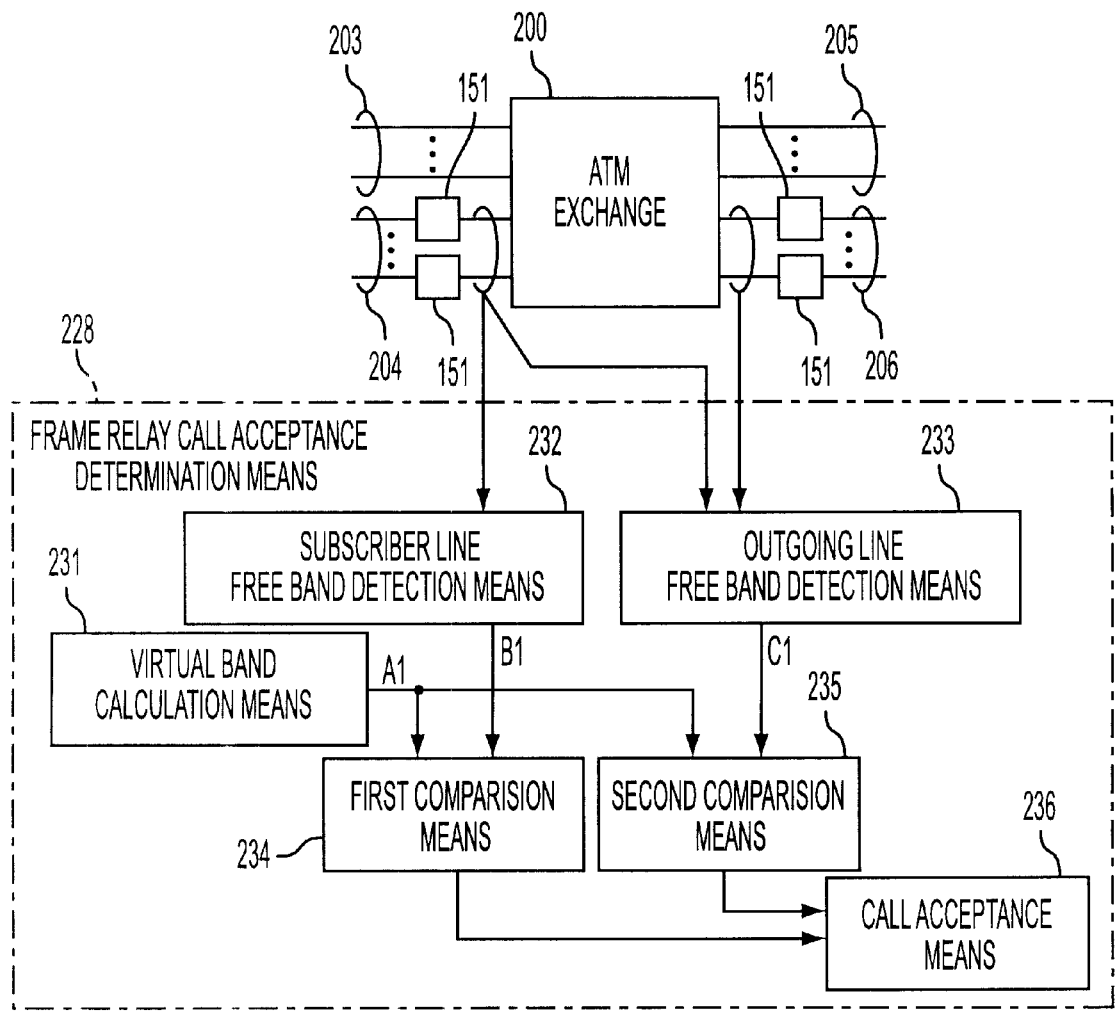
FIG. 19 is a block diagram illustrating a functional construction of frame relay call acceptance determination means of the ATM exchange system shown in FIG. 18.

Meanwhile, the frame relay call acceptance determination means 228 may have such a functional construction as shown, for example, in FIG. 19.

Referring to FIG. 19, the frame relay call acceptance determination means 228 shown includes virtual band calculation means 231 for multiplying a use requested band requested to set from a frame relay terminal 202 by a predetermined multiplexing rate α (for example, 0.3 to 0.5) to convert the use requested band into a use virtual band A1, which is controlled by the network, subscriber line free band detection means 232 for detecting an incoming side free band B1 for the frame relay terminal subscriber lines 204, and outgoing line free band detection means 233 for detecting an outgoing side free band C1 for the outgoing lines for the frame relay terminals (subscriber lines 204 or trunk lines 206).

The frame relay call acceptance determination means 228 further includes first comparison means 234 for comparing the use virtual band A1 calculated by the virtual band calculation means 231 and the incoming side free band B1 detected by the subscriber line free band detection means 232 with each other, and second comparison means 235 for comparing the use virtual band A1 calculated by the virtual band calculation means 231 and the outgoing side free band C1 detected by the outgoing line free band detection means 233 with each other.

The frame relay call acceptance determination means 228 further includes call acceptance means 236 for performing acceptance processing of a frame relay call from a frame relay terminal 202. The call acceptance means 236 accepts a frame relay call from a frame relay terminal 202 when the result of comparison by the first comparison means 234 is [incoming side free band B1 for the frame relay terminal subscriber lines 204]>[use virtual band A1] and simultaneously the result of comparison by the second comparison means 235 is [outgoing side free band C1 for the frame relay terminal subscriber lines 204 and frame relay terminal trunk lines 206]>[use virtual band A1].

Due to the construction described above, in the second embodiment, the ATM terminal switch resource 221 and the frame relay terminal switch resource 222 are set physically completely separately from each other as the resources of the ATM exchange 200, and the ATM terminal switch resource 221 and frame relay terminal switch resource 222 are controlled by the ATM terminal resource control section 225 and the frame relay terminal resource control section 226, respectively.

Figure 20:
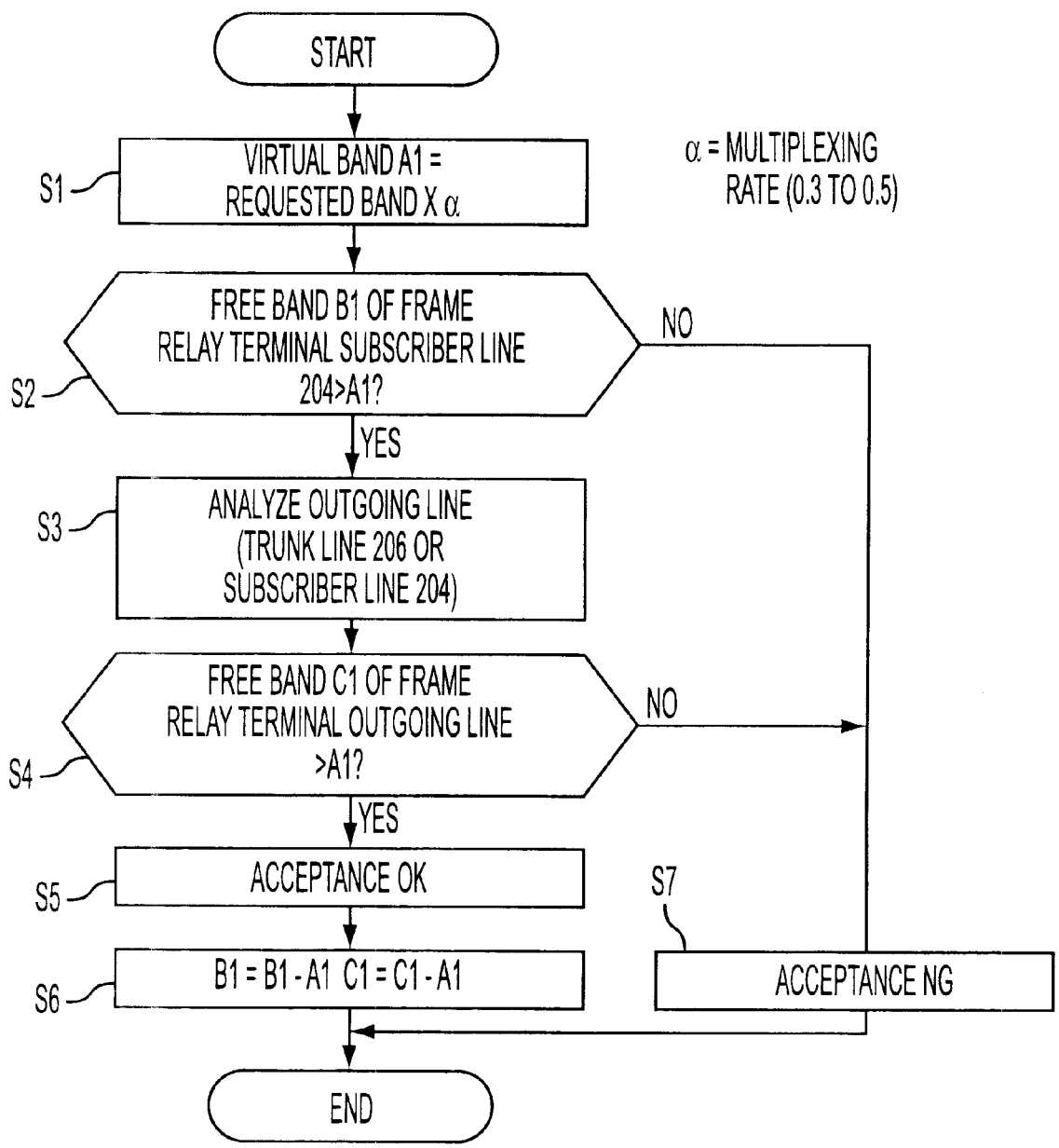
FIG. 20 is a flow chart illustrating operation of the frame relay call acceptance determination means shown in FIG. 19.

When each of the ATM terminals 201 tries to use the ATM terminal switch resource 221, an acceptance determination of an ATM call from an ATM terminal 201 is performed using the known technique described above by the ATM call acceptance determination means 227, but when each of the frame relay terminals 202 tries to use the frame relay terminal switch resource 222, an acceptance determination of a frame relay call from a frame relay terminal 202 is performed in accordance with a procedure illustrated in FIG. 20 by the frame relay call acceptance determination means 228 having such a construction as shown in FIG. 19.

In particular, referring to FIG. 20, in the frame relay call acceptance determination means 228 shown, the virtual band calculation means 231 multiplies a use requested band requested to set from a frame relay terminal 202 by the predetermined multiplexing rate α to convert the use requested band into a use virtual band A1 (step S1), which is controlled by the network.

Further, the subscriber line free band detection means 232 supervises and detects the incoming side free band B1 for the frame relay terminal subscriber lines 204, and then the incoming side free band B1 is compared with the use virtual band A1 by the first comparison means 234 (step S2). When the result of comparison is [incoming side free band B1]>[use virtual band, A1], the outgoing line free band detection means 233 analyses the outgoing lines for the frame relay terminals (frame relay terminal subscriber lines 204 or frame relay terminal trunk lines 206) to supervise and detect the outgoing side free band C1 (step S3).

The outgoing side free band C1 from the outgoing line free band detection means 233 and the use virtual band A1 are compared with each other by the second comparison means 235 (step S4), and then, when the result of comparison is [outgoing side free band C1]>[use virtual band A1], the call acceptance means 236 accepts the frame relay call from the frame relay terminals 202 (acceptance OK: step S5), assures the use virtual band A1, and then replaces the incoming side free band B1 and the outgoing side free band C1 with B1-A1 and C1-A1, respectively.

On the contrary, when the result of comparison by the first comparison means 234 at step S2 is [incoming side free band B1]≦[use virtual band A1] or when the result of comparison by the second comparison means 235 at step S4 is [outgoing side free band C1]≦[use virtual band A1], it is judged that the use virtual band A1 cannot be assured to either one or both ones of the incoming side and the outgoing side, and the call acceptance means 236 rejects acceptance of the frame relay call from the frame relay terminal 202 (acceptance NG: step S7).

In this manner, according to the second embodiment, by simply dividing the resource of the ATM exchange 200, control and call acceptance determination regarding the ATM terminal switch resource 221 for the ATM terminals 201 and control and call acceptance determination regarding the frame relay terminal switch resource 222 for the frame relay terminals 202 can be processed completely independently of each other, and the ATM terminals 201 and the frame relay terminals 202 can be accommodated very readily into the same ATM exchange 200 and the service of accommodating and connecting a frame relay terminal 202 into the ATM exchange 200 can be realized as one of services of the ATM exchange.

It is to be noted that, while in the second embodiment described above, a user of an ATM terminal 201 or of a frame relay terminal 202 reports a use requested band before it delivers a call, such alternative construction may be employed that a use requested band requested to set from an ATM terminal 201 or a frame relay terminal 202 is added as band information to an ATM call from the ATM terminal 201 or to a frame relay call from the frame relay terminal 202 and transferred to the ATM call acceptance determination means 227 or the virtual band calculation means 231 of the frame relay call acceptance determination means 228 together with the ATM call or the frame relay call.

Figure 21:
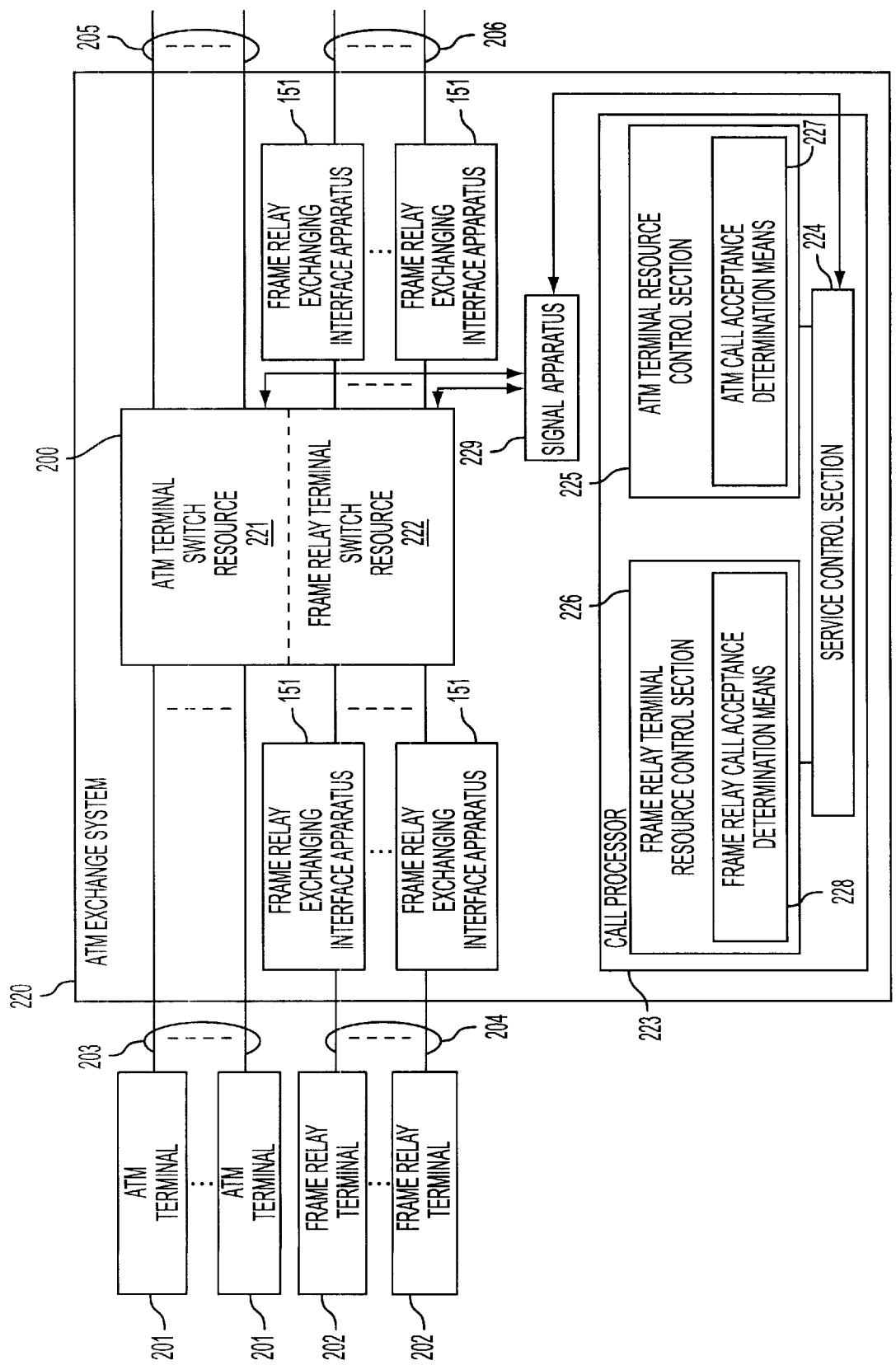
FIG. 21 is a block diagram showing a modified ATM exchange system to the ATM exchange system of FIG. 18 which additionally includes a signal apparatus.

In this instance, the ATM exchange system 220 includes, as shown in FIG. 21, a signal apparatus 229 for transferring an ATM call or a frame relay call from the ATM exchange 200 to the service control section 224 of the call processor 223.

Figure 22:
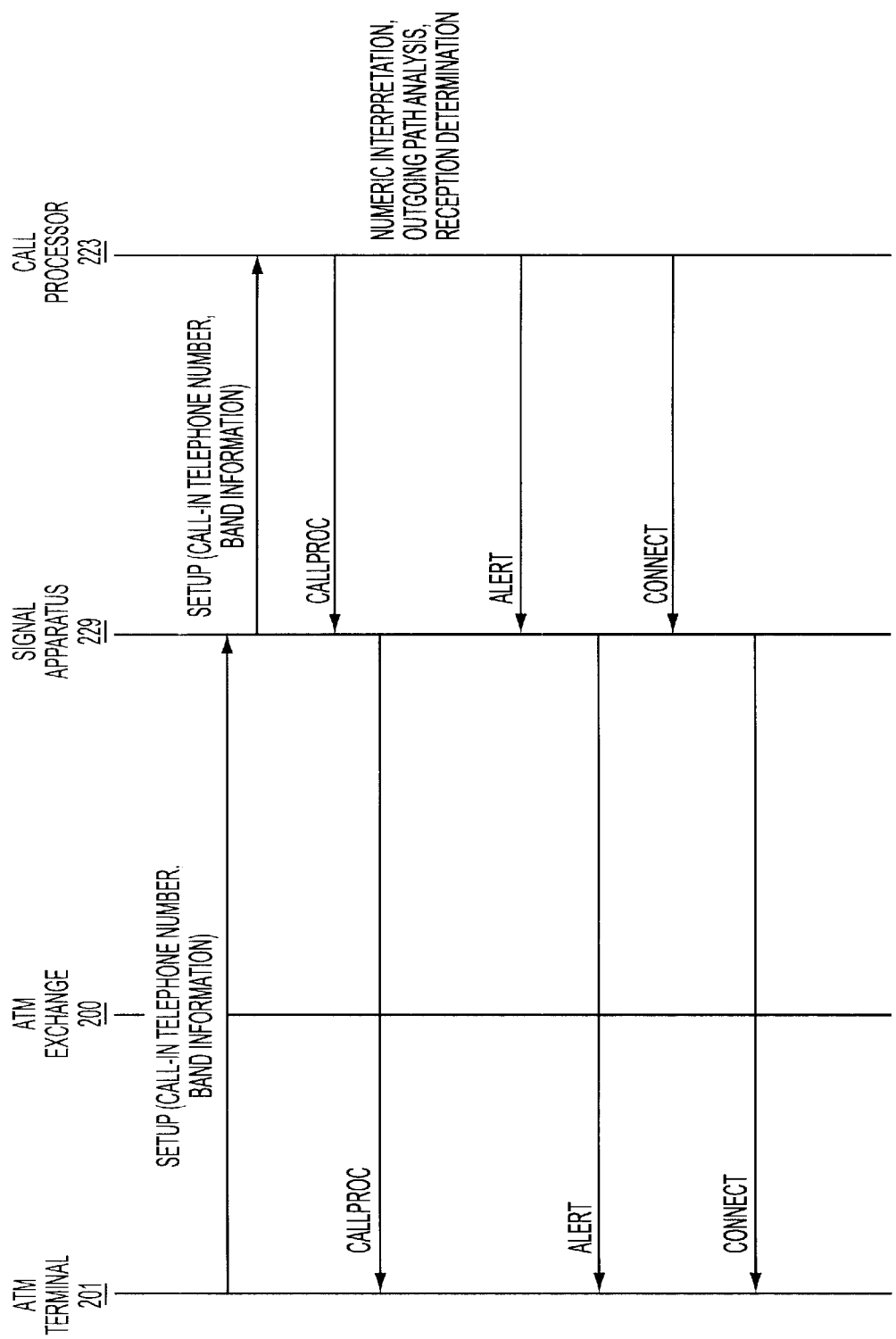
FIG. 22 is a diagram illustrating a sequence of processing when call connection is requested from an ATM terminal of the ATM exchange system shown in FIG. 21.

Between the ATM exchange system 220 having such construction as described above and an ATM terminal 201, such a sequence as illustrated in FIG. 22 is executed when the ATM terminal 201 delivers a request for call connection. Referring to FIG. 22, a destination telephone number of the other party and band information regarding a use requested band are added to a SETUP (call setting message) signal from the ATM terminal 201, and the SETUP signal is transferred to the call processor 223 by way of the ATM exchange 200 and the signal apparatus 229.

In response to the SETUP signal, a CALLPROC (Call Proceeding: a message for execution of processing for setting of a call) signal, an ALERT (Alerting: a message of calling a called party) signal and a CONNECT (a message that the called party has responded) signal are successively sent out from the call processor 223 to the ATM terminal 201 by way of the signal apparatus 229 and the ATM exchange 200.

In this instance, in the call processor 223, numerical interpretation and outgoing path analysis of data in the SETUP signal obtained from the signal apparatus 229 are performed after the CALLPROC signal is outputted, and acceptance determination of the ATM call is performed by the ATM call acceptance determination means 227 regarding the band information added to the SETUP signal as a use requested band. Then, if the ATM call acceptance determination means 227 determines that the call should be accepted, then the call processor 223 outputs an ALERT signal.

Figure 23:
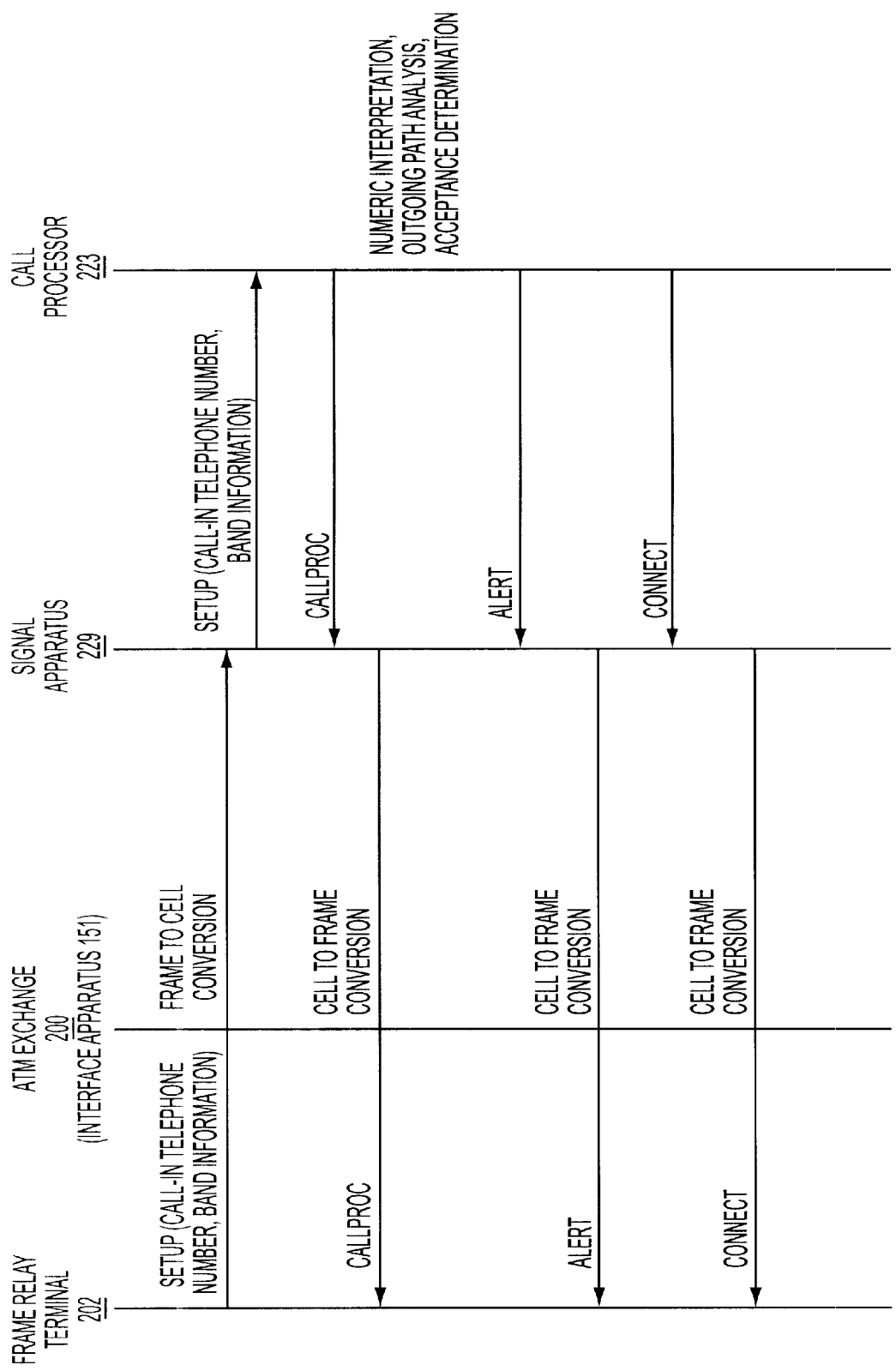
FIG. 23 is a diagram illustrating a sequence of processing when call connection is requested from a frame relay terminal of the ATM exchange system shown in FIG. 21.

Similarly, between the ATM exchange system 220 and a frame relay terminal 202, such a processing sequence as illustrated in FIG. 23 is executed when the frame relay terminal 202 delivers a request for call connection. In particular, referring to FIG. 23, a destination telephone number of the other party and band information regarding a use requested band are added to a SETUP (call setting message) signal from the frame relay terminal 202, and the SETUP signal is transferred to the call processor 223 by way of the ATM exchange 200 and the signal apparatus 229 after it is converted from a frame relay packet into ATM cells by the interface unit 151.

In response to the SETUP signal, a CALLPROC signal, an ALERT signal and a CONNECT signal are converted from ATM cells into a frame relay packet by the interface unit 151 and then successively sent out from the call processor 223 to the frame relay terminal 202 by way of the signal apparatus 229 and the ATM exchange 200.

In this instance, in the call processor 223, numerical interpretation and outgoing path analysis of data in the SETUP signal obtained by the signal apparatus 229 are performed after the CALLPROC signal is outputted, and the band information added to the SETUP signal is inputted as a use requested band to the virtual band calculation means 231 of the frame relay call acceptance determination means 228. Thus, acceptance determination of the frame relay call is performed by the frame relay call acceptance determination means 228, and if the frame relay call acceptance determination means 228 determines that the call should be accepted, then the call processor 223 outputs an ALERT signal.

Since a use requested band is added as band information to an ATM call or a frame relay call and transferred to the call processor 223 by way of the ATM exchange 200 and the signal apparatus 229 as described above, a user of an ATM terminal 201 or of a frame relay terminal 202 can omit such operation as to make a report of a use requested band every time before a call is developed, and further enhancement of the service can be achieved.

d. Third Embodiment

Figure 24:
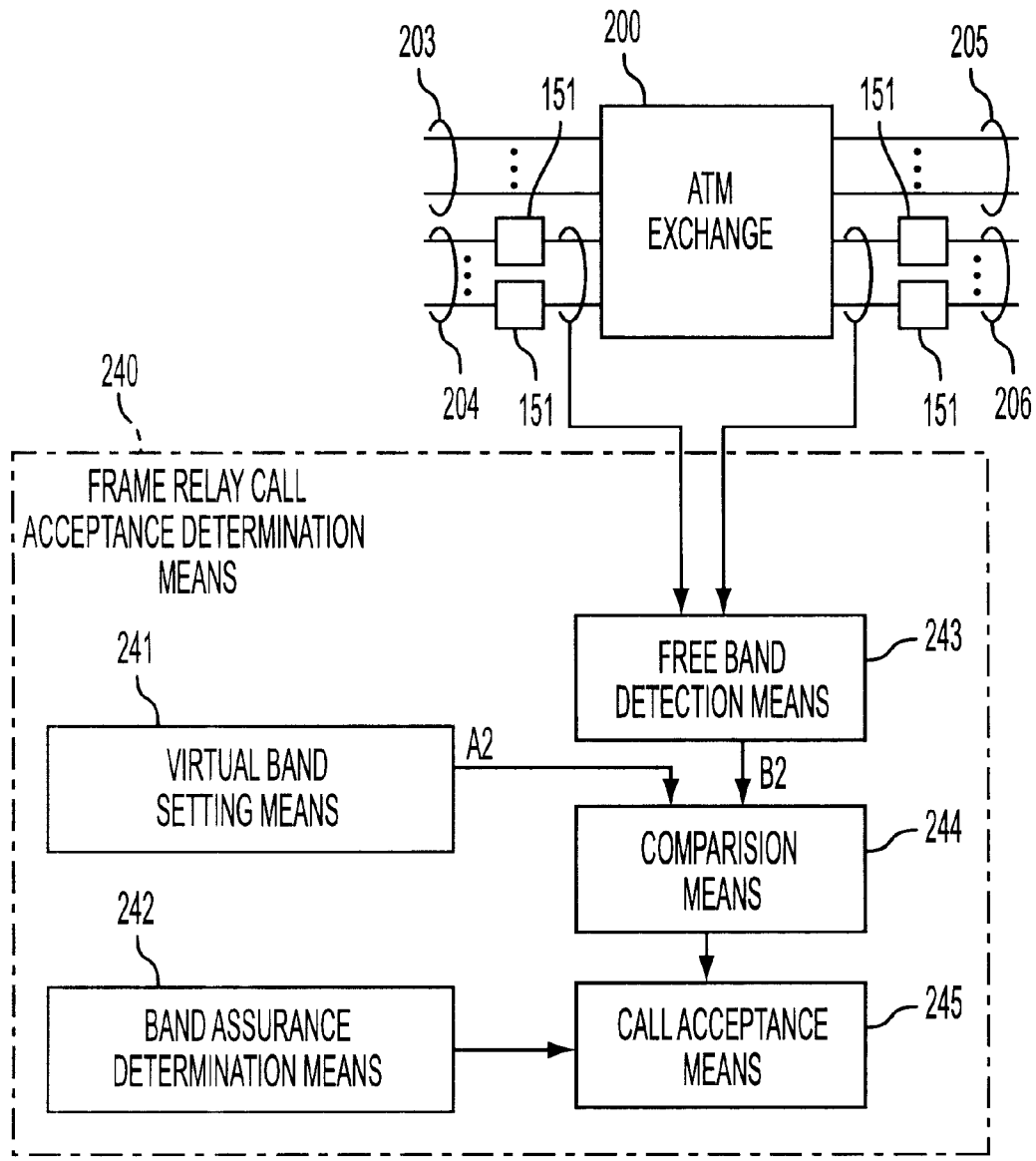
FIG. 24 is a block diagram illustrating a functional construction of frame relay call acceptance determination means showing a third preferred embodiment of the present invention.

FIG. 24 illustrates a functional construction of frame relay call acceptance determination means according to a third preferred embodiment of the present invention. In the present embodiment, the frame relay call acceptance determination means 228 of the second embodiment having such construction as described hereinabove with reference to FIG. 19 is replaced by such frame relay call acceptance determination means 240 as shown in FIG. 24.

Referring to FIG. 24, the frame relay call acceptance determination means 240 shown includes virtual band setting means 241 for setting, when setting of a frame relay call is requested from a frame relay terminal 202, a physical maximum speed (physical line speed) of the frame relay terminal 202 as a use virtual band A2 for the frame relay call, and band assurance determination means 242 for determining whether or not a band has been assured already for a same sending subscriber as the frame relay terminal 202.

Figure 27:
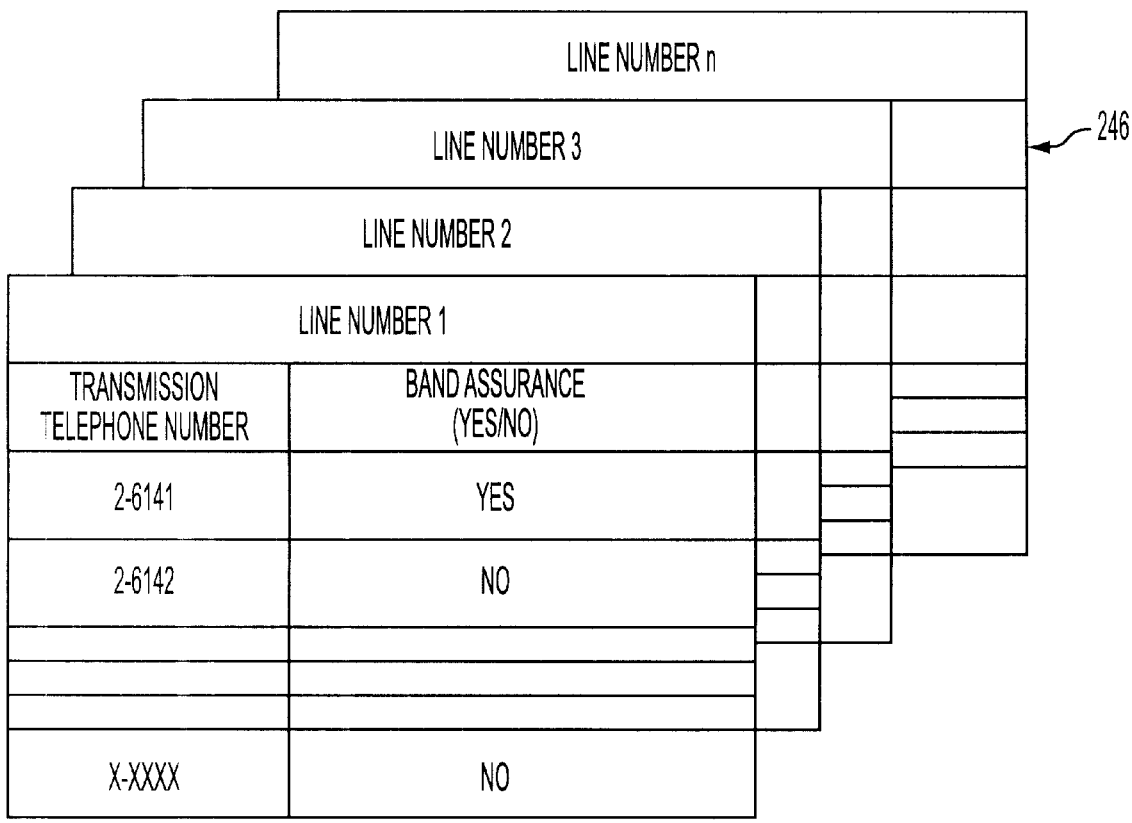
FIG. 27 is a diagrammatic view showing tables for band assurance determination employed in the frame relay call acceptance determination means shown in FIG. 24.

The band assurance determination means 242 controls, for example, such band assurance determination tables 246 as shown in FIG. 27. Referring to FIG. 27, in each of the band assurance determination tables 246 shown, presence or absence of an assured band for a frame relay terminal 202 of a predetermined sending telephone number to be connected to a circuit of a predetermined circuit number is registered so that, by referring to a suitable one of the band assurance determination tables 246, the band assurance determination means 242 can determine whether or not a band has been assured already for the same sending subscriber as the predetermined frame relay terminal 202.

Referring to FIG. 24, the frame relay call acceptance determination means 240 further includes free band detection means 243 for detecting a free band B2 for the frame relay terminal subscriber lines 204 and the frame relay terminal trunk lines 206 for the frame relay terminals 202, comparison means 244 for comparing a use virtual band A2 set by the virtual band setting means 241 and a free band B2 detected by the free band detection means 243 with each other, and call acceptance means 245 for performing acceptance processing of a frame relay call from a frame relay terminal 202.

The call acceptance means 245 accepts a frame relay call from a frame relay terminal 202 unconditionally when the band assurance determination means 242 determines that a band has been assured already for the same sending subscriber as the frame relay terminal 202. However, when the band assurance determination means 242 determines that no band has been assured for the same sending subscriber as the frame relay terminal 202 and the result of comparison by the comparison means 244 is [free band B2 for the frame relay terminal subscriber lines 204 and the frame relay terminal trunk lines 206]>[use virtual band A2], the call acceptance means 245 assures the use virtual band A2 and accepts the frame relay call from the frame relay terminal 202.

Figure 25:
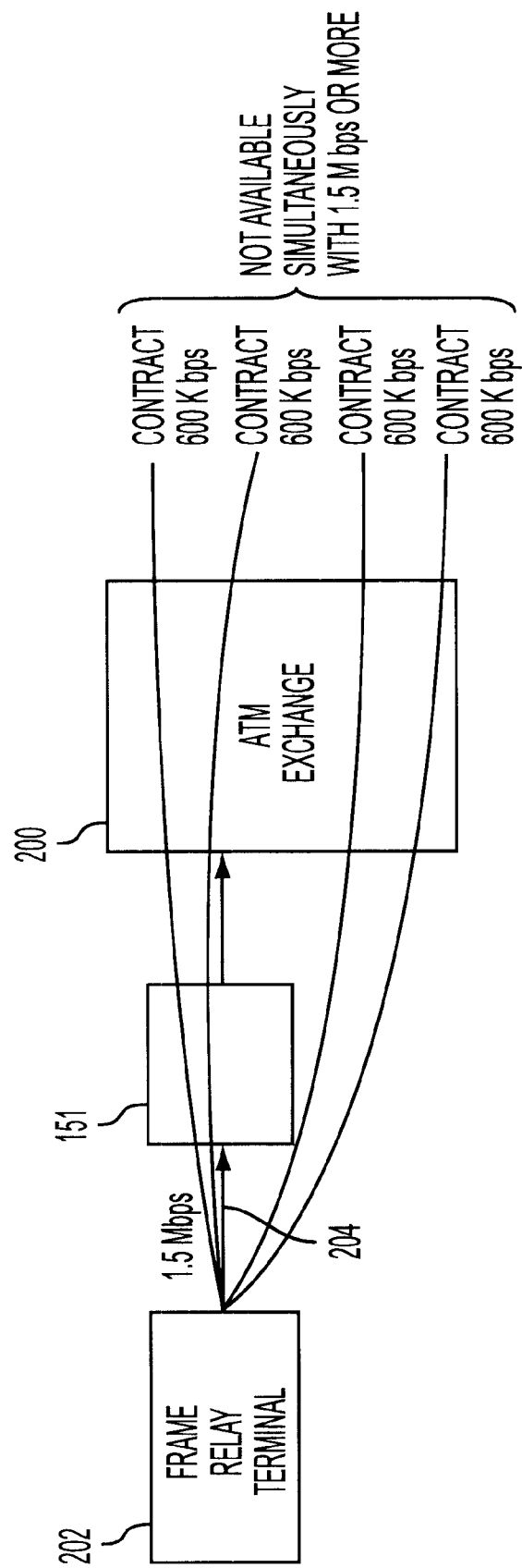
FIG. 25 is a diagrammatic view illustrating an example of a state of paths when a frame relay terminal is accommodated in an actual ATM exchange terminal.

FIG. 25 illustrates an example of a state of paths when a frame relay terminal 202 is accommodated into an actual ATM exchange network. As seen from FIG. 25, a frame relay terminal 202 can set paths for a plurality of terminals to enjoy connectionless services.

In this instance, if it is contracted that the traffic amount (use band) from a frame relay terminal 202 to each of a plurality of (for example, four) terminals is, for example, 600 Kbps, if the frame relay terminal 202 accesses a plurality of ones of the terminals at a time, then a band of 2.4 Mbps at the greatest is used. Actually, however, it is impossible to send out a frame relay packet exceeding the physical maximum speed of a subscriber line (DS1 line) 204, which interconnects the frame relay terminal 202 and the ATM exchange 200, for example, 1.5 Mbps.

Figure 26:
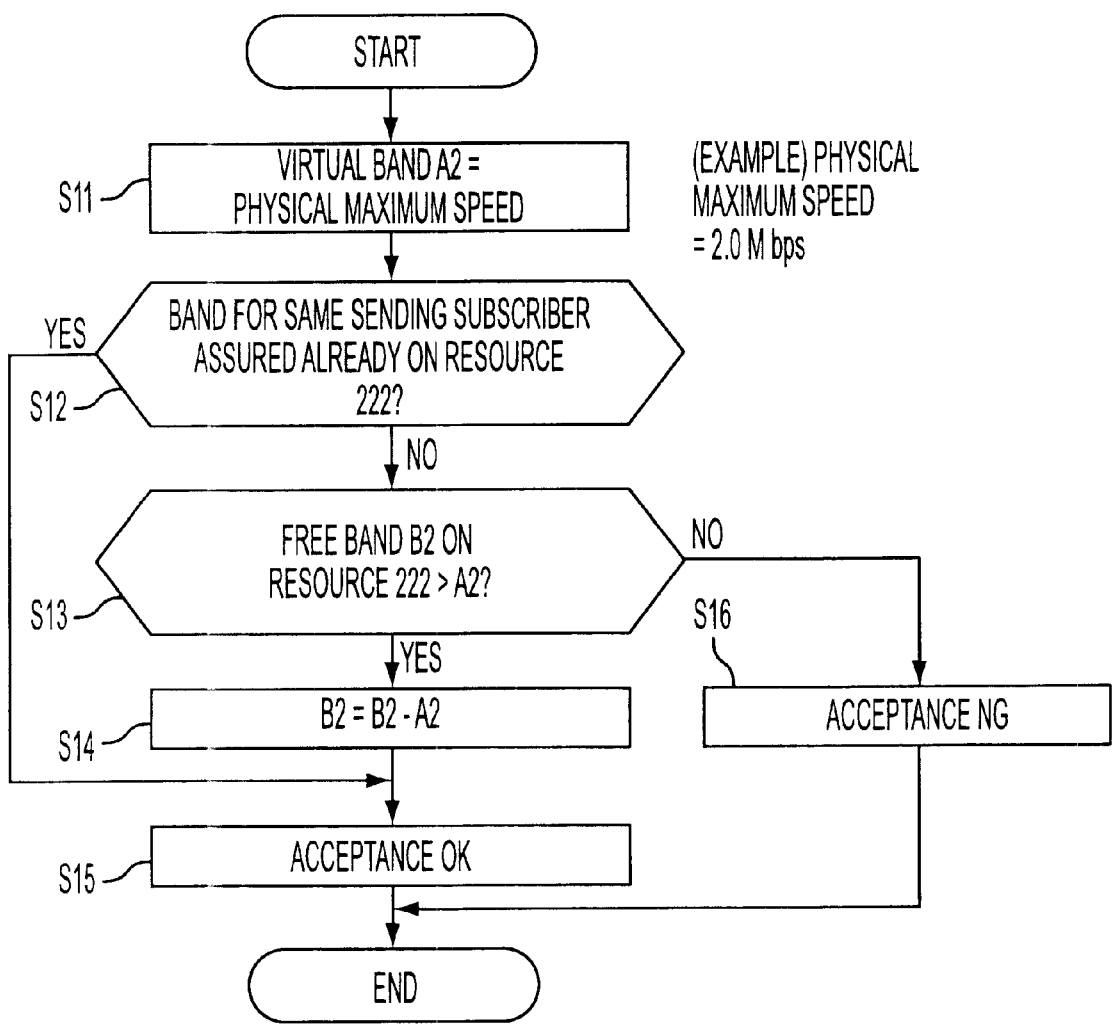
FIG. 26 is a flow chart illustrating operation of the frame relay call acceptance determination means shown in FIG. 24.

Taking the characteristic just described into consideration, in the frame relay call acceptance determination means 240 of the third embodiment, if at least one path from a certain frame relay terminal 202 is set on the lines, then a band for the physical maximum speed is assured. On the contrary, even if N paths from a same sending subscriber are set on the same line, a band higher than the physical maximum speed is not assured at all. In the following, an acceptance determination procedure for a frame relay call from a frame relay terminal 202 by the frame relay call acceptance determination means 240 in the third embodiment will be described with reference to FIG. 26.

In particular, when a frame relay terminal 202 tries to use the frame relay terminal switch resource 222 (when setting of a frame relay call is requested from a frame relay terminal 202), in the frame relay call acceptance determination means 240, the virtual band setting means 241 first sets a physical maximum speed (physical line speed) of the frame relay terminal 202 as a use virtual band A2 for the frame relay call (step S11).

Then, the band assurance determination means 242 refers to the band assurance determination tables 246 to determine whether or not a band has been assured already on the frame relay terminal switch resource 222 for the same sending subscriber as the frame relay terminal 202 from which the request for setting of a call has been developed (step S12). When it is determined at step S12 that a band has been assured already, the control sequence advances to step S15, at which the frame relay call from the frame relay terminal 202 is accepted unconditionally by the call acceptance means 245.

On the contrary if it is determined at step S12 that no band has been assured as yet for the same sending subscriber as the frame relay terminal 202, then a result of supervision and detection of the free band B2 for the frame relay terminal subscriber lines 204 and the frame relay terminal trunk lines 206 by the free band detection means 243 is received and compared with the use virtual band A2 (physical maximum speed) by the comparison means 244 (step S13).

When the result of comparison is [free band B2]>[use virtual band A2], the use virtual band A2 is assured and the free band B2 is replaced by B2−A2 (step S14), and then the frame relay call from the frame relay terminal 202 is accepted by the call acceptance means 245 (acceptance OK: step S15).

On the contrary, when the result of comparison by the comparison means 244 at step S13 is [free band B2]≦[use virtual band A2], it is determined that the use virtual band A2 cannot be assured on the frame relay terminal switch resource 222, and the call acceptance means 245 rejects the frame relay call from the frame relay terminal 202 (acceptance NG: step S16).

In this manner, according to the third embodiment, similar effects to those of the second embodiment can be obtained. Further, where at least one path from a certain frame relay terminal 202 is set on the lines, since a band for the physical maximum speed is assured so that a band for a speed higher than the physical maximum speed cannot be assured even if a plurality of paths from the same sending subscriber are set on the same line, each frame relay terminal 202 is permitted to make a contract for a speed higher than a physical maximum speed of the frame relay terminal 202 as seen from FIG. 25. Accordingly, even where a frame relay terminal 202 is accommodated into the ATM exchange 200 so that a frame relay service may be enjoyed, a path for a frame relay packet can be set on the ATM exchange network while adopting the same conditions as of existing frame relay services, and besides, the resource can be utilized effectively.

e. Fourth Embodiment

Figure 28:
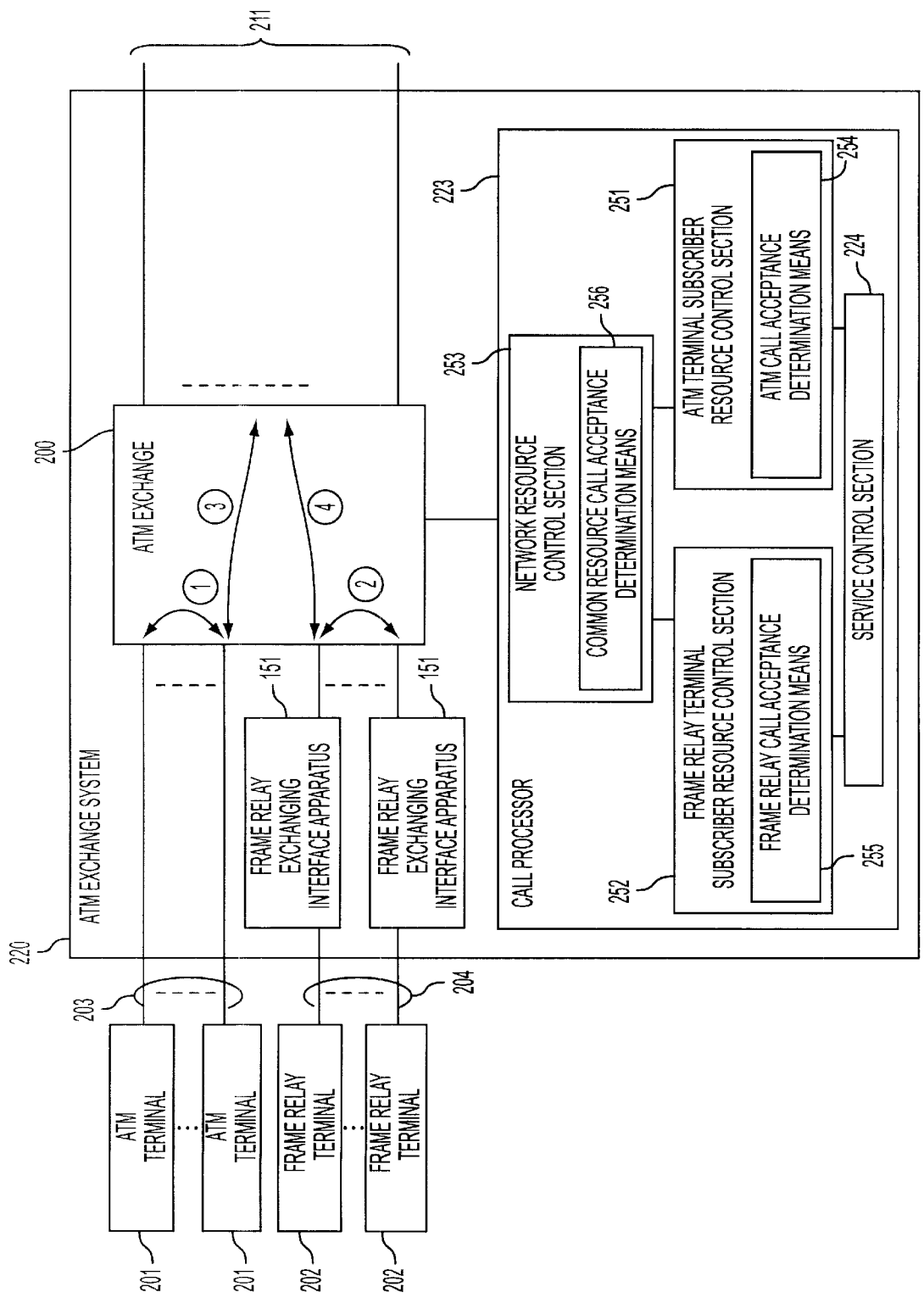
FIG. 28 is a block diagram of another ATM exchange system showing a fourth preferred embodiment of the present invention.

FIG. 28 shows the construction of an ATM exchange system as a fourth preferred embodiment of the present invention. Also in the present embodiment, similarly as in the second and third embodiments described hereinabove, an ATM exchange 200 which constitutes an ATM exchange system 220 accommodates a plurality of ATM terminals 201 by way of respective ATM terminal subscriber lines 203 and accommodates a plurality of frame relay terminals 202 by way of respective frame relay terminal subscriber lines 204. In the present embodiment, however, the resource (free band) of the ATM exchange 200 is shared commonly by the ATM terminals and the frame relay terminals, and trunk lines 211 of the ATM exchange 200 are not separated for the ATM terminals and the frame relay terminals. It is to be noted that those reference numerals in FIG. 28 which are common to those used for the preceding embodiments denote like components, and overlapping description thereof is omitted herein to avoid redundancy.

Referring to FIG. 28, the call processor 223 in the ATM exchange system 220 includes an ATM terminal subscriber resource control section 251 for controlling an ATM terminal subscriber access resource (refer to an arrow mark ① in FIG. 28) when an ATM call from an ATM terminal 201 is inputted to the ATM exchange 200 by way of a respective ATM terminal subscriber line 203 and then sent out to another ATM terminal 201 by way of another respective ATM terminal subscriber line 203, and a frame relay terminal subscriber resource control section 252 for controlling a frame relay terminal subscriber access resource (refer to an arrow mark ② of FIG. 28) when a frame relay call from a frame relay terminal 202 is inputted to the ATM exchange 200 by way of a respective frame relay terminal subscriber lines 204 and the interface unit 151 and then sent out to another frame relay terminal 202 by way of another respective frame relay terminal subscriber line 204 and the interface unit 151.

The call processor 223 further includes a network resource control section 253 for controlling a network common resource (refer to an arrow mark ③ or ④ in FIG. 28) when an ATM call from an ATM terminal 201 or a frame relay call from a frame relay terminal 202 is inputted to the ATM exchange 200 by way of an ATM terminal subscriber line 203 or a frame relay terminal subscriber line 204 and then sent out to a trunk line 211.

The ATM terminal subscriber resource control section 251 includes ATM call acceptance determination means 254 for determining whether or not an ATM call from an ATM terminal 201 should be accepted when the ATM terminal 201 tries to use the ATM terminal subscriber access resource. Meanwhile, the frame relay terminal subscriber resource control section 252 includes frame relay call acceptance determination means 255 for determining whether or not a frame relay call from a frame relay terminal 202 should be accepted when the frame relay terminal 202 tries to use the frame relay terminal subscriber access resource. Further, the network resource control section 253 includes common resource call acceptance determination means 256 for determining whether or not an ATM call from an ATM terminal 201 or a frame relay call from a frame relay terminal 202 should be accepted when the ATM terminal 201 or the frame relay terminal 202 tries to use the network common resource. It is to be noted that, since a known technique similar to that employed in the second embodiment can be used as it is for the ATM call acceptance determination means 254, detailed description of the same is omitted herein.

Figure 29:
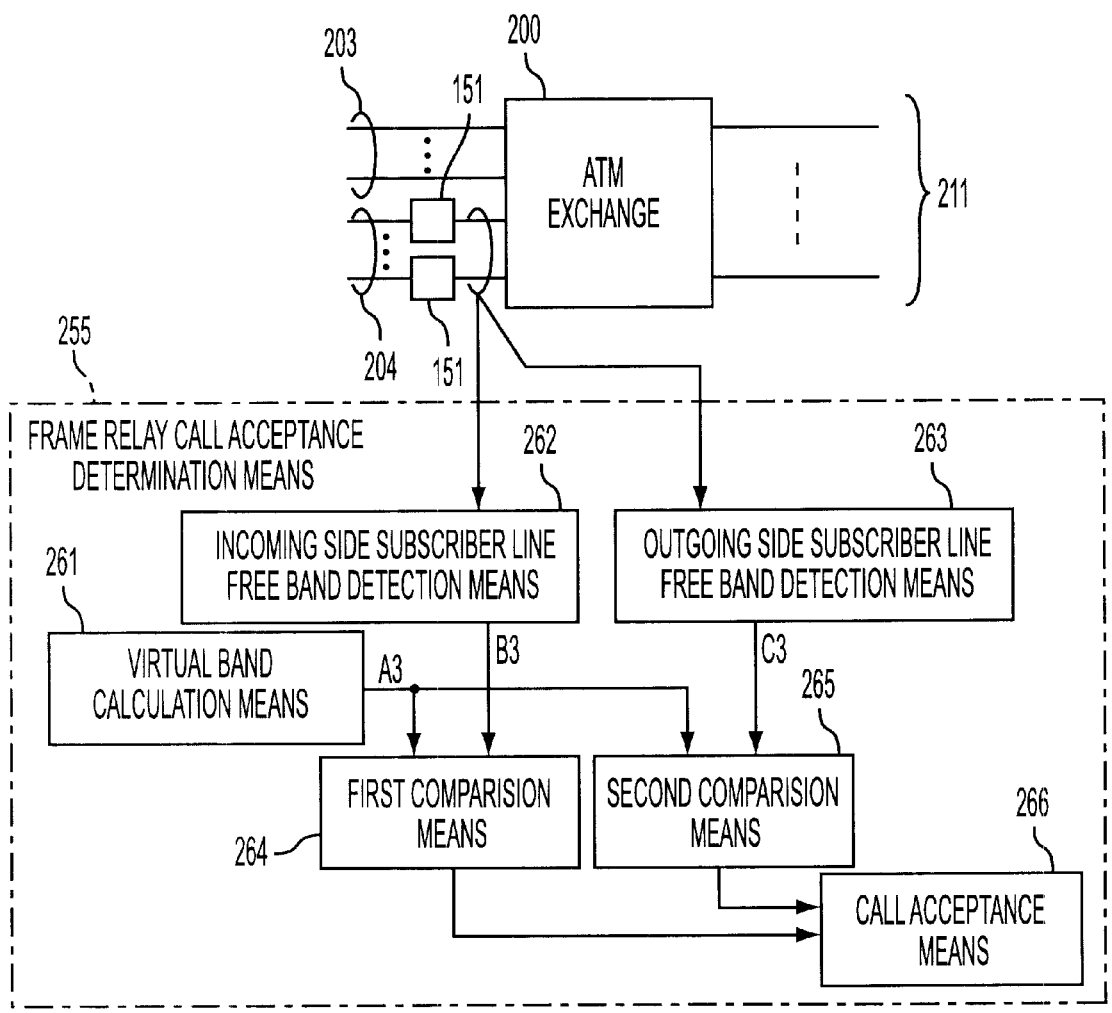
FIG. 29 is a block diagram illustrating a functional construction of frame relay call acceptance determination means of the ATM exchange system shown in FIG. 28.

The frame relay call acceptance determination means 255 may have such a functional construction as illustrated, for example, in FIG. 29.

Referring to FIG. 29, the frame relay call acceptance determination means 255 shown includes virtual band calculation means 261 for multiplying a use requested band requested to set from a frame relay terminal 202 by a predetermined multiplexing rate α (for example, 0.3 to 0.5) to convert the use requested band into a use virtual band A3, which is controlled by the network, incoming side subscriber line free band detection means 262 for detecting a free band B3 for the frame relay terminal subscriber lines 204, and outgoing side subscriber line free band detection means 263 for detecting a free band C3 for the frame relay terminal subscriber lines 204.

The frame relay call acceptance determination means 255 further includes first comparison means 264 for comparing a use virtual band A3 calculated by the virtual band calculation means 261 and a free band B3 detected by the incoming side subscriber line free band detection means 262 with each other, and second comparison means 265 for comparing a use virtual band A3 calculated by the virtual band calculation means 261 and a free band C3 detected by the outgoing side subscriber line free band detection means 263 with each other.

The frame relay call acceptance determination means 255 further includes call acceptance means 266 for performing acceptance processing of a frame relay call from a frame relay terminal 202. The call acceptance means 266 accepts a frame relay call from a frame relay terminal 202 when the result of comparison by the first comparison means 264 is [free band B3 of the frame relay terminal subscriber line 204]>[use virtual band A3] and when the result of comparison by the second comparison means 265 is [free band C3 of the frame relay terminal subscriber line 204]>[use virtual band A3].

Figure 30:
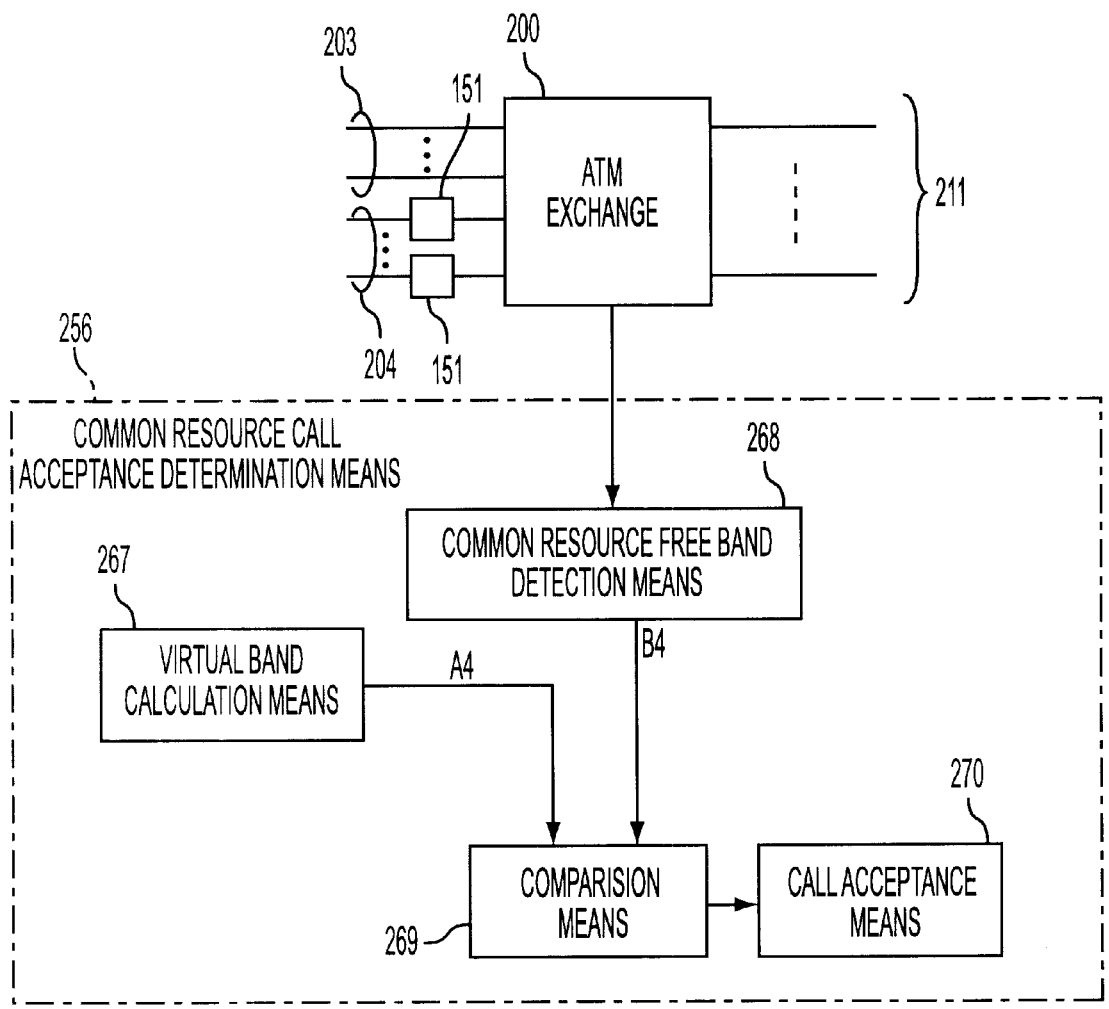
FIG. 30 is a block diagram illustrating a functional construction of common resource call acceptance determination means of the ATM exchange system shown in FIG. 28.

Meanwhile, the common resource call acceptance determination means 256 may have such a functional construction as illustrated, for example, in FIG. 30.

Referring to FIG. 30, the common resource call acceptance determination means 256 shown includes virtual band calculation means 267 for multiplying a use requested band requested to set from an ATM terminal 201 or a frame relay terminal 202 by a predetermined multiplexing rate β (for example, 0.7 to 1.0) to convert the use requested band into a use virtual band A4 which is controlled by the network, and common resource free band detection means 268 for detecting a free band B4 on the network common resource of the ATM exchange 200.

The common resource call acceptance determination means 256 further includes comparison means 269 for comparing a use virtual band A4 calculated by the virtual band calculation means 267 and a free band B4 detected by the common resource free band detection means 268 with each other, and call acceptance means 270 for accepting an ATM call from an ATM terminal 201 or a frame relay call from a frame relay terminal 202 when the result of comparison by the comparison means 269 is [free band B4 on the common resource in the network]>[use virtual band A4].

Due to the construction described above, in the fourth embodiment, the ATM terminal resource and the frame relay terminal resource are set commonly on the resource of the ATM exchange 200, and the ATM terminal subscriber access resource indicated by the arrow mark ① in FIG. 28 and the frame relay terminal subscriber access resource indicated by the arrow mark ② in FIG. 28 are controlled by the ATM terminal subscriber resource control section 251 and the frame relay terminal subscriber resource control section 252, respectively, while the network common resource indicated by the arrow marks ③ and ④ in FIG. 28 is controlled by the network resource control section 253.

Then, when one of the ATM terminals 201 tries to use the ATM terminal subscriber access resource, the ATM call acceptance determination means 254 performs acceptance determination of the ATM call from the ATM terminals 201 using the known technique described above. But when one of the frame relay terminals 202 tries to use the frame relay terminal subscriber access resource, the frame relay call acceptance determination means 255 having such a construction as illustrated in FIG. 29 performs acceptance determination of the frame relay call from the frame relay terminals 202 in accordance with the procedure illustrated in FIG. 31. On the other hand, when an ATM terminal 201 or a frame relay terminal 202 tries to use the network common resource, the common resource call acceptance determination means 256 having such a construction as illustrated in FIG. 30 performs acceptance determination of the ATM call from the ATM terminal 201 or of the frame relay call from the frame relay terminals 202 in accordance with the procedure illustrated in FIG. 32.

Figure 31:
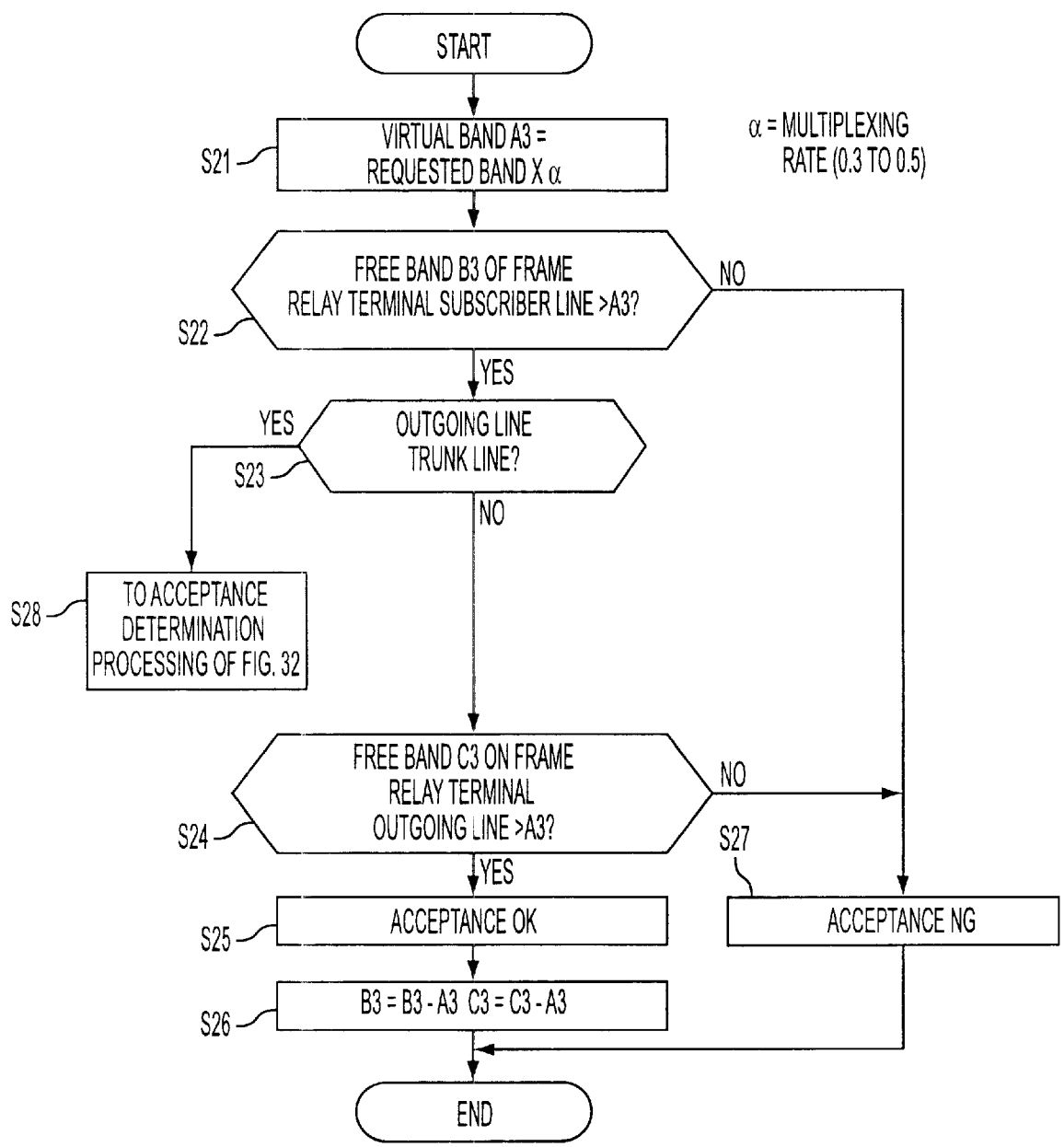
FIG. 31 is a flow chart illustrating operation of the frame relay call acceptance determination means shown in FIG. 29.

In particular, referring to FIG. 31, in the frame relay call acceptance determination means 255, the virtual band calculation means 261 first multiplies a use requested band requested to set from a frame relay terminal 202 by the predetermined multiplexing rate α to convert the use requested band into a use virtual band A3 (step S21), which is controlled by the network.

Further, the incoming side subscriber line free band detection means 262 supervises and detects a free band B3 for the frame relay terminal subscriber lines 204, and the free band B3 is compared with the use virtual band A3 by the first comparison means 264 (step S22).

When the result of comparison is [free band B3]>[use virtual band A3], the frame relay call acceptance determination means 255 determines whether or not the outgoing line from the ATM exchange 200 upon setting of a call from the frame relay terminal 202 in this instance is a trunk line 211 (step S23). If the outgoing line is a trunk line 211, then since the network common resource (indicated at the arrow mark ④ in FIG. 28) should be used, the control sequence advances to processing by the common resource call acceptance determination means 256 which will be hereinafter described with reference to FIG. 32 (step S28).

On the other hand, if it is determined at step S23 that the outgoing line is not any trunk line 211, since the frame relay terminal subscriber access resource indicated by the arrow mark ② in FIG. 28 should be used, the outgoing side subscriber line free band detection means 263 supervises and detects a free band C3 for the frame relay terminal subscriber lines 204, and the free band C3 is compared with the use virtual band A3 by the second comparison means 265 (step S24).

When the result of comparison is [free band C3]>[use virtual band A3], the call acceptance means 266 accepts the frame relay call from the frame relay terminal 202 (acceptance OK: step S25), and the use virtual band A3 is assured and the free band B3 and free band C3 are replaced by B3−A3 and C3−A3, respectively, (step S26).

When the result of comparison at step S22 by the first comparison means 264 is [free band B3]≦[use virtual band A3] or the result of comparison at step S24 by the second comparison means 265 is [free band C3]≦[use virtual band A3], it is determined that the use virtual band A3 cannot be assured at either one or neither one of the incoming side and the outgoing side of the frame relay terminal subscriber line 204, and the call acceptance means 266 rejects acceptance of the frame relay call from the frame relay terminal 202 (acceptance NG: step S27).

Figure 32:
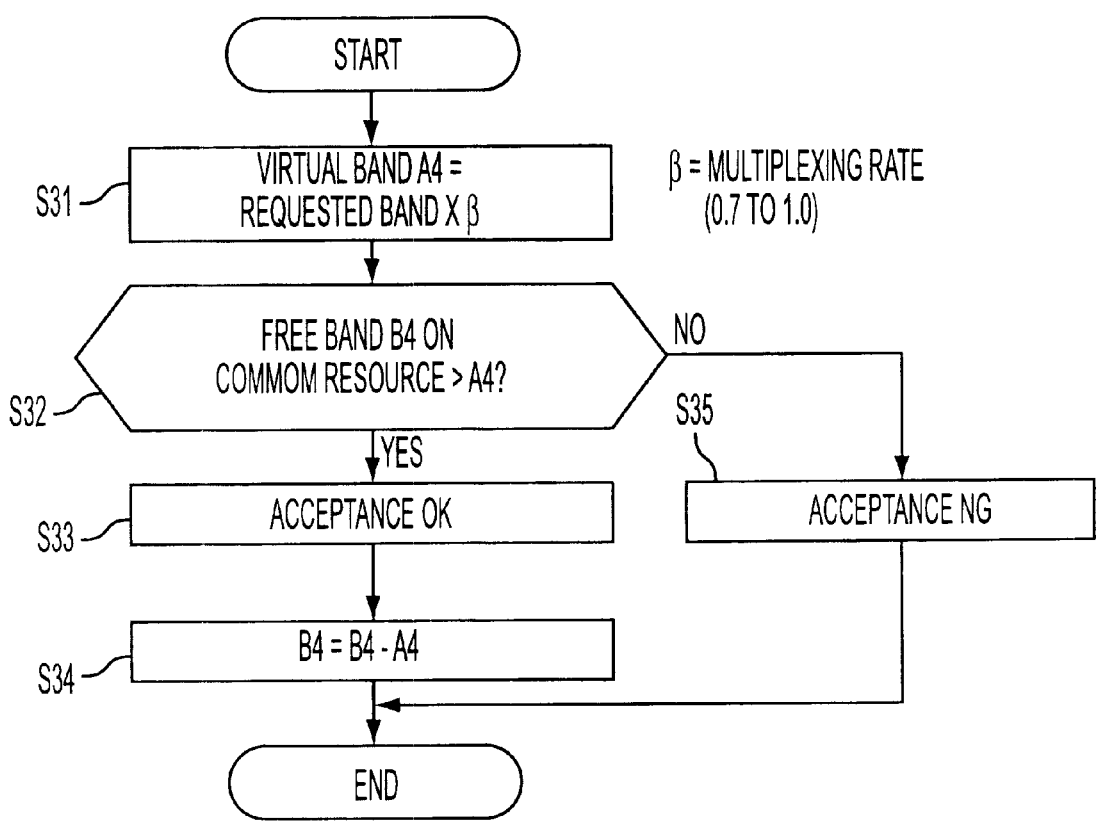
FIG. 32 is a flow chart illustrating operation of the common resource call acceptance determination means shown in FIG. 30.

Meanwhile, referring to FIG. 32, in the common resource call acceptance determination means 256, the virtual band calculation means 267 multiplies the use requested band requested to set from an ATM terminal 201 or a frame relay terminal 202 by the predetermined multiplexing rate β to convert the use requested band into a use virtual band A4 (step S31), which is controlled by the network.

Further, the common resource free band detection means 268 supervises and detects a free band B4 on the network common resource of the ATM exchange 200, and the free band B4 is compared with the use virtual band A4 by the comparison means 269 (step S32).

Then, when the result of comparison is [free band B4]>[use virtual band A4], the call acceptance means 270 accepts the ATM call from the ATM terminal 201 or the frame relay call from the frame relay terminal 202 (acceptance OK: step S33), and the use virtual band A4 is assured and the free band B4 is replaced by B4−A4 (step S34).

When the result of comparison at step S32 by the comparison means 269 is [free band B4]≦[use virtual band A4], it is determined that the network common resource does not have a free area for the use virtual band A4 and consequently the use virtual band A4 cannot be assured, and the call acceptance means 270 does not accept the ATM call from the ATM terminal 201 or the frame relay call from the frame relay terminal 202 (acceptance NG: step S35).

In this manner, according to the fourth embodiment, control and call acceptance determination of the ATM terminal subscriber access resource and control and call acceptance determination of the frame relay terminal subscriber access resource are performed by the ATM call acceptance determination means 254 and the frame relay call acceptance determination means 255, respectively, while control and call acceptance determination of the network common resource are processed in accordance with an algorithm (same controlling method) common to both of an ATM call from an ATM terminal 201 and a frame relay call from a frame relay terminal 202 by the common resource call acceptance determination means 256. Consequently, even where the resource of the ATM exchange 200 is shared by both of the resource for the ATM terminals and the resource for the frame relay terminals, the ATM terminals 201 and the frame relay terminals 202 can be accommodated very readily into the same ATM exchange 200, and similarly as in the second embodiment, the service for accommodating and connecting the frame relay terminals 202 into and to the ATM exchange 200 can be realized as one of services of the ATM exchange.

It is to be noted that, while, in the fourth embodiment described above, a user of an ATM terminal 201 or of a frame relay terminal 202 reports a use requested band before a call is developed, such an alternative construction may be employed that a use requested band requested to set from an ATM terminal 201 or a frame relay terminal 202 is added as band information to the ATM call from the ATM terminal 201 or to the frame relay call from the frame relay terminal 202 and transferred to the ATM call acceptance determination means 254, the virtual band calculation means 261 of the frame relay call acceptance determination means 255 or the virtual band calculation means 267 of the common resource call acceptance determination means 256 together with the ATM call or the frame relay call.

In this instance, similarly to the case described hereinabove with reference to FIG. 21 in connection with the second embodiment, the ATM exchange system 220 includes a signal apparatus 229 for transferring an ATM call or a frame relay call from the ATM exchange 200 to the service control section 224 of the call processor 223. Consequently, also in the present fourth embodiment, a user of an ATM terminal 201 or of a frame relay terminal 202 can omit the operation to report a use requested band every time before a call is developed, and further enhancement of the service can be realized.

f. Fifth Embodiment

Figure 33:
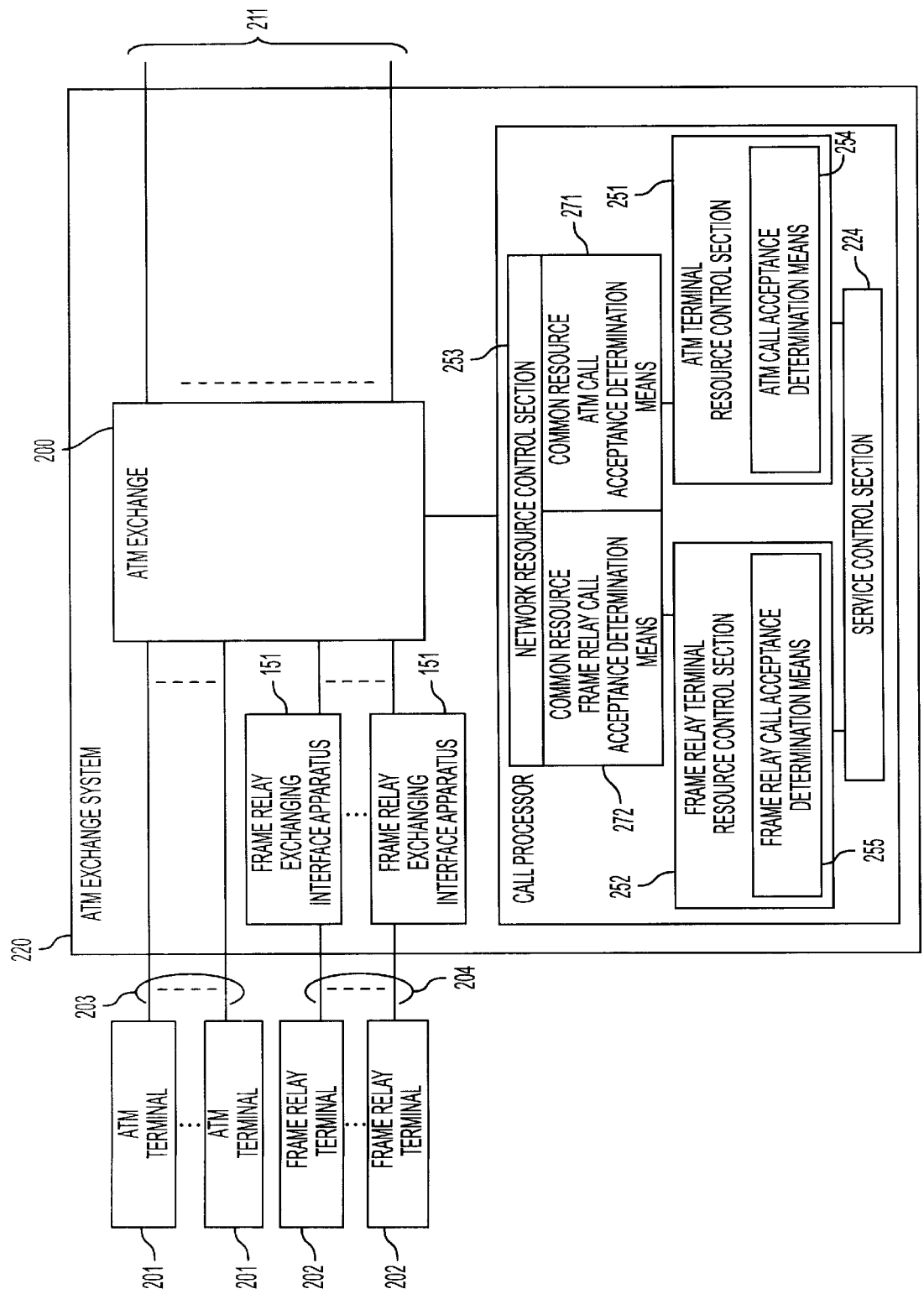
FIG. 33 is a block diagram of a further ATM exchange system showing a fifth preferred embodiment of the present invention.

FIG. 33 shows the construction of an ATM exchange system as a fifth preferred embodiment of the present invention. As seen from FIG. 33, also the ATM exchange system 220 in the fifth embodiment is constructed substantially in a similar manner as that in the fourth embodiment shown in FIG. 28, but in the present fifth embodiment, a portion thereof corresponding to the common resource call acceptance determination means 256 (refer to FIG. 28) in the fourth embodiment is constituted from two separate elements including common resource ATM call acceptance determination means 271 for determining whether or not an ATM call from an ATM terminal 201 should be accepted when the ATM terminal 201 tries to use the network common resource, and common resource frame relay call acceptance determination means 272 for determining whether or not a frame relay call from a frame relay terminal 202 should be accepted when the frame relay terminal 202 tries to use the network common resource.

It is to be noted that, in FIG. 33, like reference numerals to those described hereinabove denote like elements, and accordingly, overlapping description of them will be omitted herein to avoid redundancy.

Each of the common resource ATM call acceptance determination means 271 and the common resource frame relay call acceptance determination means 272 may be means having a substantially similar functional construction to that of the common resource call acceptance determination means 256 described hereinabove with reference to FIG. 30.

It is to be noted, however, that, in the present embodiment, the multiplexing rate by which a use requested band requested to set from an ATM terminal 201 is multiplied by the virtual band calculation means 267 constituting the common resource ATM call acceptance determination means 271 and the multiplexing rate by which a use requested band requested to set from a frame relay terminal 202 is multiplied by the virtual band calculation means 267 constituting the common resource frame relay call acceptance determination means 272 are set in accordance with characteristics of them. In particular, a first multiplexing rate $\beta 1$ (for example, 0.7 to 1.0) for a use requested band requested to set from an ATM terminal 201 and a second multiplexing rate $\beta 2$ (for example, 0.5 to 1.0) for a use requested band requested from a frame relay terminal 202 are set in advance in the virtual band calculation means 267.

Figure 34:
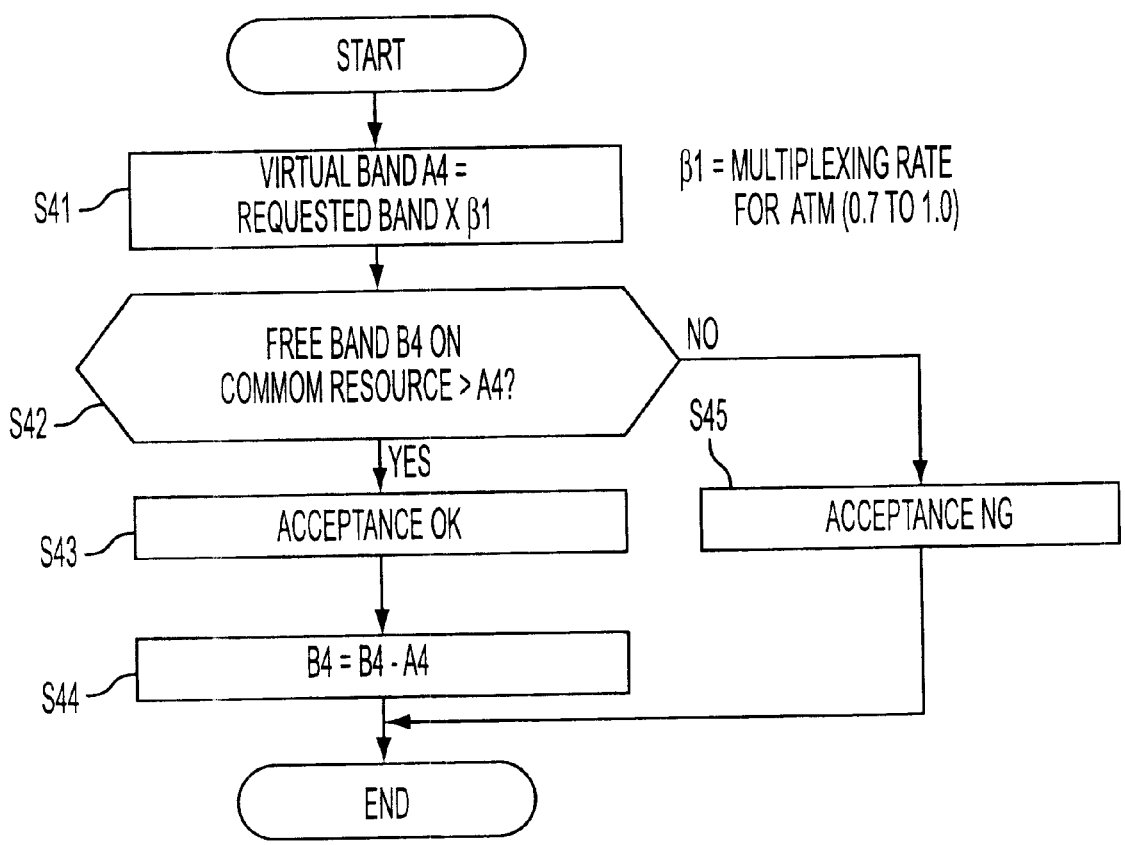
FIG. 34 is a flow chart illustrating operation of common resource ATM call acceptance determination means of the ATM exchange system shown in FIG. 33.
Figure 35:
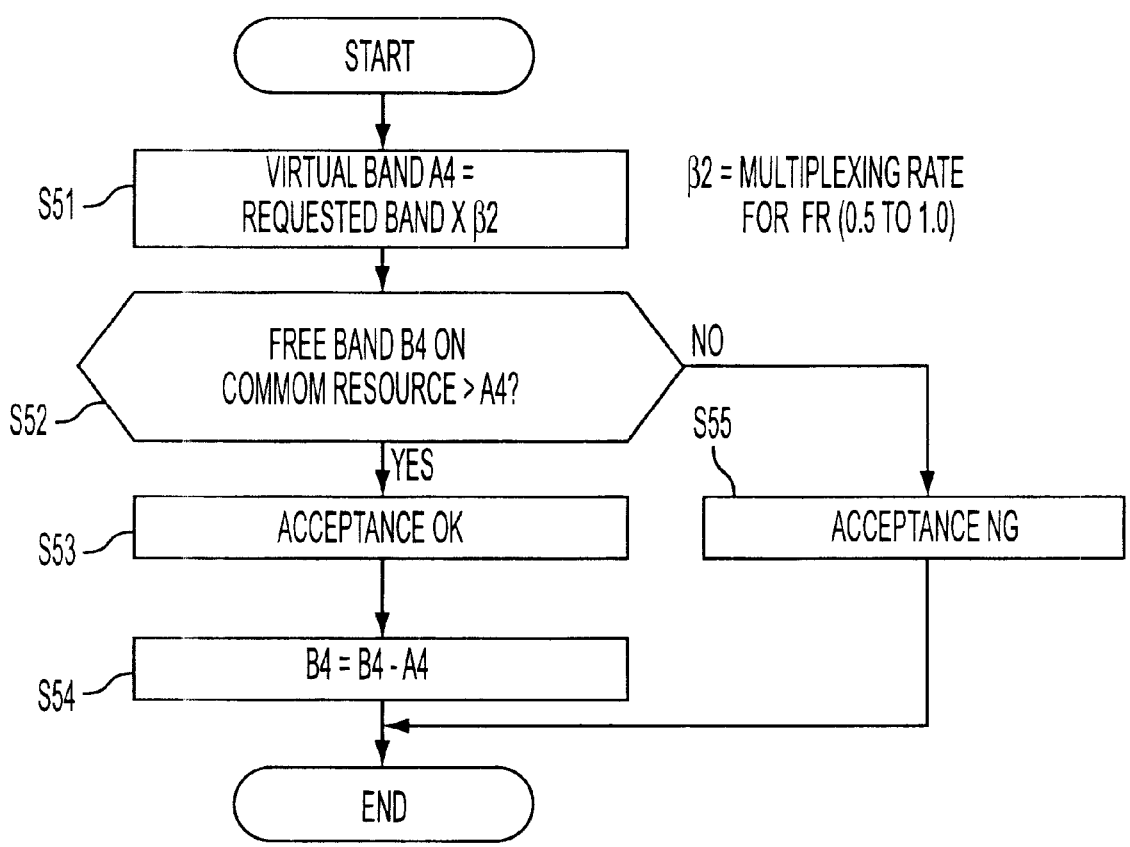
FIG. 35 is a flow chart illustrating operation of common resource frame relay call acceptance determination means of the ATM exchange system shown in FIG. 33.

Due to the construction described above, in the fifth embodiment, call acceptance determination processing is performed in accordance with such separate algorithms as illustrated in FIGS. 34 and 35 for an ATM call from an ATM terminal 201 and a frame relay call from a frame relay terminal 202, respectively, on the network common resource by the the common resource ATM call acceptance determination means 271 and the common resource frame relay call acceptance determination means 272.

In particular, referring to FIG. 34, in the common resource ATM call acceptance determination means 271, the virtual band calculation means 267 first multiplies a use requested band requested to set from an ATM terminal 201 by the first multiplexing rate $\beta 1$ to convert the use requested band into a use virtual band A4 (step S41), which is controlled by the network.

Further, the common resource free band detection means 268 supervises and detects a free band B4 on the network common resource of the ATM exchange 200, and the free band B4 is compared with the use virtual band A4 by the comparison means 269 (step S42).

Then, when the result of comparison is [free band B4]> [use virtual band A4], the call acceptance means 270 accepts the frame relay call from the ATM call from the ATM terminal 201 (acceptance OK: step S43), and the use virtual band A4 is assured and the free band B4 is replaced by B4–A4 (step S44).

When the result of comparison at step S42 by the comparison means 269 is [free band B4]≦[use virtual band A4], it is determined that the network common resource does not have a free area for the use virtual band A4 and the use virtual band A4 cannot be assured, and the call acceptance means 270 rejects acceptance of the ATM call from the ATM terminal 201 (acceptance NG: step S45).

Quite similarly, in the common resource frame relay call acceptance determination means 272, the virtual band calculation means 267 first multiplies, as seen from FIG. 35, a use requested band requested to set from a frame relay terminal 202 by the first multiplexing rate $\beta 1$ to convert the use requested band into a use virtual band A4 (step S51), which is controlled by the network.

Further, the common resource free band detection means 268 supervises and detects a free band B4 on the network common resource of the ATM exchange 200 and the free band B4 is compared with the use virtual band A4 by the comparison means 269 (step S52).

Then, when the result of comparison is [free band B4]> [use virtual band A4], the call acceptance means 270 accepts the frame relay call from the frame relay call from the frame relay terminal 202 (acceptance OK: step S53), and the use virtual band A4 is assured and the free band B4 is replaced by B4–A4 (step S54).

When the result of comparison at step S52 by the comparison means 269 is [free band B4]≦[use virtual band A4], it is determined that the network common resource does not have a free area for the use virtual band A4 and the use virtual band A4 cannot be assured, and the call acceptance means 270 rejects acceptance of the frame relay call from the frame relay terminal 202 (acceptance NG: step S55).

In this manner, according to the fifth embodiment, similar effects to those of the fourth embodiment can be achieved. Further, since the common resource call acceptance determination means 256 in the fourth embodiment is divided into the common resource ATM call acceptance determination means 271 and the common resource frame relay call acceptance determination means 272, call acceptance determination processing is performed in accordance with the separate algorithms for an ATM call from an ATM terminal 201 and a frame relay call from a frame relay terminal 202 on the network common resource, and consequently, call acceptance determination processing can be performed for an ATM call and a frame relay call using the first multiplexing rate $\beta 1$ and the second multiplexing rate $\beta 2$, respectively, which conform to the respective characteristics of them. Further, since a band for paths for all of the frame relay terminals is assured as a virtual band, the common resource can be utilized effectively.

g. Sixth Embodiment

Figure 36:
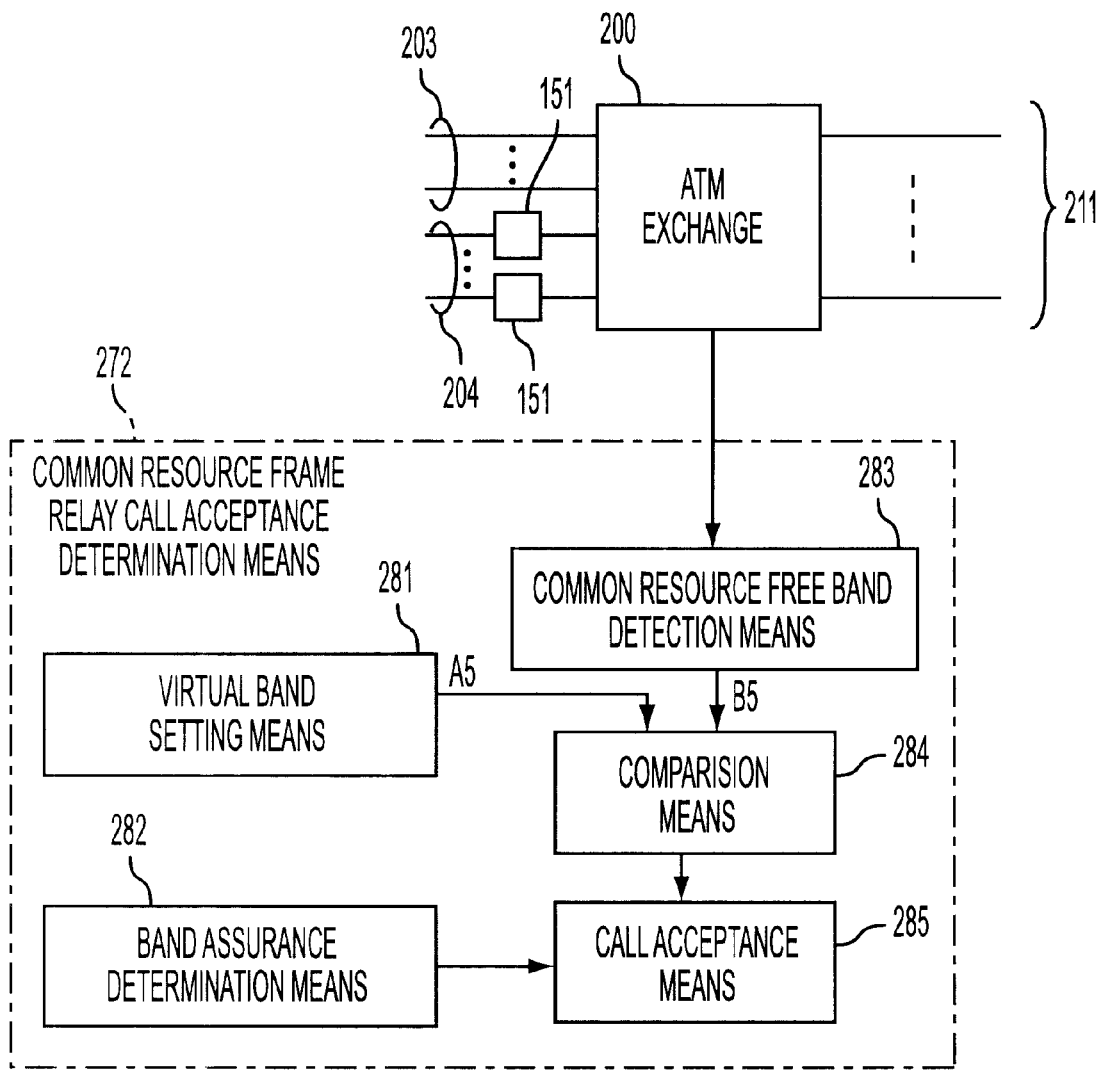
FIG. 36 is a block diagram showing a functional construction of common resource frame relay call acceptance determination means of a still further ATM exchange system showing a sixth preferred embodiment of the present invention.

FIG. 36 shows a functional construction of common resource frame relay call acceptance determination means as a sixth preferred embodiment of the present invention. In the present sixth embodiment, the common resource frame relay call acceptance determination means 272 in the fifth embodiment is constructed in such a manner as shown in FIG. 36.

Referring to FIG. 36, the common resource frame relay call acceptance determination means 272 shown includes virtual band setting means 281 for setting a physical maximum speed (physical line speed) of a frame relay terminal 202 as a use virtual band A5 for a frame relay call when setting of a frame relay call is requested from the frame relay terminal 202, and band assurance determination means 282 for determining whether or not a band has been assured already for a same sending subscriber as the frame relay terminals 202 on the network common resource.

The band assurance determination means 282 controls, similarly to the band assurance determination means 242 described hereinabove in connection with the third embodiment, such band assurance determination tables 246 as, for example, shown in FIG. 27 and refers to the band assurance determination tables 246 to determine whether or not a band has been assured already for the same sending subscriber as the predetermined frame relay terminal 202 on the network common resource.

The common resource frame relay call acceptance determination means 272 further includes common resource free band detection means 283 for detecting a free band B5 on the network common resource of the ATM exchange 200, comparison means 284 for comparing a use virtual band A5 set by the virtual band setting means 281 and a free band B5 detected by the common resource free band detection means 283 with each other, and call acceptance means 285 for performing acceptance processing of a frame relay call from a frame relay terminal 202 using the common resource.

The call acceptance means 285 accepts, when the band assurance determination means 282 determines that a band has been assured already for a same sending subscriber as a frame relay terminal 202, the frame relay call from the frame relay terminal 202 unconditionally. However, when the band assurance determination means 282 determines that no band has been assured as yet for the same sending subscriber as the frame relay terminal 202 and the result of comparison by the comparison means 284 is [free band B5 on the common resourse in the network]>[use virtual band A5], the call acceptance means 285 assures the use virtual band A5 and accepts the frame relay call from the frame relay terminal 202.

By the way, also in the present sixth embodiment, taking the characteristic described hereinabove with reference to FIG. 25 in connection with the third embodiment into consideration, if at least one path from a certain frame relay terminal 202 is set on the lines, a band corresponding to a physical maximum speed of the frame relay terminal 202 is assured, and on the contrary, if N paths from a same sending subscriber are set on the same lines, a band for a speed higher than the physical maximum speed may not be assured.

In the following, an acceptance determination procedure for a frame relay call from a frame relay terminal 202 by the common resource frame relay call acceptance determination means 272 in the sixth embodiment will be described with reference to FIG. 37.

Figure 37:
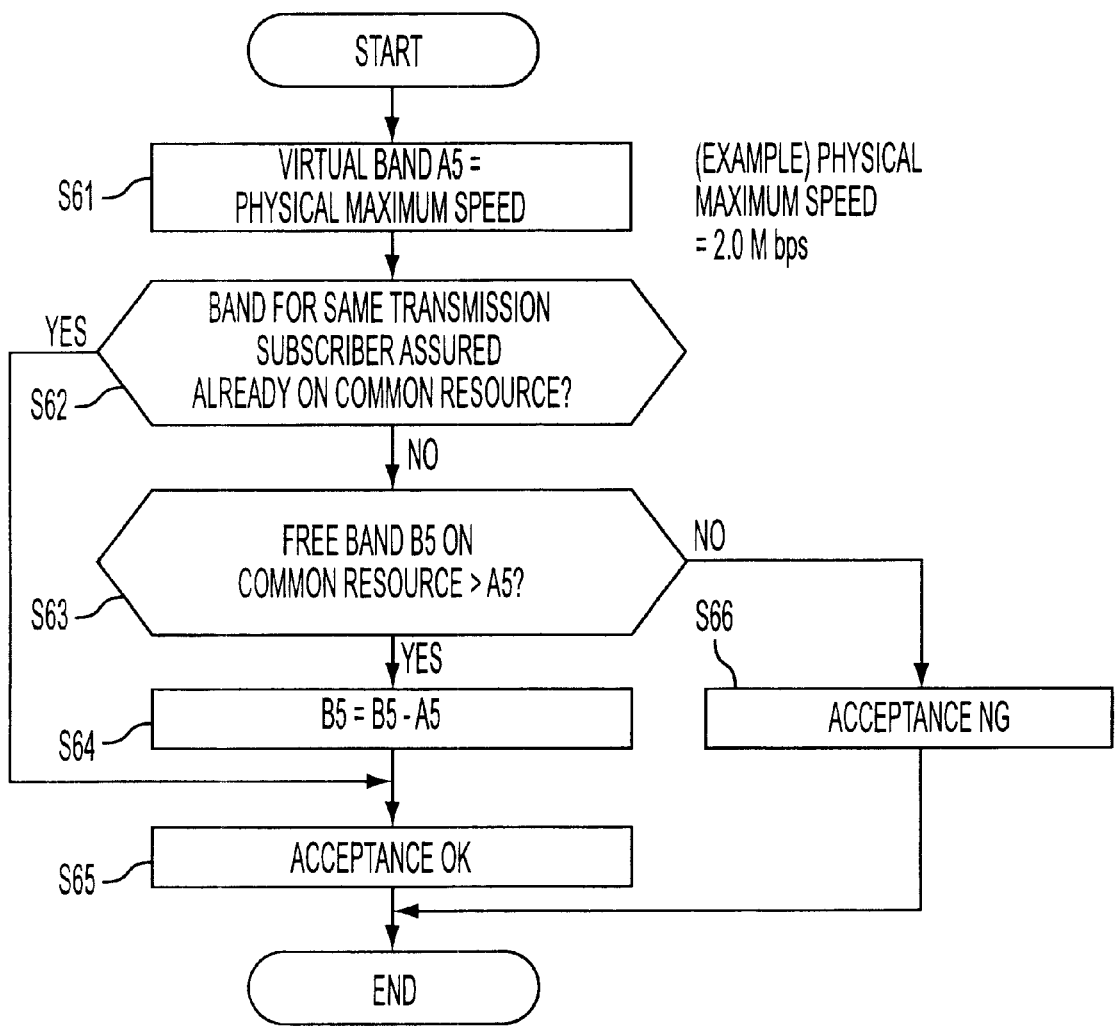
FIG. 37 is a flow chart illustrating operation of the common resource frame relay call acceptance determination means shown in FIG. 36.

In particular, when a frame relay terminal 202 tries to use the network common resource, in the common resource frame relay call acceptance determination means 272, the virtual band setting means 281 first sets the physical maximum speed (physical line speed) of the frame relay terminal 202 as a use virtual band A5 for the frame relay call (step S61) as seen from FIG. 37.

Then, the band assurance determination means 282 refers to the band assurance determination tables 246 to determine whether or not a band has been assured already for a same sending subscriber as the frame relay terminal 202, from which the present request for setting for a call has been developed, on the network common resource (step S62). When it is determined at step S62 that a band has been assured already, the control sequence advances to step S65, at which the frame relay call from the frame relay terminal 202 is accepted unconditionally by the call acceptance means 285.

On the other hand, when it is determined at step S62 that no band has been assured as yet for the same sending subscriber as the frame relay terminal 202, the result of supervision and detection of a free band B5 on the network common resource by the common resource free band detection means 283 is received, and the free band B5 and the use virtual band A5 (physical maximum speed) are compared with each other by the comparison means 284 (step S63).

When the result of comparison is [free band B5]>[use virtual band A5], the use virtual band A5 is assured and the free band B5 is replaced by B5−A5 (step S64), and then the frame relay call from the frame relay terminal 202 is accepted by the call acceptance means 285 (acceptance OK: step S65).

On the contrary, when the result of comparison at step S63 by the comparison means 284 is [free band B5]≦[use virtual band A5], it is determined that the use virtual band A5 cannot be assured on the network common resource, and the call acceptance means 285 rejects acceptance of the frame relay call from the frame relay terminal 202 (acceptance NG: step S66).

In this manner, according to the sixth embodiment, similar effects to those of the fourth and fifth embodiments are achieved. Further, similarly to the third embodiment, when at least one path from a certain frame relay terminal 202 is set on the lines, a band corresponding to a physical maximum speed of the frame relay terminal 202 is assured, and even if a plurality of paths from a same sending subscriber are set on the same lines, a band for a speed higher than the physical maximum speed is not assured. Consequently, each frame relay terminal 202 is permitted to make a contract for a speed higher than a physical maximum speed of the frame relay terminal 202. Accordingly, even where a frame relay terminal 202 is accommodated into the ATM exchange 200 so that a frame relay service may be enjoyed, a path for a frame relay packet can be set on the ATM exchange network while adopting the same conditions as those of existing frame relay services, and besides, resources can be utilized effectively.

h. Seventh Embodiment

Figure 38:
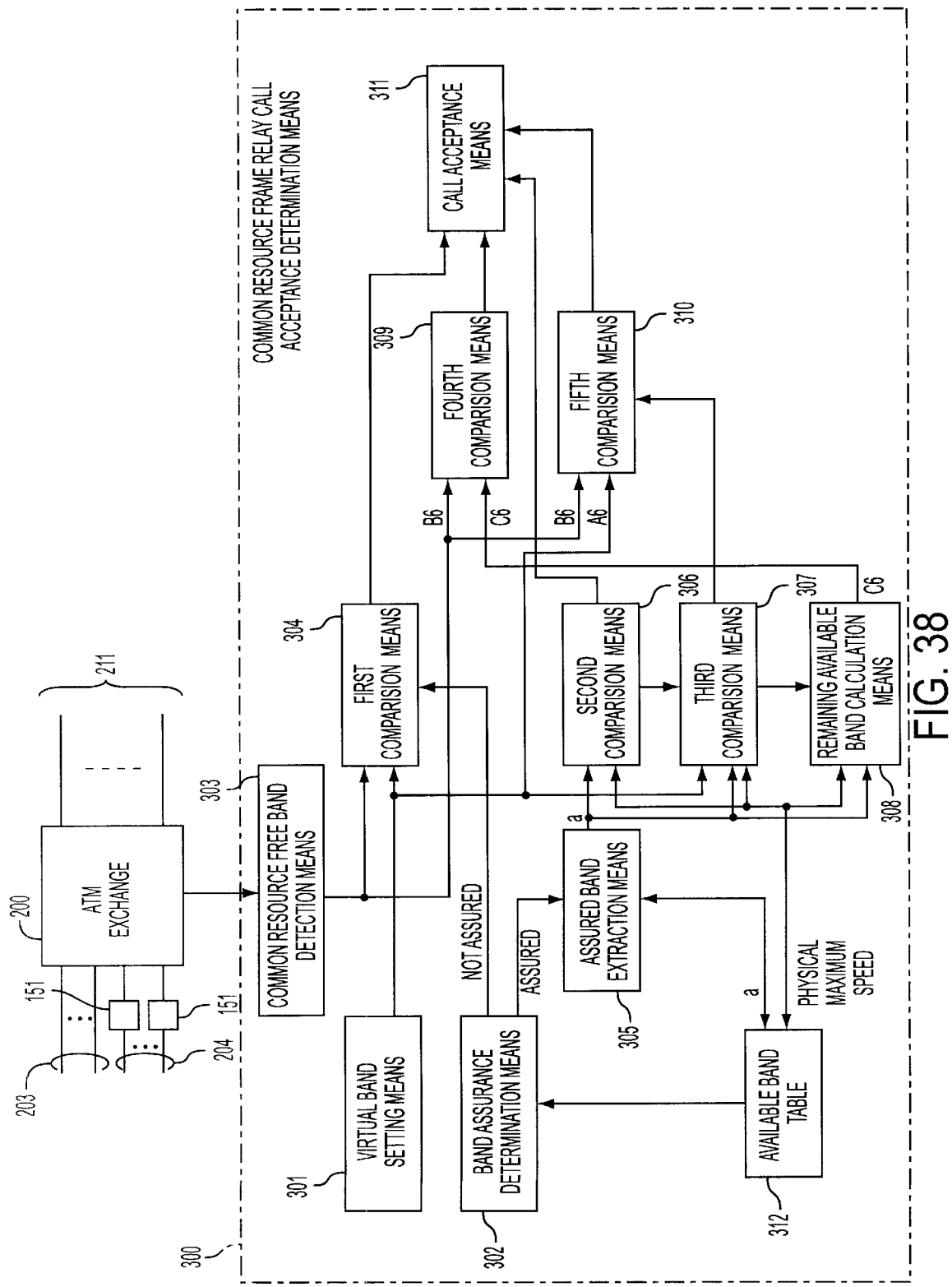
FIG. 38 is a block diagram showing a functional construction of common resource frame relay call acceptance determination means of a yet further ATM exchange system showing a seventh preferred embodiment of the present invention.

FIG. 38 shows a functional construction of common resource frame relay call acceptance determination means as a seventh preferred embodiment of the present invention. In the present seventh embodiment, the common resource frame relay call acceptance determination means 272 in the sixth embodiment constructed in such a manner as seen from FIG. 36 is replaced by such common resource frame relay call acceptance determination means 300 as shown in FIG. 38.

Referring to FIG. 38, the common resource frame relay call acceptance determination means 300 shown includes virtual band setting means 301 for setting a use requested band requested to set for a frame relay call from a frame relay terminal 202 as a use virtual band A6 for the frame relay call, and band assurance determination means 302 for determining whether or not a band has been assured already for a same sending subscriber as a frame relay terminal 202 on a network common resource.

The common resource frame relay call acceptance determination means 300 further includes common resource free band detection means 303 for detecting a free band B6 on the network common resource of an ATM exchange 200, and first comparison means 304 for comparing, when it is determined by the band assurance determination means 302 that no band has been assured for a same sending subscriber as a frame relay terminal 202, a use virtual band A6 set by the virtual band setting means 301 with a free band B6 detected by the common resource free band detection means 303.

The common resource frame relay call acceptance determination means 300 further includes assured band extraction means 305 for extracting, when it is determined by the band assurance determination means 302 that a band has been assured for a same sending subscriber as a frame relay terminal 202, an assured band $\underline{a}$ which has been assured already for the frame relay terminal 202, and second comparison means 306 for comparing an assured band $\underline{a}$ extracted by the assured band extraction means 305 with a physical maximum speed of the frame relay terminal 202.

The common resource frame relay call acceptance determination means 300 further includes third comparison means 307 for comparing, when the result of comparison by the second comparison means 306 is [assured band a]≦[physical maximum speed of the frame relay terminal 202], the sum a+A6 of the assured band a and the use virtual band A6 requested from the frame relay terminal 202 with the physical maximum speed of the frame relay terminal 202.

The common resource frame relay call acceptance determination means 300 further includes remaining available band calculation means 308 for subtracting, when the result of comparison by the third comparison means 307 is [sum a+use virtual band A6]>[physical maximum speed of the frame relay terminal 202], the assured band a from the physical maximum speed of the frame relay terminal 202 to calculate a remaining available band C6.

The common resource frame relay call acceptance determination means 300 further includes fourth comparison means 309 for comparing a remaining available band C6 calculated by the remaining available band calculation means 308 with a free band B6 detected by the common resource free band detection means 303, and fifth comparison means 310 for comparing, when the result of comparison by the third comparison means 307 is [sum a+A6]≦[physical maximum speed of the frame relay terminal 202], the use virtual band A6 set by the virtual band setting means 301 and the free band B6 detected by the common resource free band detection means 303 with each other.

The common resource frame relay call acceptance determination means 300 further includes call acceptance means 311 for performing acceptance processing of a frame relay call from a frame relay terminal 202 which uses a common resource.

The call acceptance means 311 assures, when the result of comparison by the first comparison means 304 or the fifth comparison means 310 is [free band B6 on the common resource]>[use virtual band A6], the use virtual band A6 and accepts the frame relay call from the frame relay terminal 202, but when the result of comparison by the fourth comparison means 309 is [free band B6 on the common resource]>[remaining available band C6], the call acceptance means 311 assures the remaining available band C6 and accepts the frame relay call from the frame relay terminal 202. On the other hand, when the result of comparison by the second comparison means 306 is [assured band a]>[physical maximum speed of the frame relay terminal 202], the call acceptance means 311 accepts the frame relay call from the frame relay terminal 202 unconditionally.

The common resource frame relay call acceptance determination means 300 further includes a use band table 312 which controls and stores, for each frame relay terminal 202 connected to the ATM exchange 200 by way of a respective frame relay terminal subscriber line 204, a physical maximum speed (physical line speed) of the frame relay terminal 202 and a sum total (total band) of use requested bands which have been requested to set by the frame relay terminal 202 by the present point of time.

In the use band table 312, a physical maximum speed and a total band are particularly registered for a frame relay terminal 202 of a predetermined sending telephone number connected to a predetermined circuit number as seen from FIGS. 40, 42 and 43. The band assurance determination means 302 refers to the use band table 312 to determine whether or not a band has been assured already for a same sending subscriber as a predetermined frame relay terminal 202.

Meanwhile, the assured band extraction means 305 extracts a total band of the use band table 312 as the band a assured already for the frame relay terminal 202, and the physical maximum speed of the frame relay terminal 202 to be used by the second comparison means 306, the third comparison means 307 and the remaining available band calculation means 308 is read out from the use band table 312.

Figure 39:
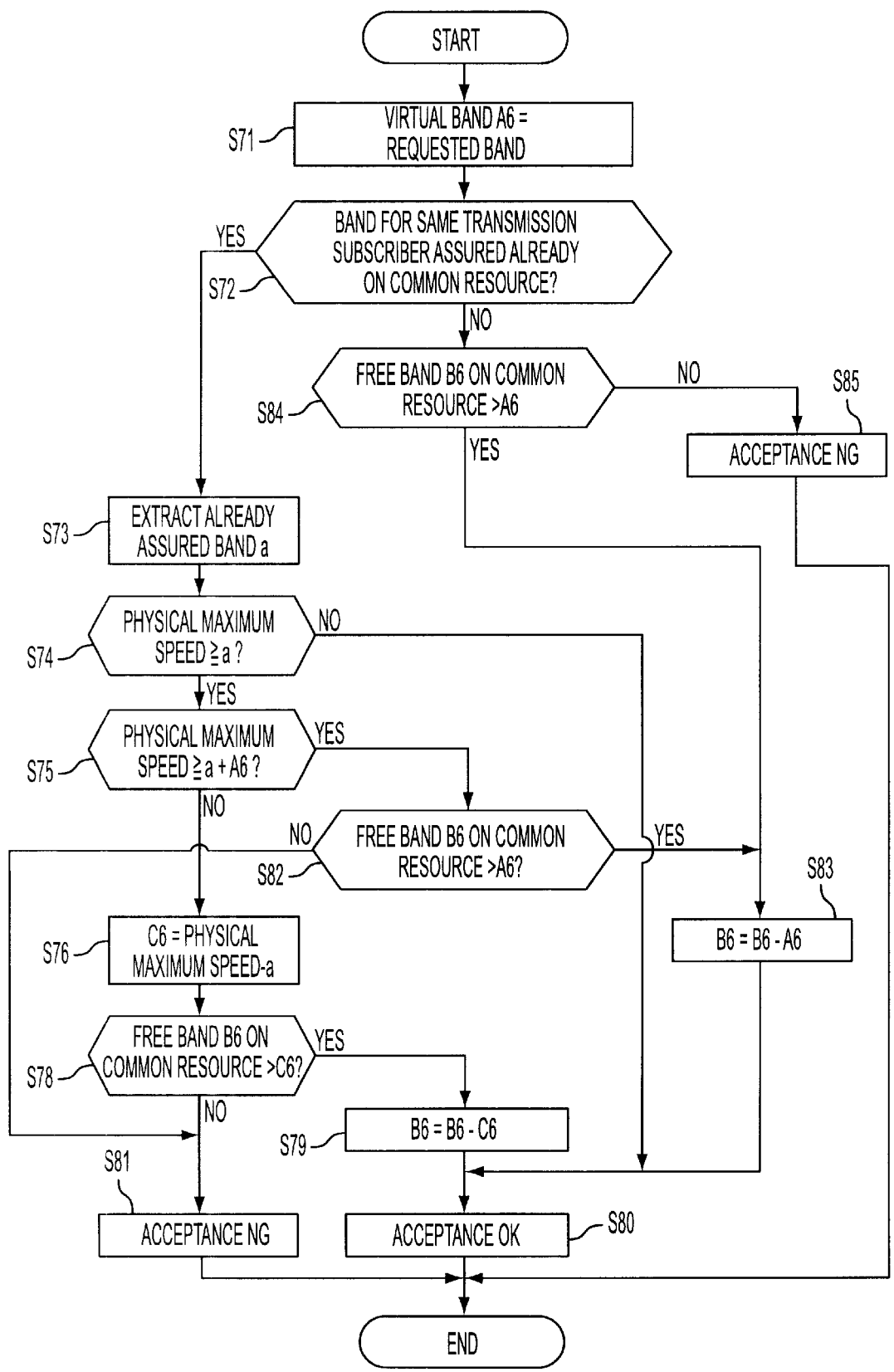
FIG. 39 is a flow chart illustrating operation of the common resource frame relay call acceptance determination means shown in FIG. 38.

Due to the construction described above, in the seventh embodiment, when a frame relay terminal 202 tries to use the network common resource, acceptance determination of a frame relay call from the frame relay terminal 202 is performed in accordance with a procedure illustrated in FIG. 39 by the common resource frame relay call acceptance determination means 300 having such a construction as shown in FIG. 38.

In particular, referring to FIG. 39, in the common resource frame relay call acceptance determination means 300, the virtual band setting means 301 first sets a use requested band requested to set for a frame relay call from a frame relay terminal 202 as a use virtual band A6 for the frame relay call (step S71).

Then, the band assurance determination means 302 refers to the use band table 312 and determines whether or not a band has been assured already for a same sending subscriber as the frame relay terminal 202, from which the request for setting of a call has been developed, on the network common resource (step S72).

When it is determined at step S72 that a band has been assured already, the assured band extraction means 305 refers to the use band table 312 and extracts a total band of the frame relay terminal 202 registered on the use band table 312 as an assured band a assured already for the frame relay terminal 202 (step S73), and then the thus extracted assured band a is compared with the physical maximum speed of the frame relay terminal 202 read out from the use band table 312 by the second comparison means 306 (step S74).

When the result of comparison is [assured band a]≦[physical maximum speed of the frame relay terminal 202], the third comparison means 307 compares the sum a+A6 of the assured band a and the use virtual band A6 with the physical maximum speed of the frame relay terminal 202 read out from the use band table 312 (step S75), but when the result of comparison is [sum a+A6]>[physical maximum speed of the frame relay terminal 202], the remaining available band calculation means 308 subtracts the assured band a from the physical maximum speed of the frame relay terminal 202 to calculate a remaining available band C6 (step S76).

Thereafter, the fourth comparison means 309 compares the free band B6 on the network common resource detected by the common resource free band detection means 303 with the remaining available band C6 (step S78), and when the result of comparison is [free band B6]>[remaining available band C6], the remaining available band C6 is assured and the free band B6 is replaced by B6−C6 (step S79). Then, the frame relay call from the frame relay terminal 202 is accepted by the call acceptance means 311 (acceptance OK: step S80). Consequently, a band for a physical maximum speed is assured for the frame relay terminal 202.

On the other hand, when the result of comparison at step S78 by the fourth comparison means 309 is [free band B6]≦[remaining available band C6], it is determined that the remaining available band C6 cannot be assured on the network common resource, and the call acceptance means 311 rejects the frame relay call from the frame relay terminal 202 (acceptance NG: step S81).

Further, when the result of comparison at step S75 by the third comparison means 307 is [sum $\underline{a}$+A6]≦[physical maximum speed of the frame relay terminal 202], the fifth comparison means 310 compares the free band B6 on the network common resource detected by the common resource free band detection means 303 with the use virtual band A6 (step S82).

When the result of comparison at step S75 is [free band B6]>[use virtual band A6], the use virtual band A6 is assured and the free band B6 is replaced by B6−A6 (step S83), and the frame relay call from the frame relay terminal 202 is accepted by the call acceptance means 311 (step S80).

When the result of comparison at step S82 by the fifth comparison means 310 is [free band B6]≦[use virtual band A6], it is determined that the use virtual band A6 cannot be assured on the network common resource, and the call acceptance means 311 rejects acceptance of the frame relay call from the frame relay terminal 202 (step S81).

On the other hand, when the result of comparison at step S74 by the second comparison means 306 is [assured band $\underline{a}$]>[physical maximum speed of the frame relay terminal 202], the call acceptance means 311 accepts the frame relay call from the frame relay terminal 202 unconditionally (step S80).

Further, when the band assurance determination means 302 refers, at step 72, to the use band table 312 and determines that no band has been assured as yet for the same sending subscriber as the frame relay terminal 202, the first comparison means 304 compares the free band B6 on the network common resource detected by the common resource free band detection means 303 with the use virtual band A6 set by the virtual band setting means 301 (step S84).

When the result of comparison is [free band B6]>[use virtual band A6], the use virtual band A6 is assured and the free band B6 is replaced by B6−A6 (step S83), and the call acceptance means 311 accepts the frame relay call from the frame relay terminal 202 (step S80).

On the contrary, when the result of comparison at step S84 by the first comparison means 304 is [free band B6]≦[use virtual band A6], it is determined that the use virtual band A6 cannot be assured on the network common resource, and the call acceptance means 311 rejects acceptance of the frame relay call from the frame relay terminal 202 (step S81).

In this manner, according to the seventh embodiment, for an ascending path from a frame relay terminal subscriber line 204 for a frame relay terminal 202, a physical maximum speed is had as a fixed value on each physical transmission line, and call acceptance determination processing is performed while connection of a path of a speed lower than the physical maximum speed is assured on the total band.

In particular, call acceptance determination processing is performed such that, when the sum total (total band A6+$\underline{a}$) of use requested bands which have been requested to set before the present point of time from the frame relay terminal 202 is lower than the physical maximum speed, a band is assured with the total value, but when the total band becomes higher than the physical maximum speed, a band is assured at the physical maximum speed.

Accordingly, the common resource of the ATM exchange 200 can be utilized further effectively.

Figure 41:
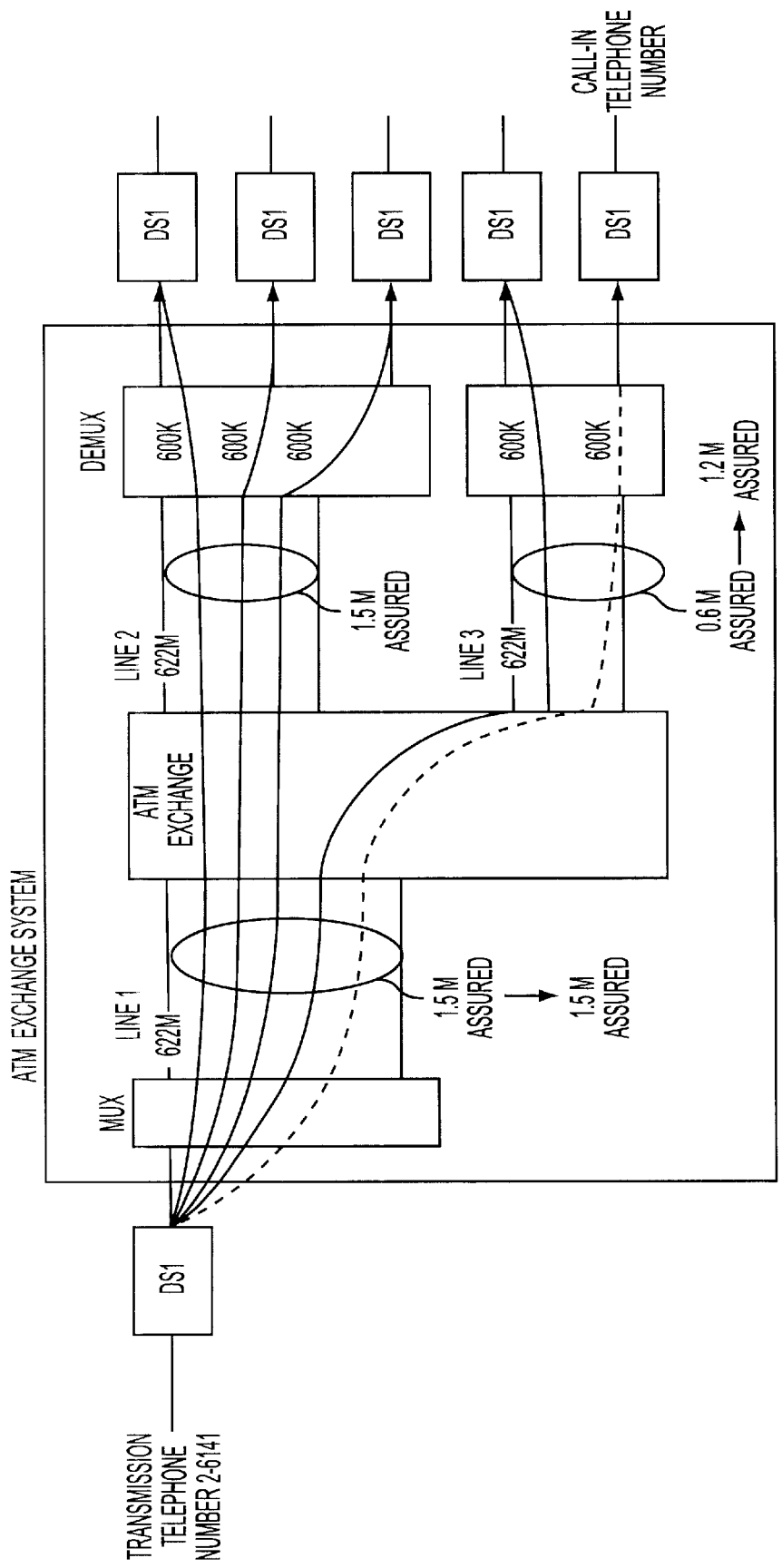
FIG. 41 is a diagrammatic view illustrating band assurance in allocation within a physical maximum speed in the common resource frame relay call acceptance determination means shown in FIG. 38.
Figure 44:
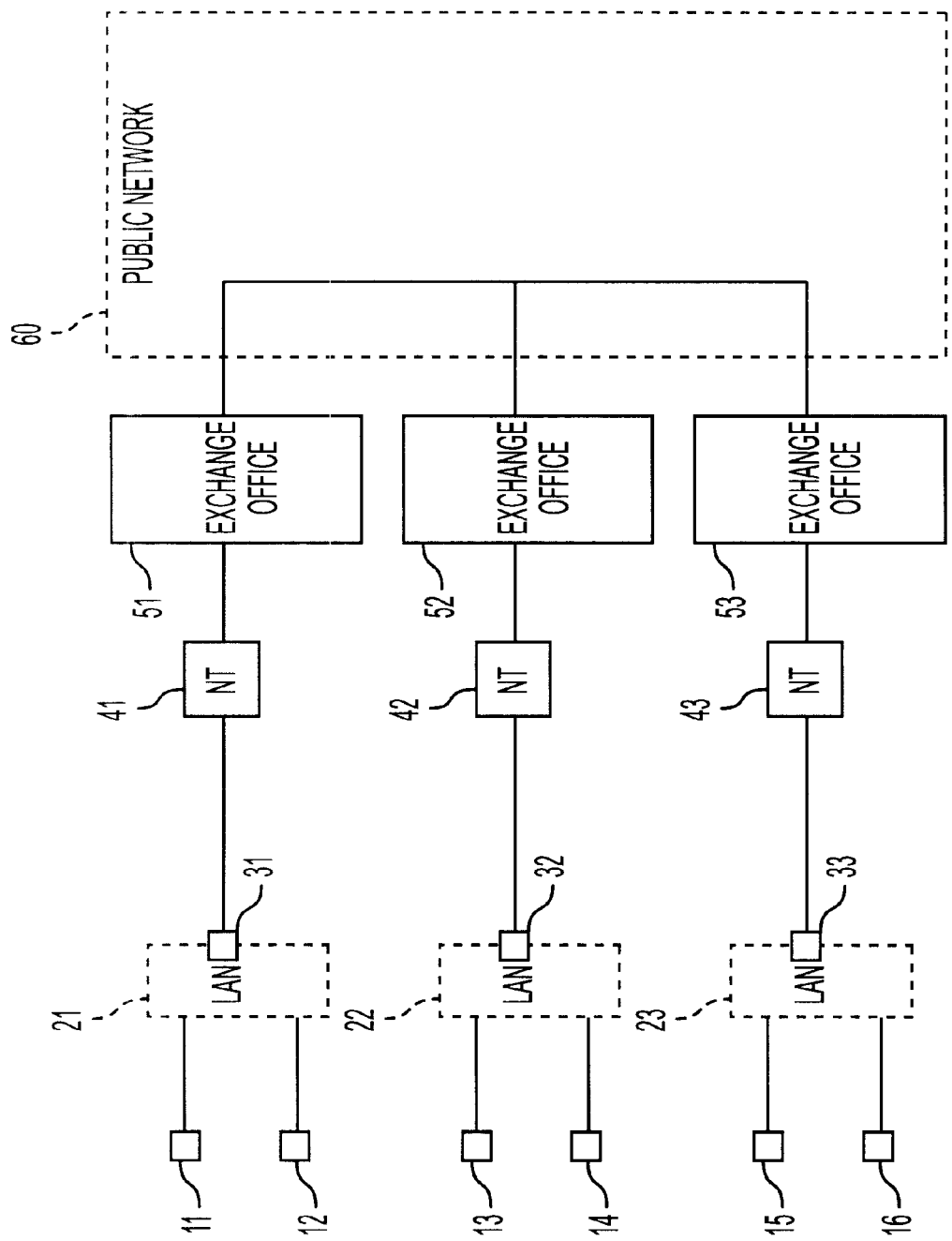
FIG. 44 is a block diagram showing an example for reference of a system wherein an ISDN frame relay is used to interconnect a plurality of LANs.

A concrete example of such band assurance upon allocation within the physical maximum speed in the seventh embodiment will be described with reference to FIGS. 41 to 43. In FIGS. 41 to 43, a case is illustrated wherein a request for connection of a use requested band of 600 kbps from a frame relay terminal of the sending telephone number 2-6141 to another frame relay terminal of the receiving telephone number 3-1111 as a new path has been developed in a condition wherein such paths as indicated by solid lines in FIG. 41 have been set already.

In this instance, a band is not assured newly for the line 1 since the total band of it is higher than the physical maximum speed of 1.5 Mbps as seen from FIG. 42. Meanwhile, since a path of a band of 600 kbps has been set already as seen in FIG. 43 for the line 3, even if a path of a band of 600 kbps is set further, the total band is 1.2 Mbps and does not exceed the physical maximum speed of 1.5 Mbps, a band of 600 kbps is assured newly.

Further, in the seventh embodiment, since the physical maximum speed (physical line speed) and the total band requested to set before the present point of time are controlled and stored for each frame relay terminal 202 by the use band table 312, the total band of the use band table 312 can be used as the assured band $\underline{a}$ of the frame relay terminal 202. In addition, the physical maximum speed of the frame relay terminal 202 which is required for comparison or for calculation of the remaining available band C6 can be read out from the use band table and used, and consequently, it is advantageous in that control of data and calculation by the means can be performed efficiently.

It is to be noted that, while, in the seventh embodiment described above, a user of a frame relay terminal 202 reports a use requested band before a call is developed, such an alternative construction may be employed that a use requested band requested to set from a frame relay terminal 202 is added as band information to the frame relay call from the frame relay terminal 202 and transferred to the virtual band setting means 301 of the common resource frame relay call acceptance determination means 300 together with the frame relay call.

In this instance, similarly to the case described hereinabove with reference to FIG. 21 in connection with the second embodiment, the ATM exchange system 220 includes a signal apparatus 229 for transferring a frame relay call from the ATM exchange 200 to the service control section 224 of the call processor 223. Consequently, also in the present seventh embodiment, a user of a frame relay terminal 202 can omit the operation to report a use requested band every time before a call is developed, and further enhancement of the service can be realized.

The present invention is not limited to the specifically described embodiment, and variations and modifications may be made without departing from the scope of the present invention.

What is claimed is:

1. An interface apparatus connected between a fixed length packet used network having a plurality of virtual paths and a variable length packet used network having a plurality of logic channels for converting a variable length packets, which is received from the variable length packet used network and has data link connection identifier (ID) information as routing information, into one or more fixed length packets, which has virtual path ID information and virtual channel ID information, said interface apparatus comprising:

(I) converting means, for obtaining the virtual path ID information and the virtual channel ID information by converting one or more logic channel ID numbers of one or more logic channels used for the variable length packet and the data link connection ID information, respectively, said converting means including:

(I-i) first storing means for storing a first relationship between a logic channel ID number group including the individual logic channel ID numbers and the virtual path ID information; and (I-ii) second storing means for storing a second relationship between the data link connection ID information and the virtual channel ID information; and (II) disassembling means for converting the variable length packet into the one or more fixed length packets and adding the virtual path ID information, which is obtained by said converting means, and the virtual channel ID information, which is obtained by said converting means, as the routing information to the one or more fixed length packets and then outputting the added one or more fixed length packets to the fixed length packet used network;

said converting means converting the one or more logic channel ID numbers and the data link connection ID information into the virtual path ID information and the virtual channel ID information, respectively, based on the first relationship in said first storing means and the second relationship stored in said second storing means.

2. An interface apparatus, which is connected between a fixed length packet used network having a plurality of virtual paths and a variable length packet used network having a plurality of logic channels, for converting one or more fixed length packet, which has virtual path identifier (ID) information and virtual channel ID information as routing Information, into a variable length packet to be transmitted to the variable length packet used network, said interface apparatus comprising:

(I) converting means, for obtaining one or more logic channel ID numbers and data link connection ID information by converting the virtual path ID information and the virtual channel ID information respectively, said converting means including:

(I-i) first storing means for storing a first relationship between a logic channel ID number group including the individual logic channel ID numbers and the virtual path ID information; and (I-ii) second storing means for storing a second relationship between the data link connection ID information and the virtual channel ID information; and (II) assembling means for converting the one or more fixed length packets into the variable length packet and adding the data link connection ID information, which is obtained by said converting means, a the routing information to the variable length packet and then outputting the added variable length packet to one or more logic channels corresponding to the one or more logic channel ID numbers, which is obtained by said converting means;

said converting means converting the virtual path ID information and the virtual channel ID information into the one or more logic channel ID numbers and the data link connection ID information, respectively, based on the first relationship in said first storing means and the second relationship stored in said second storing means.

3. An interface apparatus as claimed in claim 1, wherein said first storing means stores a fixed logic, which defines relationship between a minimum ID number selected from the one or more logic channel ID numbers and a corresponding ID number in the virtual path ID information, as the first relationship.

4. An interface apparatus as claimed in claim 2, wherein said first storing means stores a fixed logic, which defines relationship between a minimum ID number selected from the one or more logic channel ID numbers and a corresponding ID number in the virtual path ID information, as the first relationship.

5. An interface apparatus as claimed in claim 1, wherein said second storing means stores a fixed logic, which defines relationship between one or more data link connection ID numbers in the data link connection ID information and corresponding one or more virtual channel ID numbers in the virtual channel ID information, as the second relationship.

6. An interface apparatus as claimed in claim 2, wherein said second storing means stores a fixed logic, which defines relationship between one or more data link connection ID numbers in the data link connection ID information and corresponding one or more virtual channel ID numbers in the virtual channel ID information, as the second relationship.

7. An interface apparatus as claimed in claim 3, wherein said second storing means stores a fixed logic, which defines relationship between one or more data link connection ID numbers in the data link connection ID information and corresponding one or more virtual channel ID numbers in the virtual channel ID information, as the second relationship.

8. An interface apparatus as claimed in claim 4, wherein said second storing means stores a fixed logic, which defines relationship between one or more data link connection ID numbers in the data link connection ID information and corresponding one or more virtual channel ID numbers in the virtual channel ID information, as the second relationship.

9. An interface apparatus as claimed in claim 1, wherein said first storing means stores a first conversion table, which is made based on the first relationship, and said second storing means stores a second conversion table, which is made based on the second relationship.

10. An interface apparatus as claimed in claim 2, wherein said first storing means stores a first conversion table, which is made based on the first relationship, and said second storing means stores a second conversion table, which is made based on the second relationship.

11. A communications system for a fixed length packet used network having a plurality of virtual paths and a variable length packet used network having a plurality of logic channels, said communications system comprising:

(I) a switch, which is connected with the fixed length packet used network, for routing one or more fixed length packets having virtual path identifier (ID) information and virtual channel ID information as routing information;

(II) an interface apparatus, which is connected between the variable length packet used network and said switch of the fixed length packet used network, for converting a variable length packet, which is received from the variable length packet used network and has data link connection ID information as routing information, said interface apparatus including;

(II-I) converting means, for obtaining the virtual path ID information and the virtual channel ID information by converting one or more logic channel ID numbers of one or more logic channels used for the variable length packet and the data link connection ID information, respectively, said converting means having, (II-I-i) first storing means for storing a first relationship between a logic channel ID number group including the individual logic channel ID numbers and the virtual path ID information; and (II-I-ii) second storing means for storing a second relationship between the data link connection ID information and the virtual channel ID information; and (III) disassembling means for converting the variable length packet into the one or more fixed length packets and adding the virtual path ID information, which is obtained by said converting means, as the routing information to the one or more fixed length packets and then outputting the added one or more fixed length packets to said switch;

said converting means converting the one or more logic channel ID numbers and the data link connection ID information into the virtual path ID information and the virtual channel ID information, respectively, based on the first relationship in said first storing means and the second relationship stored in said second storing means.

12. A communications system for a fixed length packet used network having a plurality of virtual paths and a variable length packet used network having a plurality of logic channels, said communications system comprising:

(I) a switch, which is connected with the fixed length packet used network, for routing one or more fixed length packets having virtual path identifier (ID) information and virtual channel ID information as routing information;

(II) an interface apparatus, which is connected between the variable length packet used network and said switch of the fixed length packet used network, for converting the one or more fixed length packets, which are received from said switch, into a variable length packet to be transmitted to the variable length packet used network, said interface apparatus including;

(II-I) converting means, for obtaining one or more logic channel ID numbers and data link connection ID information by converting the virtual path ID information and the virtual channel ID information, respectively, said converting means, having:

(II-I-i) first storing means for storing a first relationship between a logic channel ID number group including the individual logic channel ID numbers and the virtual path ID information, and (II-I-ii) second storing means for storing a second relationship between the data link connection ID information and the virtual channel ID information; and (III) assembling means for converting the one or more fixed length packets into the variable length packet and adding the data link connection ID information, which is obtained by said converting means as the routing information to the variable length packet and then outputting the added variable length packet to one or more logic channels corresponding to the one or more logic channel ID numbers, which is obtained by said converting means, said converting means converting the virtual path ID information and the virtual channel ID information into the one or more logic channel ID numbers and the data link connection ID information, respectively, based on the first relationship in said first storing means and the second relationship stored in said second storing means.

13. A communications system claimed as claim 11 wherein said first storing means stores a fixed logic, which defines relationship between a minimum ID number selected from the one or more logic channel ID numbers and a corresponding ID number in the virtual path ID information as the first relationship.

14. A communications system claimed as claim 12 wherein said first storing means stores a fixed logic, which defines relationship between a minimum ID number selected from the one or more logic channel ID numbers and a corresponding ID number in the virtual path ID information, as the first relationship.

15. A communications system claimed as claim 11, wherein said second storing means stores a fixed logic, which defines relationship between one or more data link connection ID numbers in the data link connection ID information and corresponding one or more virtual channel ID numbers in the virtual channel ID information, as the second relationship.

16. A communications system claimed as claim 12, wherein said second storing means stores a fixed logic, which defines relationship between one or more data link connection ID numbers in the data link connection ID information and corresponding one or more virtual channel ID numbers in the virtual channel ID information, as the second relationship.

17. A communications system claimed as claim 13, wherein said second storing means stores a fixed logic, which defines relationship between one or more data link connection ID numbers in the data link connection ID information and corresponding one or more virtual channel ID numbers in the virtual channel ID information, as the second relationship.

18. A communications system claimed as claim 14, wherein said second storing means stores a fixed logic, which defines relationship between one or more data link connection ID numbers in the data link connection ID information and corresponding one or more virtual channel ID numbers in the virtual channel ID information, as the second relationship.

19. A communications system claimed as claim 11, wherein said first storing means stores a first conversion table, which is made based on the first relationship, and said second storing means stores a second conversion table, which is made based on the second relationship.

20. A communications system claimed as claim 12, wherein said first storing means stores a first conversion table, which is made based on the first relationship, and said second storing means stores a second conversion table, which is made based on the second relationship.

* * * * *

UNITED STATES PATENT AND TRADEMARK OFFICE
CERTIFICATE OF CORRECTION

PATENT NO. : 6,546,012 B2
DATED : April 8, 2003
INVENTOR(S) : T. Kamo et al.

It is certified that error appears in the above-identified patent and that said Letters Patent is hereby corrected as shown below:

<u>Title page,</u>
Item [30], Foreign Application Priority Data, please correct the filing date to read:
-- June 8, 1993 --

Signed and Sealed this

Twentieth Day of January, 2004

JON W. DUDAS
*Acting Director of the United States Patent and Trademark Office*